June 17, 1958 G. B. QUATMAN 2,839,612

TOLL SWITCHING SYSTEM

Filed June 22, 1953 17 Sheets-Sheet 1

INVENTOR.
George B. Quatman
BY Smith, Olsen & Baird
Attys.

INVENTOR.
George B. Quatman
BY Smith, Olsen and Baird
Attys.

June 17, 1958 G. B. QUATMAN 2,839,612
TOLL SWITCHING SYSTEM
Filed June 22, 1953 17 Sheets-Sheet 3

INVENTOR.
George B. Quatman
BY Smith, Olsen & Baird.
Attys

June 17, 1958 G. B. QUATMAN 2,839,612

TOLL SWITCHING SYSTEM

Filed June 22, 1953 17 Sheets-Sheet 4

INVENTOR.
George B. Quatman
BY Smith, Olsen & Baird
Attys

June 17, 1958 G. B. QUATMAN 2,839,612

TOLL SWITCHING SYSTEM

Filed June 22, 1953 17 Sheets-Sheet 5

Inventor
George B. Quatman
BY Smith, Olsen & Baird
Attys.

INVENTOR.
George B. Quatman
BY Smith, Olsen & Baird
Attys.

June 17, 1958 G. B. QUATMAN 2,839,612

TOLL SWITCHING SYSTEM

Filed June 22, 1953 17 Sheets-Sheet 7

LINE SELECTOR 700

INVENTOR.
George B. Quatman
BY Smith, Olsen & Baird
Attys.

June 17, 1958 G. B. QUATMAN 2,839,612

TOLL SWITCHING SYSTEM

Filed June 22, 1953 17 Sheets-Sheet 8

INVENTOR.
George B. Quatman
BY Smith, Olsen & Baird
Attys.

June 17, 1958 G. B. QUATMAN 2,839,612

TOLL SWITCHING SYSTEM

Filed June 22, 1953 17 Sheets-Sheet 9

INVENTOR.
George B. Quatman
BY Smith, Olsen & Baird
Attys.

June 17, 1958 G. B. QUATMAN 2,839,612

TOLL SWITCHING SYSTEM

Filed June 22, 1953 17 Sheets-Sheet 10

INVENTOR.
George B. Quatman
BY
Smith, Olsen & Baird
Attys.

TOLL SWITCHING SYSTEM

Filed June 22, 1953

17 Sheets-Sheet 11

INVENTOR.
George B. Quatman

BY Smith, Olsen and Baird

Attys.

INVENTOR.
George B. Quatman
BY Smith, Olsen & Baird
Attys.

INVENTOR.
George B. Quatman
BY Smith, Olsen & Baird
Attys.

INVENTOR.
George B. Quatman
BY Smith, Olsen & Baird
Attys.

June 17, 1958 G. B. QUATMAN 2,839,612

TOLL SWITCHING SYSTEM

Filed June 22, 1953 17 Sheets-Sheet 15

IMPULSE SENDER 1900A

INVENTOR.
George B. Quatman
BY
Smith, Olsen & Baird
Attys.

INVENTOR.
George B. Quatman
BY Smith, Olsen & Baird
Attys.

June 17, 1958 G. B. QUATMAN 2,839,612

TOLL SWITCHING SYSTEM

Filed June 22, 1953 17 Sheets-Sheet 17

INVENTOR.
George B. Quatman
BY Smith, Olsen and Baird
Attys.

United States Patent Office 2,839,612

Patented June 17, 1958

2,839,612

TOLL SWITCHING SYSTEM

George B. Quatman, Lima, Ohio, assignor to General Telephone Laboratories, Incorporated, a corporation of Delaware Application June 22, 1953, Serial No. 363,133

17 Claims. (Cl. 179—27)

Figure 1:
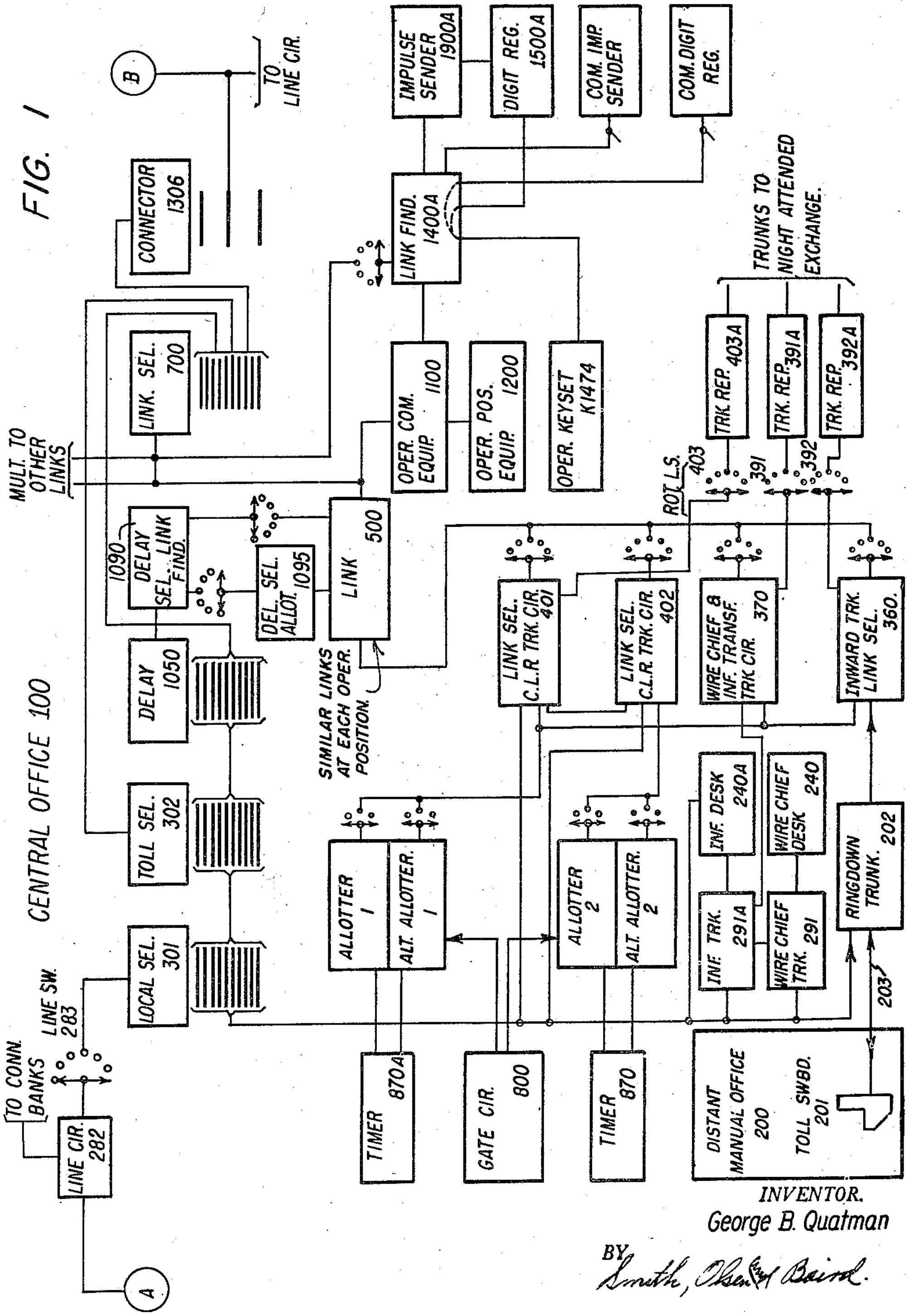

The present invention relates to telephone systems in general and, more particularly, to improvements in toll switching apparatus utilized in handling toll traffic in a semi-automatic telephone system of the character of that disclosed and claimed in Harvey W. Balzer Patent No. 2,697,134, issued December 14, 1954.

In handling toll switching at a centralized switchboard in a toll network, incoming calls are routed by way of interconnecting toll lines to a toll operator position and completed therefrom by way of the central office switching apparatus to local called subscriber substations or to subscriber substations in other distant exchange areas. Normally, the toll switchboard includes a plurality of positions divided into several groups corresponding respectively to different classes of service. These groups of service may, for example, be classified as inward, CLR or TX and each position in each of the groups is normally arranged to handle calls of the corresponding class.

Incoming toll calls from distant exchanges are normally routed to the inward operator positions for completion and if they cannot be immediately completed, a record is made of the calls and they are transferred to a TX operator position for completion at a later time.

Outgoing toll calls originated by local subscribers are normally routed to the CLR operator positions for completion. If the CLR operator cannot immediately complete a call she makes a record containing the necessary information for completing the connection to both the calling and called subscribers and then passes this record to a TX operator who will attempt to complete the connection at a later time. A record is made of each completed toll call so that an appropriate charge for the call may be accessed against the proper party.

It is an object of the present invention to provide in a toll switching network of the character described, an improved cordless dial toll switchboard having a plurality of operator positions and wherein each position comprises a plurality of links and control apparatus common to the links.

It is a further object of the invention to provide in a toll switching system of the character described, an improved link circuit which is arranged to handle any one or all of a plurality of different classes of service and which responds to reverse-battery supervisory signals transmitted thereto over the rear or answering end or over the front or calling end of the link.

It is still another object of the invention to provide in a system of the character described, an improved link selecting trunk circuit including a rotary switch having access to the different links at the different operator positions. Trunk circuits of this character are utilized in the present system to route incoming calls, regardless of the class, to the links at the different positions of the switchboard.

It is still a further object of the invention to provide in a system of the character noted, an improved allotter for selectively controlling the different link selecting trunk circuits having waiting incoming calls thereon in order to route such calls to idle links at the different operator positions one at a time regardless of the class of the waiting calls.

It is still another object of the invention to provide in a system of the character noted, an alternate allotter and a timer circuit for automatically rendering the alternate allotter effective to control the trunk circuits within a predetermined elapsed time interval after the principal allotter fails to function properly, or the link selecting trunk circuit failed to function properly and dismiss the allotter so subsequent calls can proceed.

It is still another object of the invention to provide in a system of the character noted, an improved gate circuit for alternately controlling two allotters respectively serving two different groups of link selecting trunk circuits in order to route waiting calls to idle links. With this arrangement, a first allotter serves a first group of linking selecting trunk circuits having access to links at the operator positions of the switchboard and a second allotter serves a second group of link selecting trunk circuits having access to the same links at the operator positions. The gate circuit, in turn, automatically controls the allotters alternately as long as calls are waiting to be answered in both groups of link selecting trunk circuits and it automatically controls one of the allotters having calls waiting in the associated group of trunk circuits when no calls are waiting to be answered in the group of trunk circuits served by the other allotter.

It is still another object of the invention to provide in a system of the type noted, improved facilities for busying all of the links associated with each position of the switchboard whenever the associated position is vacated or unattended and for controlling the one group of link selecting trunk circuits having access to links at such unattended positions to transfer subsequent incoming calls to links in the group of link selecting trunk circuits having access to links at attended positions of the switchboard.

It is still another object of the invention to provide in a toll switching system of the type noted, an improved ring-down trunk circuit having facilities for responding to ring-down signals on incoming calls in order to transmit reverse battery supervisory signals to the links at the switchboard and also having facilities for responding to reverse battery supervisory signals transmitted from the operator positions on outgoing calls in order to retransmit flash ringing supervisory signals to a distant manual switchboard.

It is still another object of the present invention to provide in a system of the type noted, facilities whereby an operator may selectively connect her headset with any link, with or without her common position equipment.

It is still another object of the invention to provide in a system of the character noted, subscriber controlled automatic disconnect of switching apparatus utilized in CLR calls and operator controlled means for rendering ineffective the automatic disconnect of such apparatus.

It is still another object of the invention to provide in a system of the character noted, improved facilities for automatically flashing the rear and front supervisory lamps in the operator links in response to the reception of one or more corresponding recall signals.

It is still another object of the invention to provide in a system of the character noted, selectively controlled facilities for automatically transmitting flashing recall signals from the operator position over the rear or over the front ends of the links.

It is still another object of the invention to provide in a system of the type noted, facilities for answering special service calls, such as calls to the wire chief desk, information desk, chief operator desk, etc., at the designated desk and for automatically transferring each of the foregoing special service calls to the next succeeding desk in a series as each desk becomes unattended. When all of the desks in the series are unattended, such calls are automatically transferred to one of the operator positions of the switchboard to be answered.

It is still another object of the invention to provide in a system of the type noted, facilities for automatically transferring all calls including inward, CLR, TX and special service calls to another eychange whenever all of the positions of the central office switchboard are unattended.

It is still another object of the invention to provide in a system of the type noted, facilities for metering the number of calls that are not answered by the operators at the switchboard within a predetermined elapsed time interval.

It is still another object of the invention to provide in a toll switching system of the type noted, an improved selector switch of the Strowger type which is controlled either by a single digit to select an idle trunk in a group of trunks or by two digits to select an idle trunk in a different group of trunks.

It is still another object of the invention to provide in the system of the type noted, an improved selector switch that may be used as a link selector, a local selector, a delay selector or as a toll selector and which is arranged to transmit flashing reverse battery supervisory signals to the toll operator whenever an all trunks busy condition is encountered during the setting of the switch.

Figure 18:
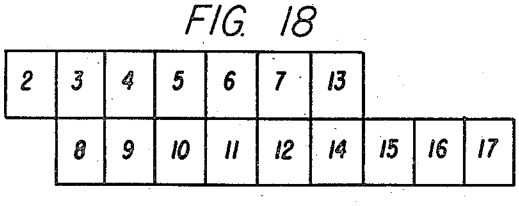

The invention, both as to its organization and method of operation, together with further objects and advantages thereof, will best be understood by reference to the specification taken in connection with the accompanying drawings, in which Fig. 1 illustrates the trunking plan and general arrangement of a toll switching system embodying the present invention; Figs. 2 to 17, inclusive, when arranged in the manner illustrated in Fig. 18, illustrate the details of a toll switching system arranged according to the trunking plan of Fig. 1 and having incorporated therein the features of the invention briefly referred to above.

Referring now to Fig. 1 of the drawings, the toll switching system illustrated therein comprises a central office 100 and a distant manual office 200. It should be understood, however, that other distant manual offices, similar to the manual office 200, may also be included in the system and that other automatic offices having automatic switching apparatus of the type provided in the central office 100 may also be included in the system. The automatic switching apparatus in the central office 100 serves local subscriber substations, including the substations A and B, and the distant manual office 200 serves a plurality of local manual subscriber substations (not shown). The two illustrated exchanges are interconnected by means of two-way ring-down toll lines, including the toll line 203, which are utilized in handling the toll traffic between the exchanges. In the central office 100 the two-way ring-down toll lines terminate in ring-down trunk circuits, such as the trunk circuit 202. Toll lines interconnecting the central office 100 and the automatic exchanges (not shown) may also be of the two-way type and may terminate in automatic trunk repeaters in the central office 100. Such repeaters may be a part of or may be connected directly to incoming toll selectors, such as the toll selector 302. These toll selectors have access to inward link selecting trunk circuits, such as the trunk circuit 360, in order to route incoming calls to idle links at the operator positions. Both the ring-down trunk circuits and the automatic trunk repeaters (not shown) are accessible by way of the banks of the selectors, including the toll selector 302 and the delay selector 1050, for the purpose of making outgoing toll calls from the central office 100.

The automatic switching apparatus provided in the central office 100 is of the well known type and includes local switching apparatus, such as the line circuit 282 and line switch 283 individual to the local subscriber lines and local selectors and connectors, such as the local selector 301 and the connector 1306. The above noted switching apparatus is provided for the purpose of completing calls from the local subscriber substations to the links, such as the link 500, at the operators switchboard and for the purpose of enabling the operators at the switchboard to complete connections to the local subscriber substations. It should be understood, however, that additional local switching apparatus (not shown) is utilized for the purpose of enabling the local subscribers to automatically extend connections to desired called substations in the central office 100.

The toll switchboard provided in the central office 100 may, for example, include 10 operator positions. Each of the positions of the switchboard may be provided, for example, with at least 5 links, including the link 500 and the link selector 700, although the number of links provided will be determined in accordance with the toll traffic. Each of the positions of the switchboard may also be arranged to handle different classes of toll calls, including inward, CLR, and TX toll calls. It should be understood, however, that each of the positions may also be arranged so that it will handle only one of the above classes of toll calls if it is desired. In the present system, however, it is contemplated that each position of the switchboard constitutes the universal position having facilities for handling each of the three classes of toll calls noted above. In order to distribute the calls to the different links at the switchboard, an allotter is provided to control, for example, 50 link selecting trunk circuits, if the customary 50 point rotary switch is employed in the allotter.

The allotter will permit only one link selecting trunk circuit to select and associate itself with a link at any given time. The possibility of two or more link selecting trunk circuits operating simultaneously and selecting and associating themselves with the same link is thus avoided.

An allotter may employ a rotary switch larger than the customary 50 point rotary switch, for example, a rotary switch of 100 points and in that event, the one allotter can control up to 100 link selecting trunk circuits.

A link selecting trunk circuit, as will hereinafter be described, would normally also employ a standard 50 point rotary switch and, thus, have access to 50 link connecting circuits. However, a link selecting trunk circuit can employ a larger rotating switch, for example, a rotary switch of 100 points and thus selecting 100 links.

Under normal operating practice it is more practical to employ the customary 50 point rotary switches for use in the link selecting trunk circuit and the allotter. In general conditions less than 50 link selecting trunk circuits will supply the capacity for 50 connecting link circuits and a separate allotter, having a capacity to dispatch 50 link selecting trunk circuits is provided for each group of 50 link connecting circuits. If, however, it is required or desirable to have more than 50 link selecting trunk circuits to have access to 50 link connecting circuits then allotters 1 and 2 are provided which are alternately controlled by the gate circuit 800 to select, one after another, the different link selecting trunk circuits, including the trunk circuits 360, 370, 401 and 402, having calls waiting thereon so that the selected link selecting trunk circuit may route the waiting call to an idle link at an available operator position. Since it has been assumed that each switchboard position is equipped with five links and that the switchboard includes ten positions, the trunking of the calls to the links at the different positions may be arranged so that a first group of fifty incoming trunks will have access to fifty of the links by way of fifty link selecting trunk circuits. The calls in this group will be distributed by the allotter 1. Additional incoming trunks may also be provided in a second group of trunks. The incoming calls in this group will be distributed to this same group of fifty links that are accessed by the first group of fifty trunks by way of corresponding link selecting trunk circuits by allotter 2. However, the link selecting trunk circuits in the second group are arranged so that they will transfer incoming calls received over the second group of trunks to the link selecting trunk circuits in the first group in response to the certain positions of the switchboard being vacated. In this manner the incoming traffic may be automatically concentrated for answering at the remaining attended positions of the switchboard by merely vacating operator positions as incoming traffic becomes lighter. The gate circuit 800 alternately renders the allotter 1 and the allotter 2 operative to select the link selecting trunk circuits in the corresponding groups having calls waiting thereon so that only one call from each group will be distributed to idle links at a time.

In order to extend toll calls received at an operator position, each position is provided with an individual impulse sender and a digit register, such as the impulse sender 1900A and the digit register 1500A, which may be connected to each of the links at the associated operator position. It is also contemplated that a common impulse sender and a common digit register be provided for use by all of the operator positions of the switchboard. The common impulse sender and digit register will only be utilized in the event that the individual sender and digit register at the different operator positions fail to operate properly. Each operator position is also provided with a keyset K1474 which is selectively controlled by the operator thereat to register in the digit register 1500A the digits of the desired called subscriber directory number or the digits designating the particular trunk group over which a toll call is to be extended to a selected distant exchange.

When a toll call is extended from the manual office 200 over the toll line 203, the toll ring-down trunk 202 is operated and controls the inward link selecting trunk circuit 360. The latter circuit, however, does not search for an idle link at one of the positions of the switchboard until the allotter 1 has operated and found the inward trunk circuit 360. This permits the trunk circuit 360 to then select an idle link, such as the link 500, and thereby route the call to one of the operator positions. If calls are waiting on the other inward trunk circuits, the allotter 1 will select such trunk circuits one after another so that they will route the waiting calls in the manner noted above.

When the call is brought into the link 500, the operator position circuit 1200 is automatically connected to the link 500 so that the operator may acknowledge the call. Thereafter, the operator actuates her keyset K1474 in order to control the digit register 1500A and the impulse sender 1900A to transmit switch controlling loop impulses by way of the link finder 1400A to the link selector 700 and subsequent switching apparatus in order to complete the toll call. After the connection is established, the operator disconnects her equipment from the link 500 and thereby renders the remaining links at her position available for use in answering other incoming toll calls.

Toll calls originated in the central office 100 by local subscribers may be routed to links at the toll operator position, for example, by way of the line circuit 282, line switch 283, local selector 301 and the CLR link selecting trunk circuit 401. The allotter 1 also functions on this type of call to cause the link selecting trunk circuit 401 to select an idle link at an operator position. The operator, in turn, may complete the connection, for example, by way of the link selector 700, the toll selector 302 and the ring-down circuit 202 to the distant manual office 200.

The same operations take place with respect to the routing of toll calls to the links at each of the positions of the switchboard. However, during the time an operator is answering and setting up a connection on one of the links at her position and also when the position is vacated by the operator thereat, the links at the associated position are automatically busied in order to prevent the routing of additional calls thereto. When certain of the positions are vacated, the second group of link selecting trunk circuits, including the CLR trunk circuit 402, are automatically controlled so that additional toll calls are transferred to certain of the link selecting trunk circuits, including the trunk circuit 401 in the first group. In this manner, the toll traffic normally received over two groups of trunks and distributed to the different links by two groups of link selecting trunk circuits will be concentrated and distributed to the links at the attended positions of the switchboard by the first group of link selecting trunk circuits. It is possible to concentrate the traffic during light load periods so that all calls may be answered at one position when all of the remaining positions of the switchboard are unattended, due to the fact that the links associated with each of the operator positions are automatically marked busy against incoming toll calls when the operator headset is removed from the position jack.

As described above, toll calls are received at the operator positions over one end of the links and are extended from the position by way of the link selectors individual to the links. However, it is possible for the operator to originate a call at her position and extend it to one subscriber over the rear end of the link 500 and to extend the call to another subscriber over the front end of the link 500. The operator converts her position into a delay or TX position when calls of this character are to be made by actuating a delay position key that prevents any incoming calls except an incoming TX trunk call from being received by the links thereat. In making a delay call, the operator will cause the delay selector allotter 1095 to select one of a plurality of delay selector link finders, such as 1090, and cause it to associate a delay selector, such as 1050, with the link 500. Thereafter, the operator connects the impulse sender 1900A by way of her common equipment 1100 and the link 500 to the delay selector 1050 and then registers the digits of the desired destination in the digit register 1500A. The impulse sender 1900A will now transmit loop impulses to the delay selector 1050 and subsequent switches in the switchtrain to complete the connection to one of the desired subscribers. Thereafter, the operator will cause the impulse sender 1900A to be associated by way of the link finder 1400A to the link selector 700. Operation of the key set K1474 will now cause the impulse sender 1900A to transmit loop impulses to the link selector 700 and subsequent switches in the switchtrain in order to complete the connection to another destination. The operator may then interconnect the two called parties through the link 500 and disconnect her position equipment 1100 from the link.

The trunking arrangement disclosed in Fig. 1 having been generally described, attention is now directed to the circuit drawings disclosed in Figs. 2 to 17, inclusive.

Figure 2:
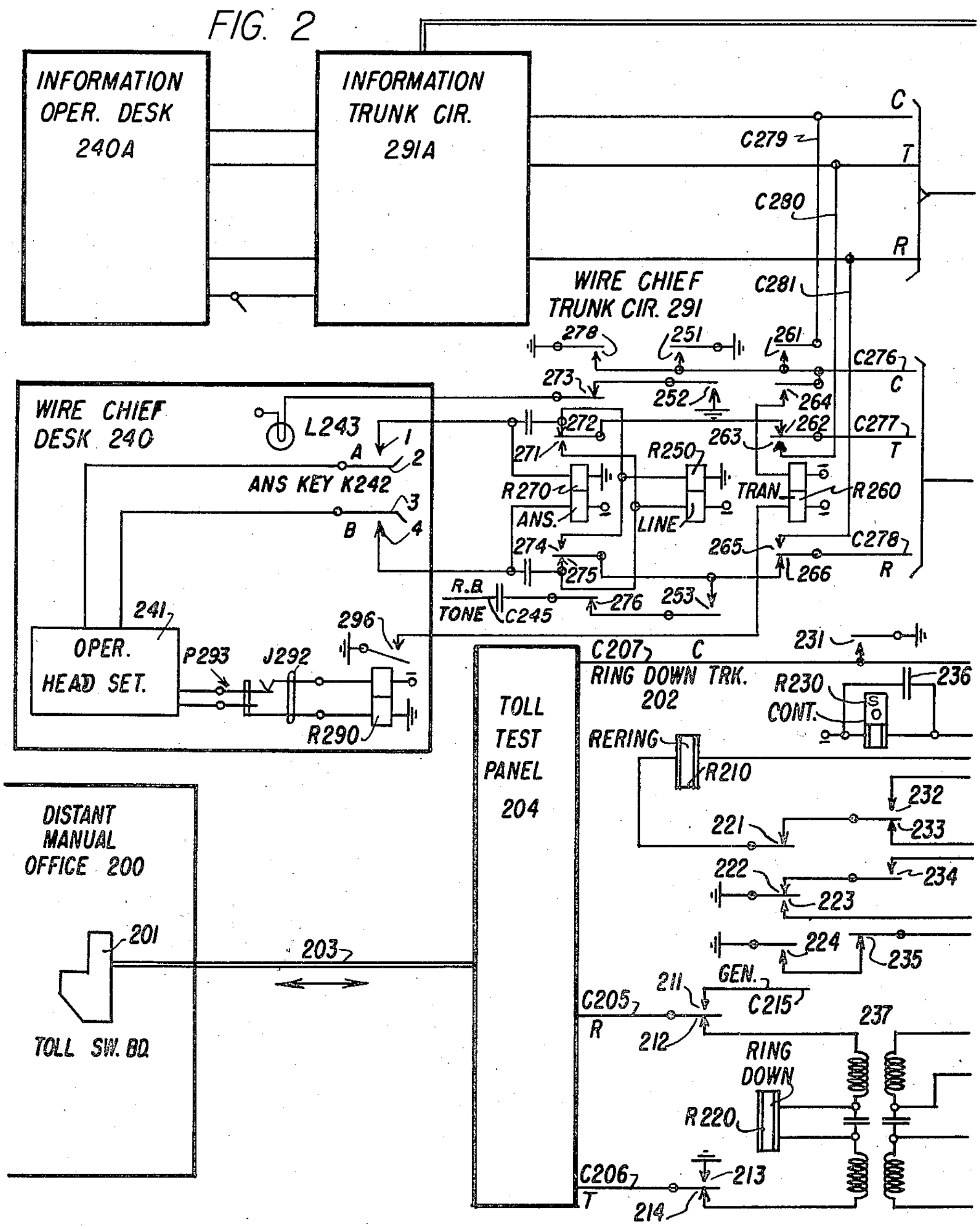
Figure 3:
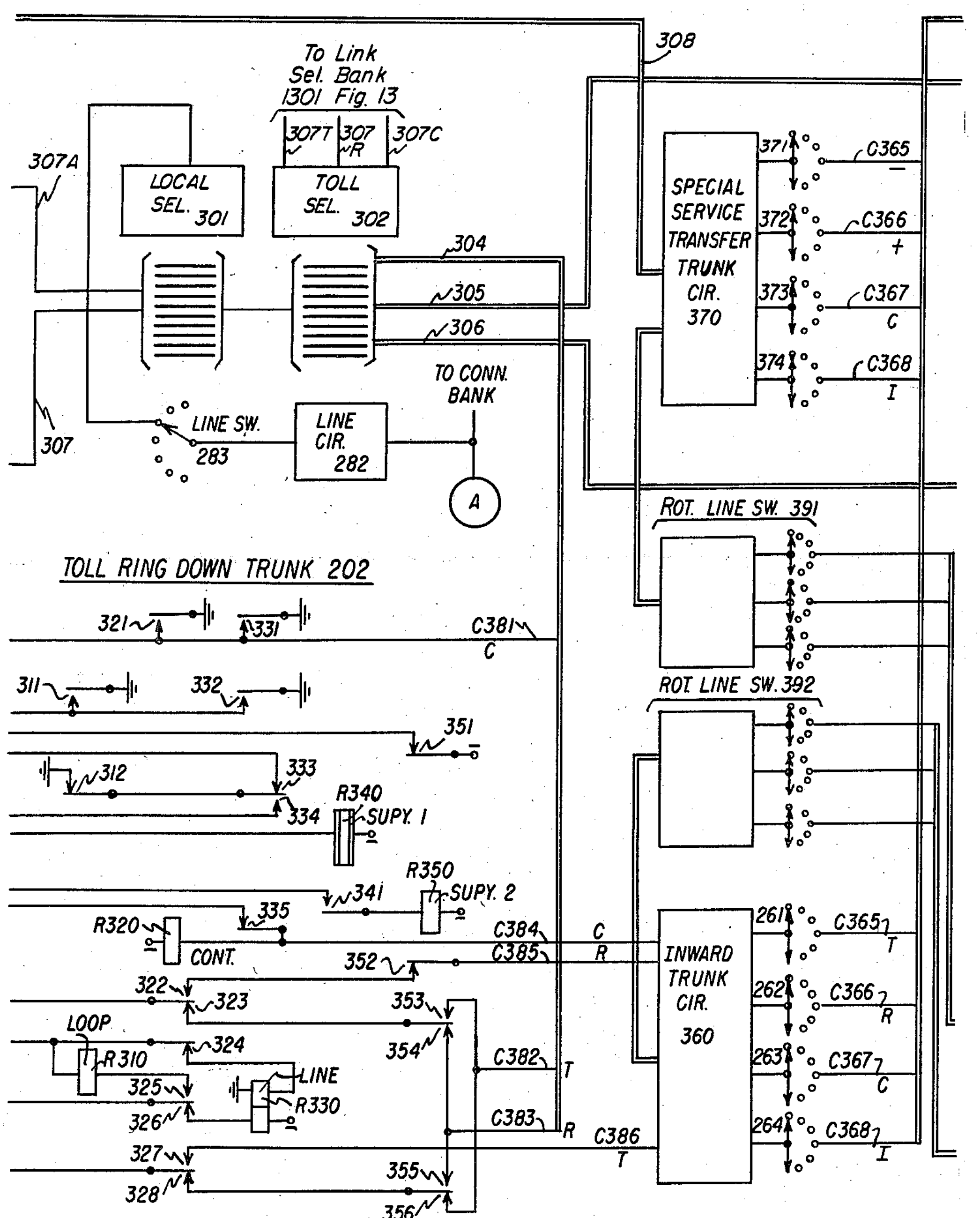

Figs. 2 and 3 disclose the toll ring-down trunk 202 which is utilized in routing incoming toll calls from the distant manual office 200 by way of the inward link selecting trunk circuit 360 to one of the idle links at one of the positions of the switchboard. This trunk circuit is also accessible by way of the banks of the toll selector 302, the link selector 700, and the delay selector 1050 and the trunk line 304 in order to route an outgoing call from the central office 100 to the distant manual office 200. The wire chief desk 240 and the information desk 240A, illustrated in the upper portion of Fig. 2, are accessible from the bank contacts of the local selector 301 and the toll selector 302 by way of the wire chief trunk circuit 291 and the information trunk circuit 291A. If the wire chief withdraws her headsets from the associated jack, the transfer relay R260 in the associated trunk circuit 291 is operated and thereby causes calls that are normally routed to the wire chief desk 240 to be transferred to the information desk 240A. If the information operator has also removed her headset, the transfer relay causes calls normally routed to this desk, as well as calls transferred thereto from the unattended wire chief desk, to be transferred by way of the trunk line 308 and the information transfer trunk circuit 370 to an idle link at one of the attended positions of the switchboard.

Figure 4:
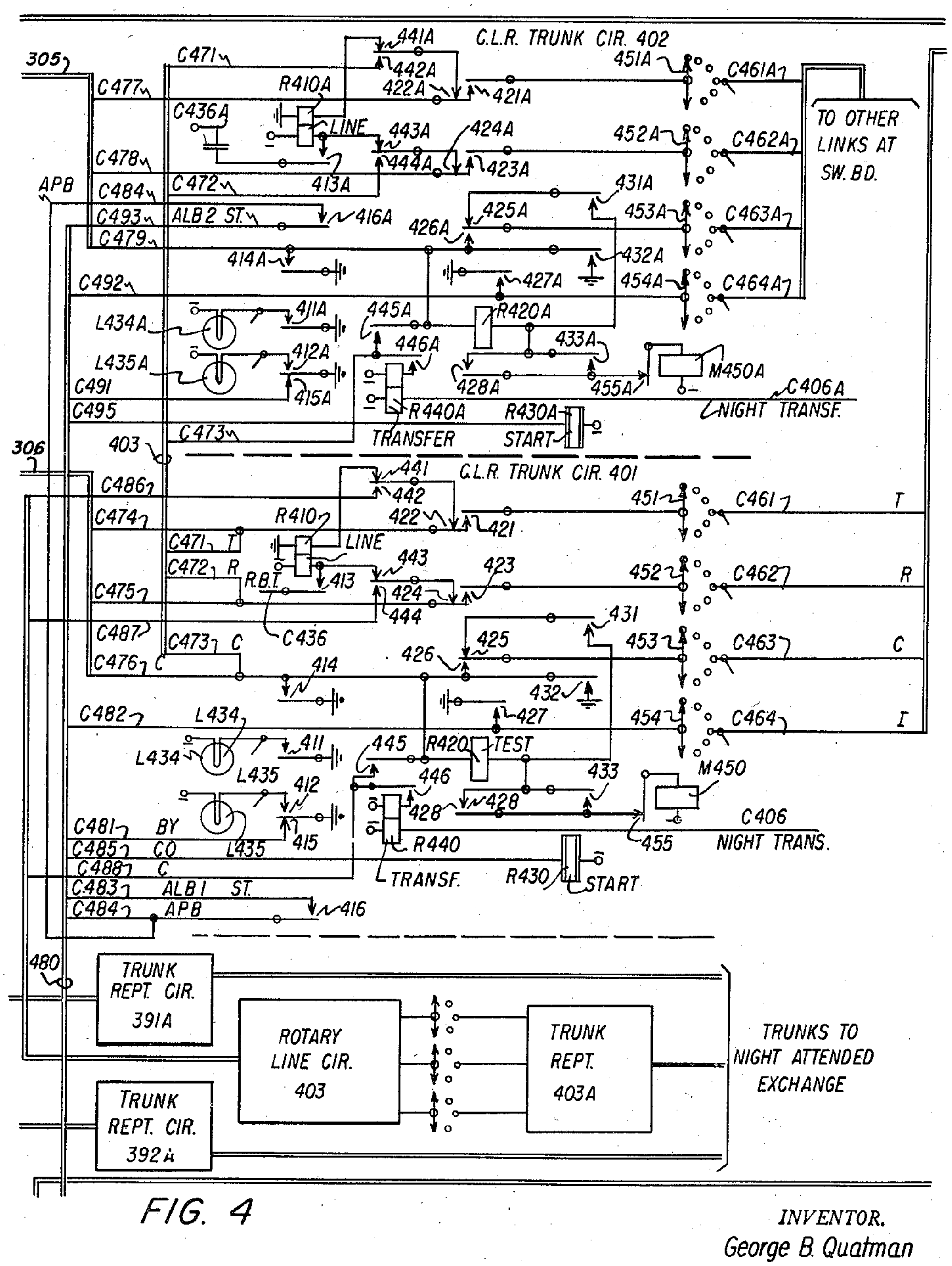
Figure 9:
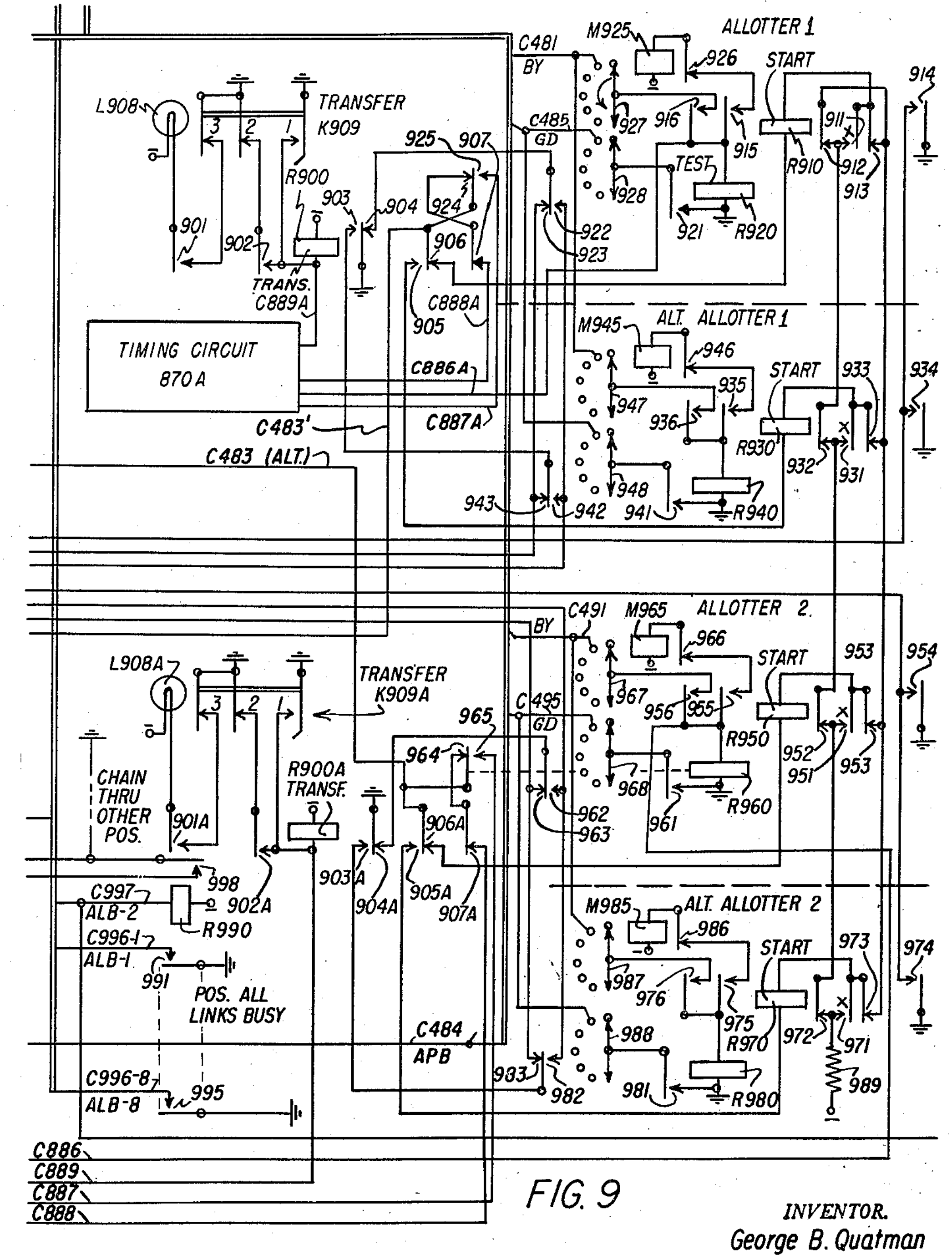

Fig. 4 discloses two CLR link selecting trunk circuits 401 and 402. The CLR trunk circuit 401 is representative of one of, for example, fifty link selecting trunk circuits in a first group having access to fifty idle links at 6 to 10 positions of the switchboard. The CLR trunk circuit 402 is representative of one of, for example, ten or more link selecting trunk circuits in a second group having access to up to 50 additional idle links at 8 to 10 additional positions of the switchboard, or if there are less links than trunks this second group would have access to the same links as the first groups. The CLR trunk circuit 401 is controlled by the allotter 1 illustrated in Fig. 9 so that it will select an idle link, whereas, the CLR trunk circuit 402 is controlled by the allotter 2 illustrated in Fig. 9 to select an idle link. When there are less trunks used than links, the gate circuit shown in Fig. 9 is not used. The CLR trunk circuit 401 and 402, the information transfer trunk circuit 370 and the inward trunk circuit 360 are exactly the same and are provided with a transfer relay for the purpose of automatically transferring calls received thereon when certain of the operator positions are vacated. When this occurs, incoming calls received on the CLR trunk circuit 402 are transferred to the CLR trunk circuit 401 and routed therefrom to an idle link at one of the occupied positions of the switchboard. When all of the positions are vacated all calls will be automatically transferred to another exchange having an attended switchboard.

Figure 5:
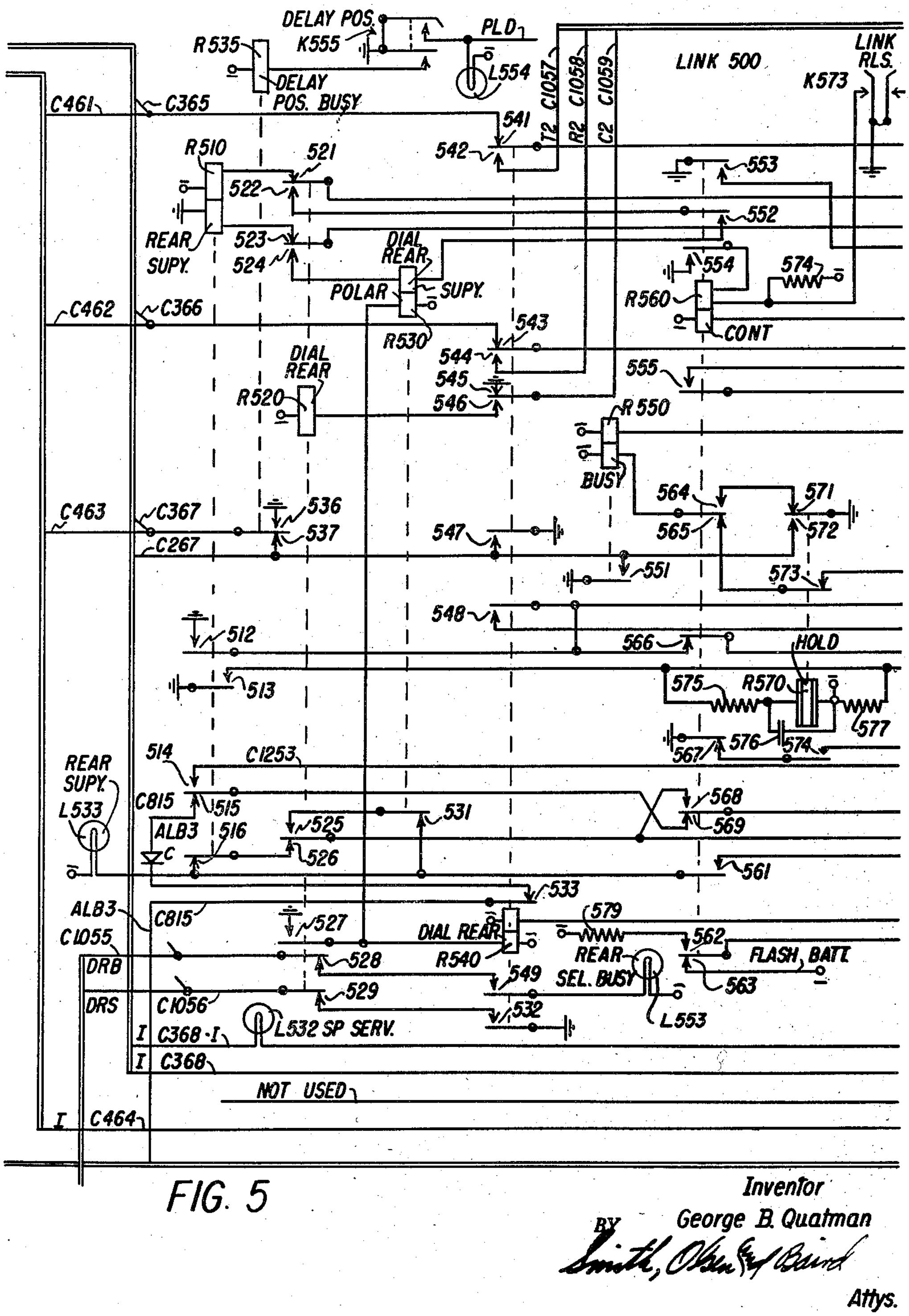
Figure 6:
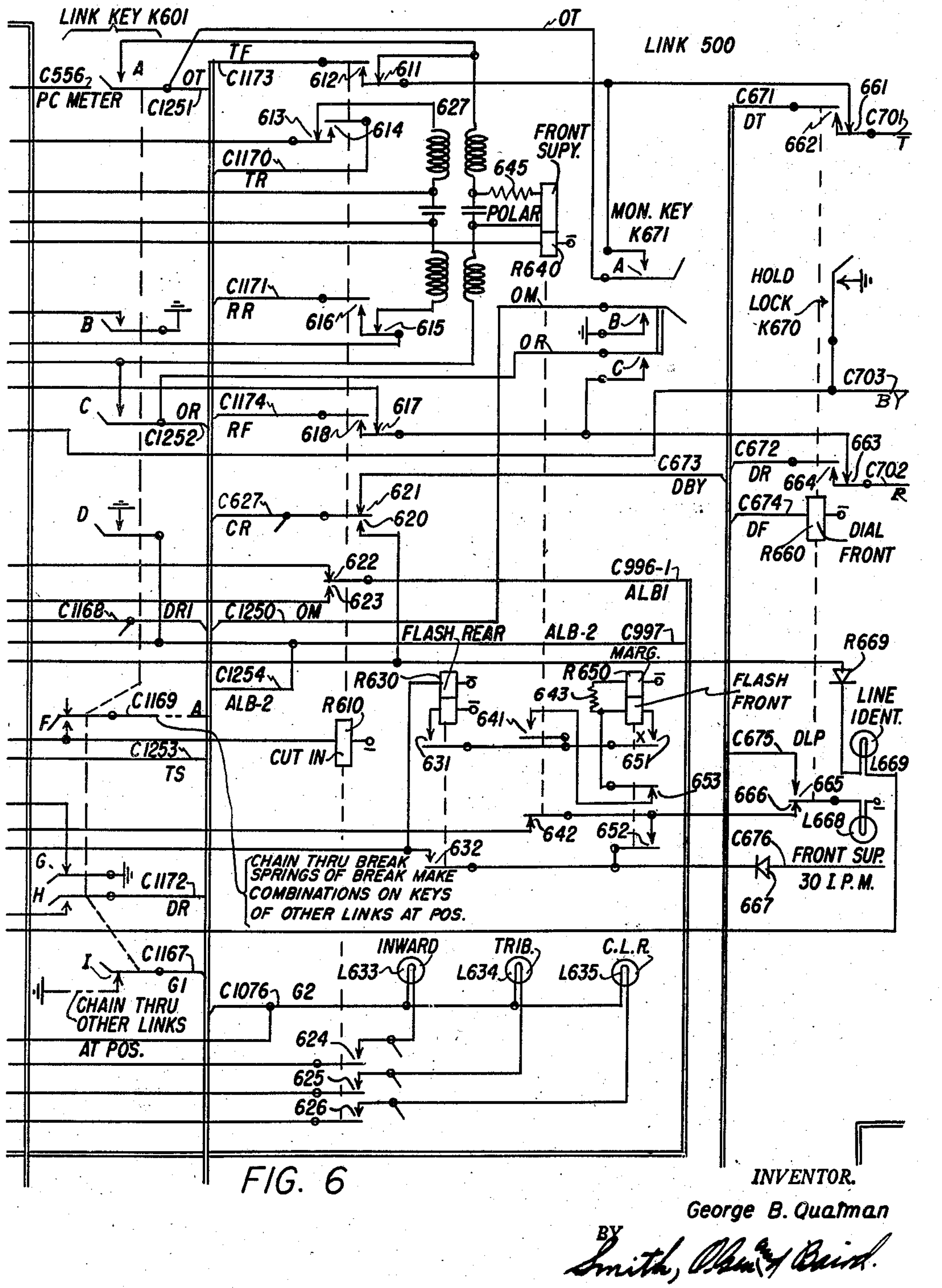

Figs. 5 and 6 disclose the link 500 provided at one of the operator positions of the switchboard. This circuit is one of a plurality of such circuits provided at each operator position to enable the operators thereat to receive calls and also to extend calls by way of the individually associated link selector 700.

Figure 7:
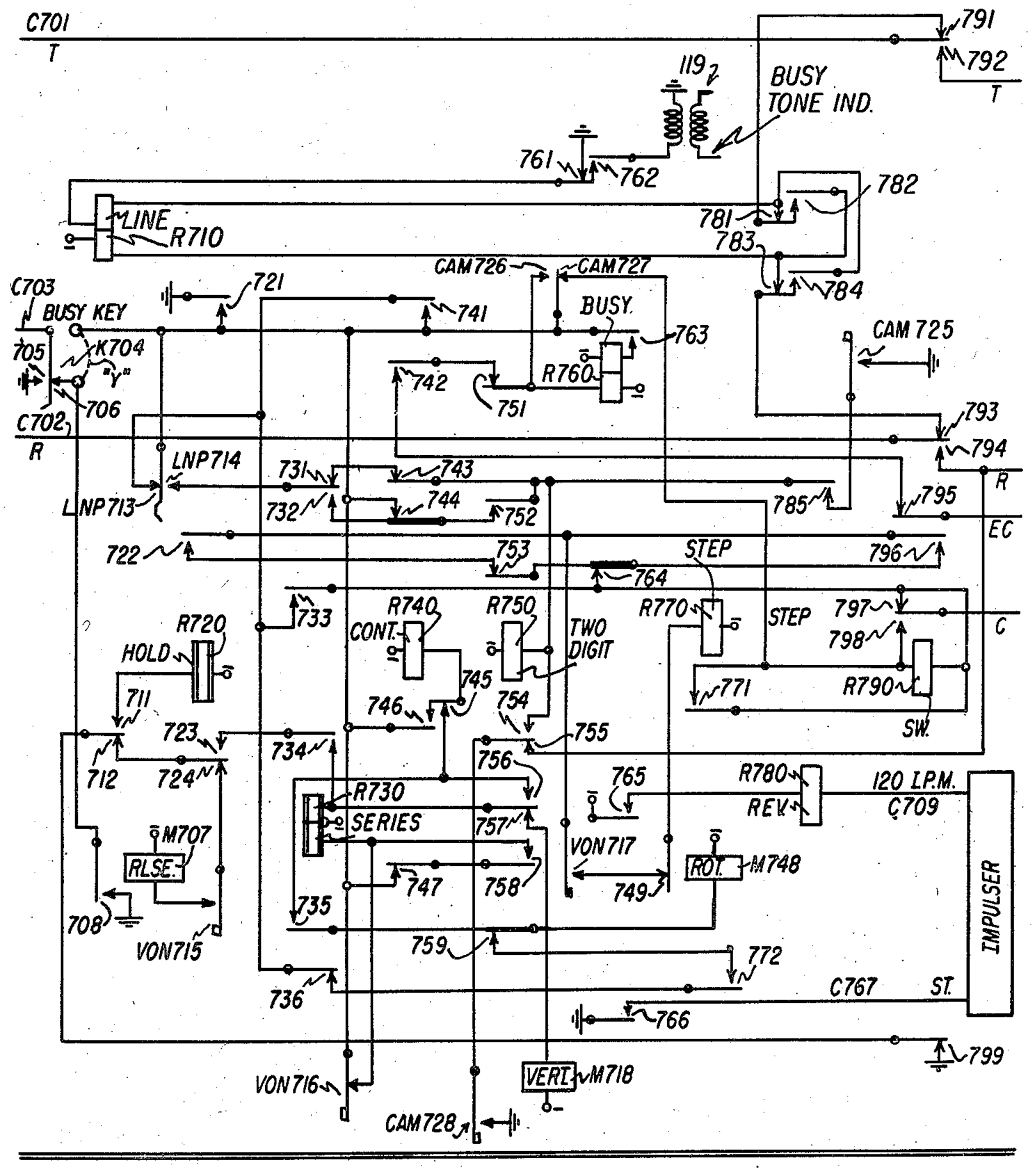
Figure 13:
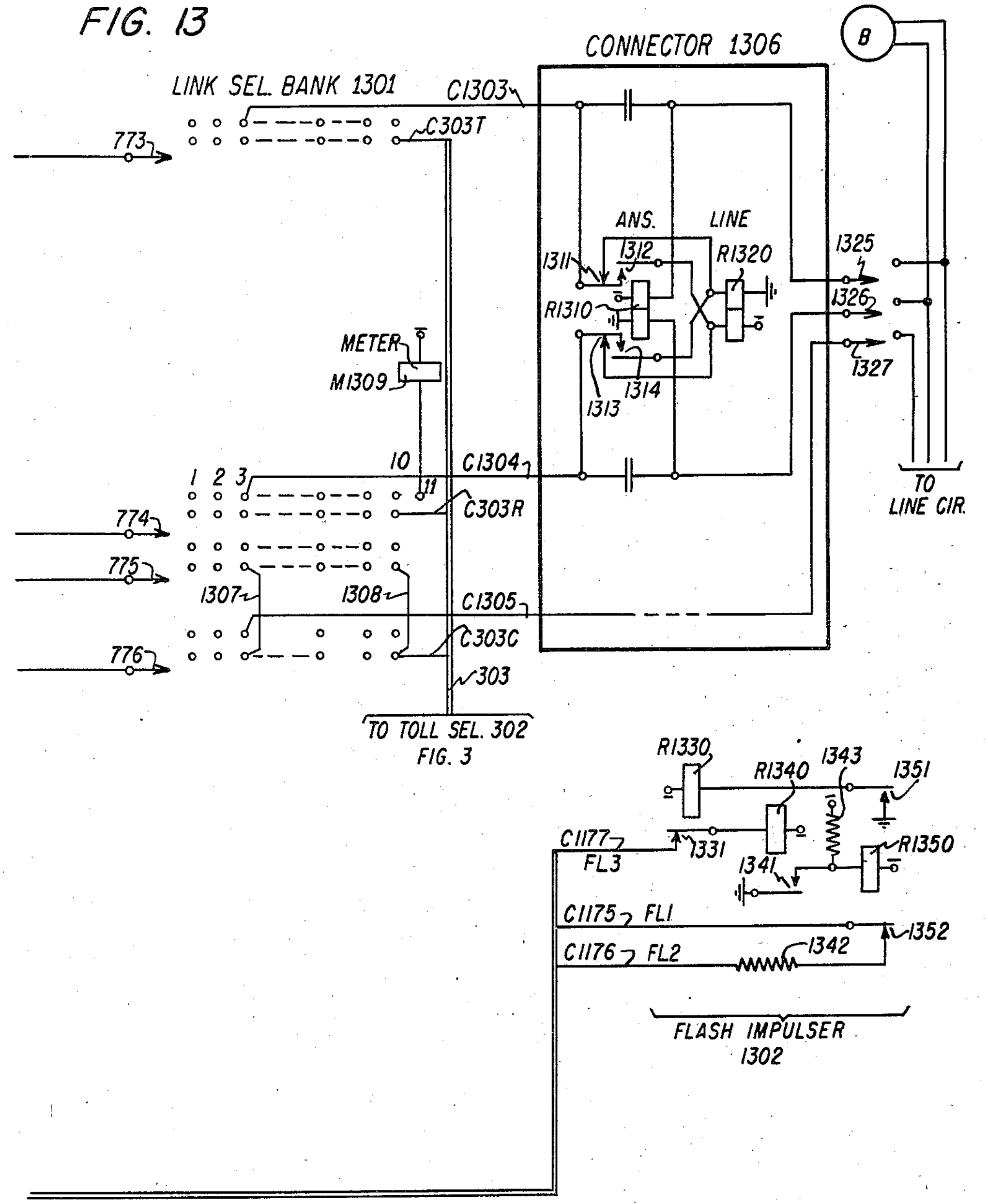

Fig. 7 discloses the link selector 700 individually associated with the link 500 and which is controllable by loop impulses transmitted from the impulse sender 1900A to extend connections from the operator position. This toll selector is of the Strowger type having a plurality of wipers and associated set of bank contacts 1301 (Fig. 13). The selector 700 is arranged so that in response to certain first digits, it will raise its wiper to corresponding levels and then automatically rotate the wipers over the selected level to search for a set of contacts terminating an idle trunk line. On certain other levels, the selector operates as a two-digit switch wherein the first digit will raise the wipers to a level corresponding to the first digit and will rotate its wipers into the selected level a number of steps corresponding to the number of impulses of the second digit. Thereafter, the wipers will automatically rotate to select an idle trunk. This selector is also provided with a reversing relay R780 which is arranged to automatically transmit reverse battery supervisory signals back to the link 500 when an all-trunks-busy condition is encountered during either the single digit operation or the two-digit operation of the switch.

Figure 8:
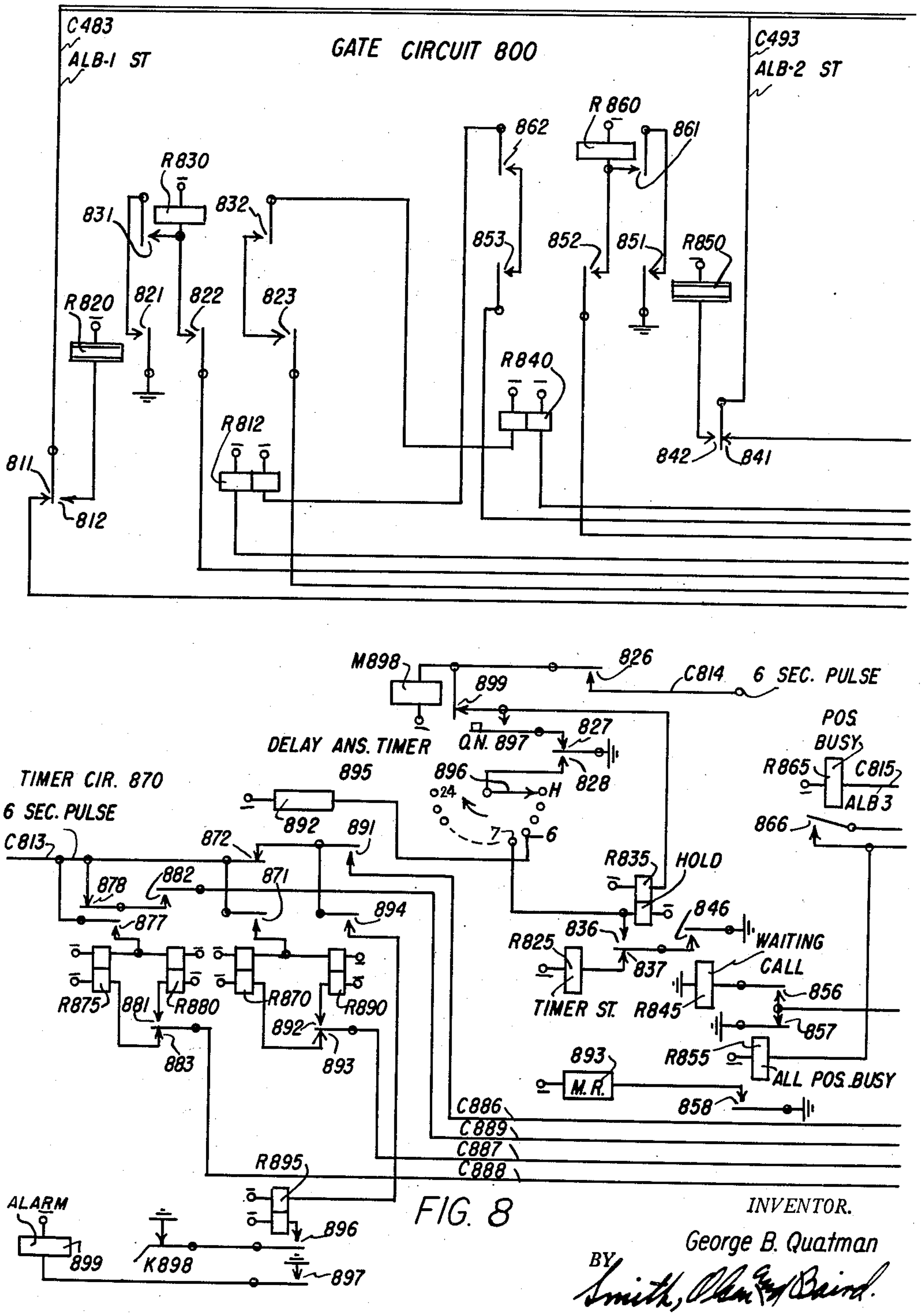

Fig. 8 discloses a gate circuit which is arranged to select either the allotter 1 or the alloter 2 of Fig. 9 in accordance with the waiting calls on the two groups of link selecting trunk circuits, including respectively the link selecting trunk circuits 401 and 402. This gate circuit is arranged so that the allotters are alternately selected for use as long as calls are waiting in the previously noted two groups of the trunk circuits and will control one of the allotters successively if calls are waiting to be answered in one of the groups of trunk circuits. Fig. 9 also discloses a timing circuit 870 which automatically connects up the alternate allotter 2 if the main allotter 2 fails to operate properly within a predetermined elapsed time interval. Also, Fig. 9 discloses a delay answer timer 895 which is arranged to indicate the number of times an incoming call has been waiting to be answered for more than a predetermined elapsed time interval.

The allotter 1 and the alternate allotter 1 have access, respectively, by way of the associated bank contacts to the link selecting trunk circuits including the CLR trunk circuit 401 and the allotter 2 and alternate allotter 2 have access, respectively, by way of the associated bank contacts to link selecting trunk circuits including the CLR trunk circuit 402. Also, Fig. 9 schematically illustrates the timing circuit 870A, which is exactly the same as the timing circuit 870A previously described, and which is arranged to connect up the alternate allotter 1 whenever the main allotter 1 fails to operate properly within a predetermined elapsed time interval. Fig. 9 also discloses the transfer keys K909 and K909A which are operative to preferentially select the alternate allotters 1 and 2.

Figure 10:
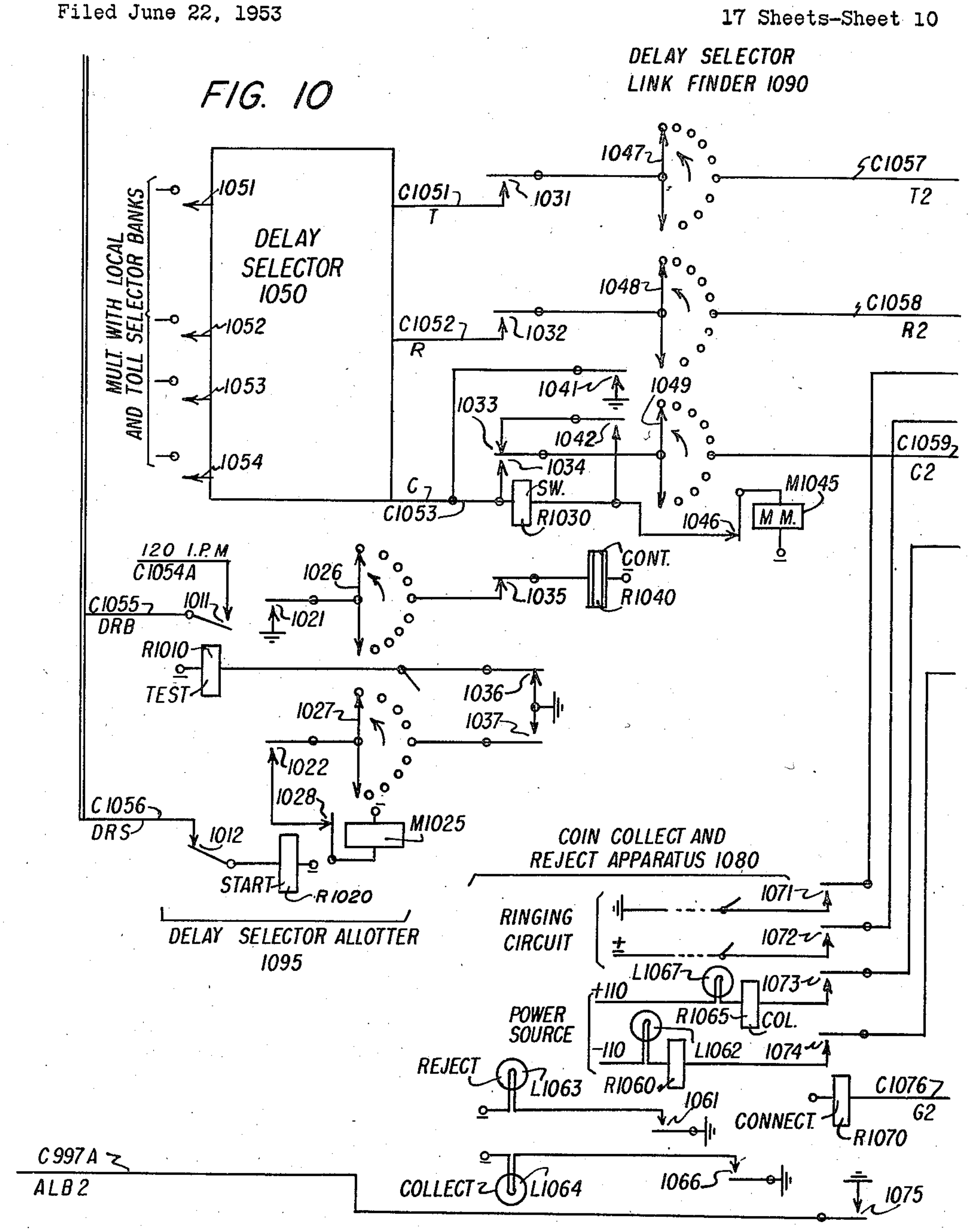

Fig. 10 discloses the delay selector allotter 1095 and the delay selector link finder 1090 which are selectively controlled whenever the operator desires to originate a delay call. The delay selector allotter 1095 automatically selects an idle one of the delay selector link finders 1095 and the latter finder, by means of its wipers, connects the associated idle delay selector 1050 to the link 500 at the operator position which has been selected by the operator for the purpose of originating the delay call. The delay selector 1050 has been schematically illustrated, but it should be understood that it is exactly the same as link selector 700 illustrated in Fig 7. The wipers 1051 to 1054, inclusive, of the delay selector 1050 have access by way of the associated bank contacts to the same trunk lines and local switching apparatus as the local selector 301, the toll selector 302, and the link selector 700. Fig. 10 also discloses the coin collect and reject apparatus 1080 which is utilized in controlling the selection and rejection of deposit coins at paystations.

Figure 11:
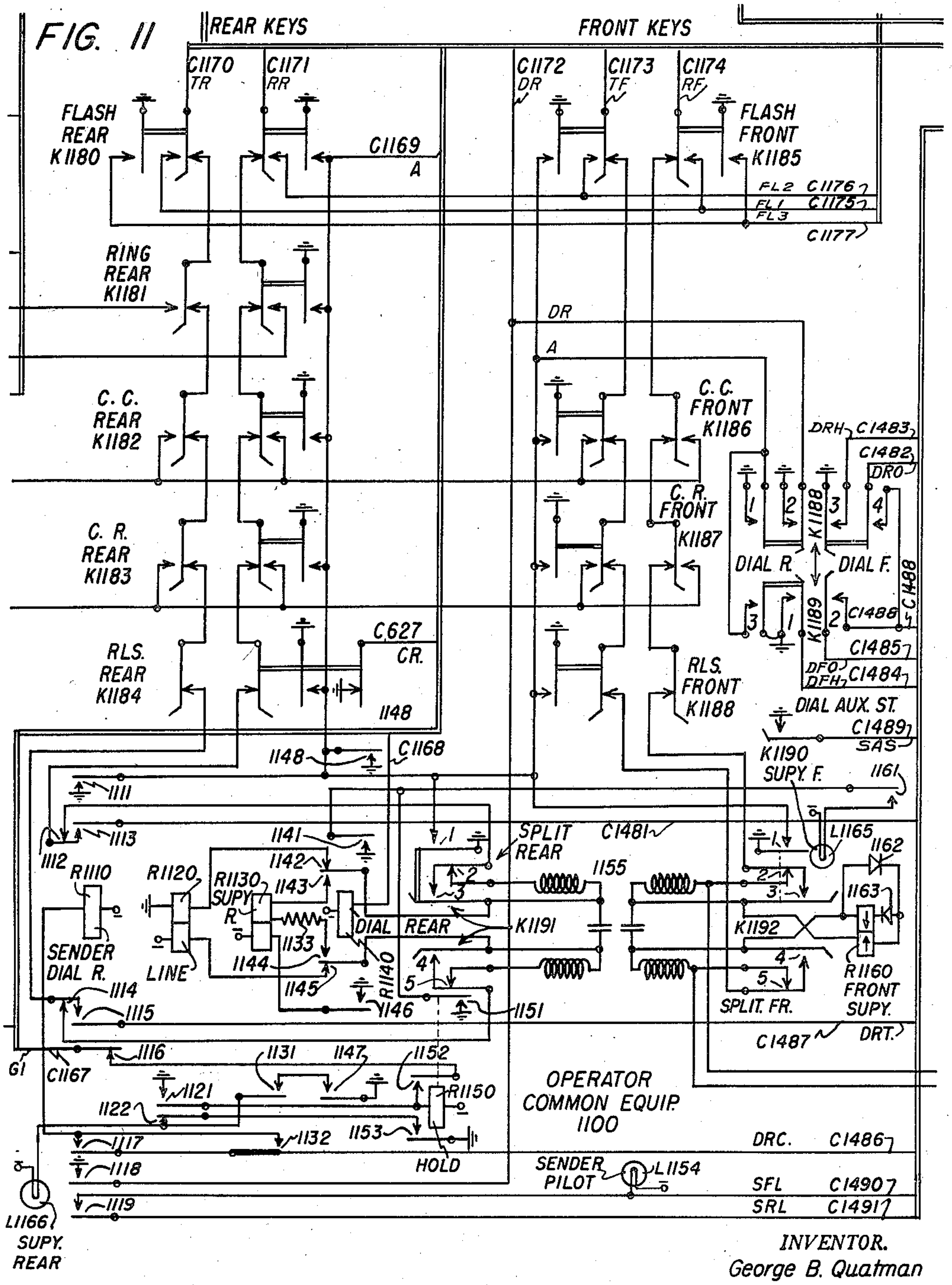

Fig. 11 discloses the operators common equipment 1100 including the various keys thereat for performing the necessary controls in connection with each call.

Figure 12:
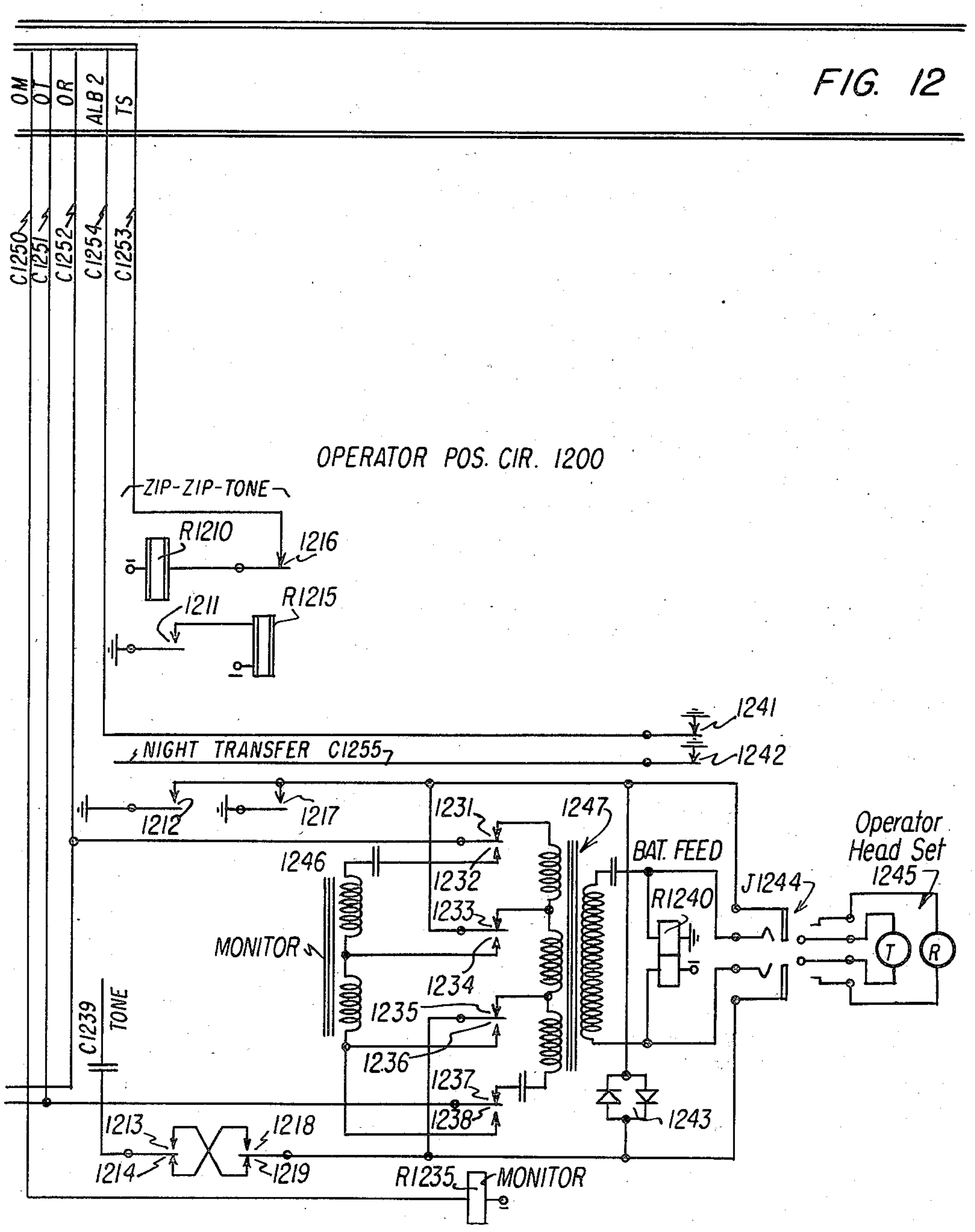

Fig. 12 discloses the operators position circuit 1200, including the operators headset 1245 and the zip-zip tone relays. The zip-zip tone relay audibly signals the operator whenever a call is received on the link at her position. The operator headset 1245 is normally bridged across the talking conductors of the link whenever the link key K601 is actuated or whenever the monitoring key K671 is operated.

Fig. 13 schematically illustrates one of the local connectors, including the connector 1306, provided in the central office 100. The connector 1306 is of the well known Strowger type having a plurality of wipers which are operative in a vertical direction and in a rotary direction to select the bank contacts terminating a particular called subscriber line. This connector is arranged for loop pulsing operation and it is also arranged so that it will transmit a reverse battery supervisory signal when the call extended to a subscriber line is answered.

Figure 14:
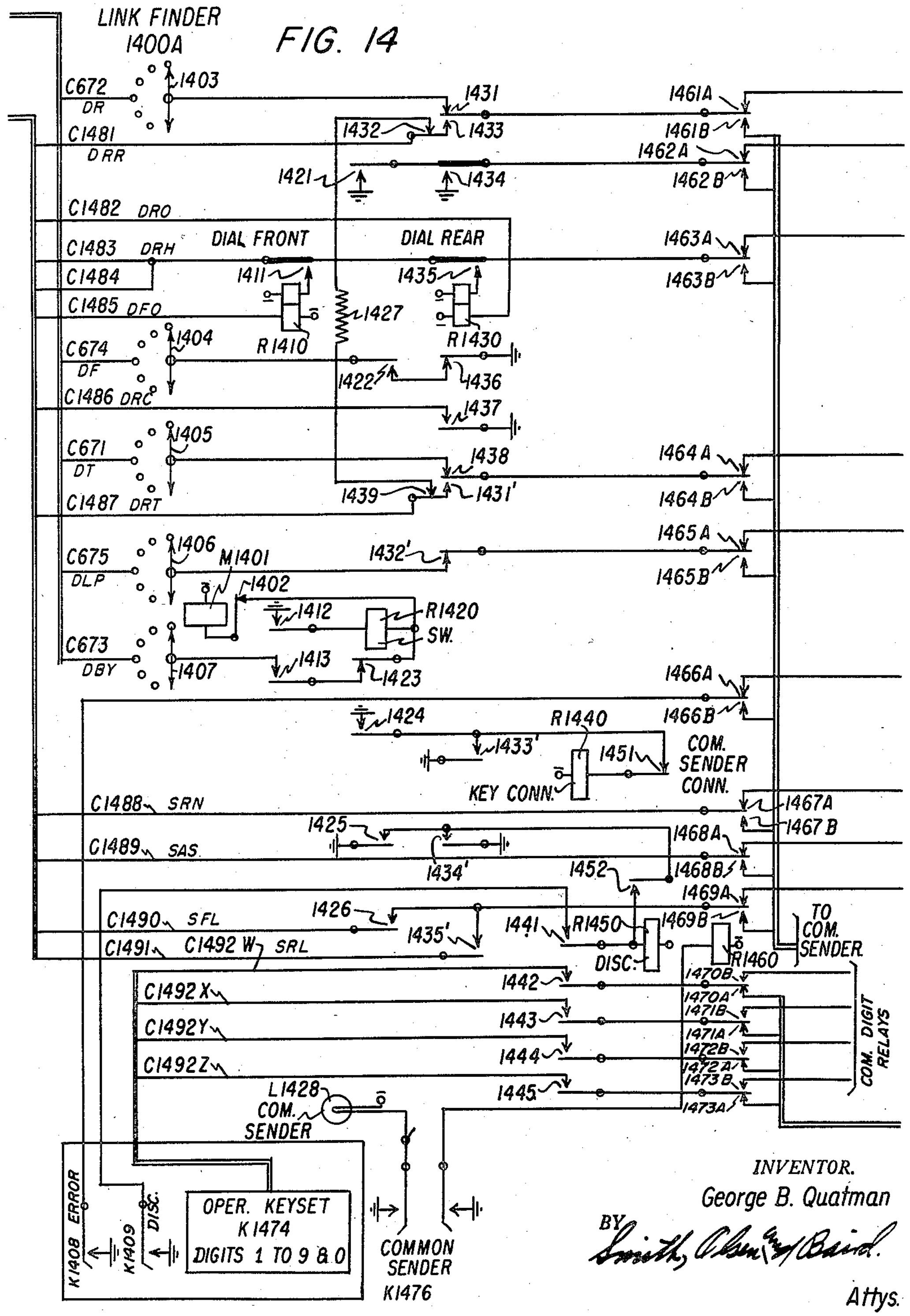

Fig. 14 discloses the link finder 1400A for associating the impulse sender 1900A with any one of the links and associated selectors, including the link 500 and the link selector 700 at the operator position. The link finder 1400 also includes a dial rear relay R1430 which is provided to connect the impulse sender 1900A by way of the common position equipment 1100 to the rear of the link 500 whenever the link is being utilized to set up a delay call from the operator position. This figure also schematically illustrates the operator keyset K1474 for registering in the digit register 1500A the various digits to be transmitted by the impulse sender 1900A. The digit register 1500A (schematically illustrated in Fig. 19) may be, for example, of the type disclosed in Fig. 18 of the Crocker Patent No. 2,167,710 or in Figs. 33 and 34 of the Molnar Patent No. 2,361,313.

Figure 15:
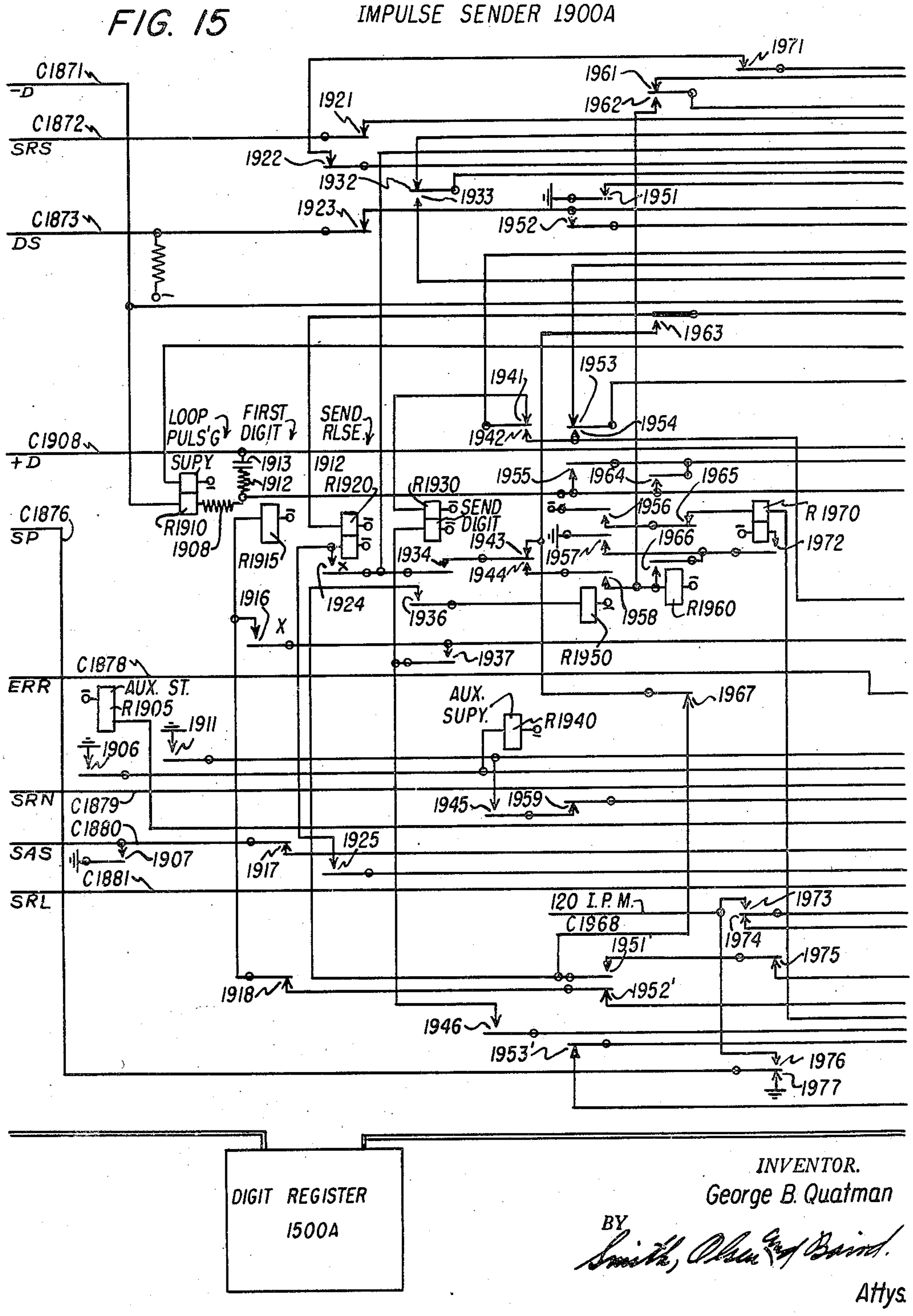
Figure 16:
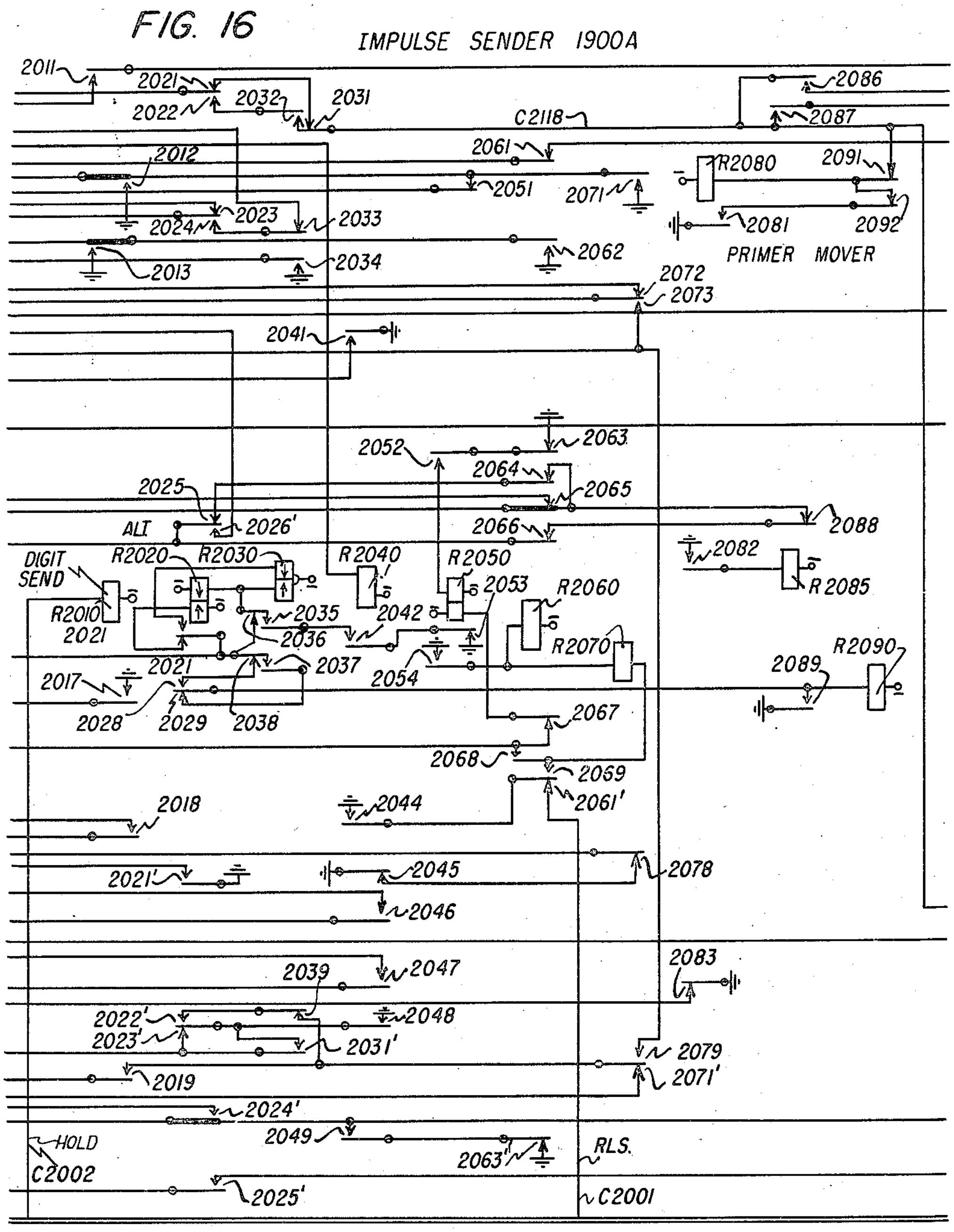
Figure 17:
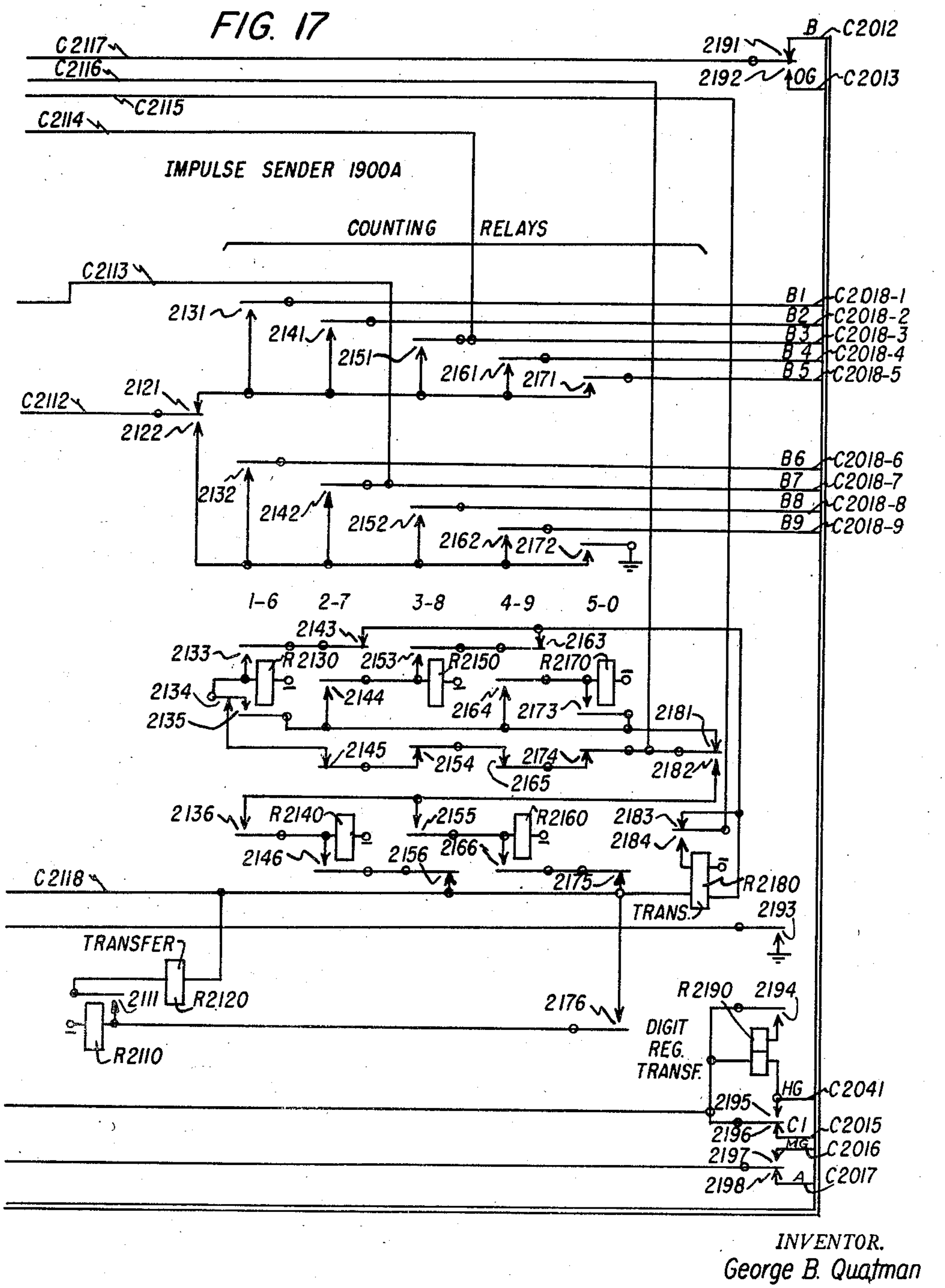

Figs. 15, 16 and 17 disclose the impulse sender 1900A which is common to all of the links at the operator position. The impulse sender may be automatically associated with the link selector 700 on the front end of the link 500 or in the case of a delay call, it may be automatically connected through the operators common equipment 1100 and the rear end of the connected link to the delay selector 1050. This impulse sender is utilized to transmit loop impulses to the automatic switching apparatus to set up connections in accordance with the digits registered in the digit register 1500A.

Fig. 18 is a layout drawing showing the manner in which Figs. 2 to 17, inclusive, of the drawings should be arranged to illustrate the toll switching telephone system.

A detailed description of the toll telephone switching system will now be given.

*CLR call from the subscriber at substation A in the exchange to the toll operator*

In order to describe the manner in which calls originated in the central office 100 are extended to one of the operator positions at the toll switchboard thereat, it will be assumed that the subscriber at the substation A desires to extend a CLR connection. Referring to Fig. 3, it will be seen that when the subscriber at substation A removes his receiver, the schematically illustrated line circuit 282 and line switch 283 cooperate in the well known manner to associate the calling subscriber line with the local selector 301. As illustrated, the line switch 283 is of the rotary-type which automatically actuates the wiper set to search for an idle local selector in response to the initiation of a call by the subscriber at substation A. Although only one local selector has been illustrated, it should be understood, that several groups of selectors, including first, second and third selectors may be employed, depending upon the size of the exchange and the traffic conditions. In response to the seizure thereof, the local selector 301 will transmit the usual dial tone signal to the calling subscriber to indicate that dialing of the operator number may be started. This selector may, for example, be of the type illustrated in Fig. 7. In the present arrangement the trunk lines extending to the links at the different positions of the toll switchboard terminate, for example, in the fourth level of the local selector 301 and since this selector is of the vertical-rotary type, at least ten trunks may be terminated in the fourth level.

If the toll switchboard includes ten operator positions with five links associated with each position, a first group of at least fifty trunk lines may be provided having access to the different links at the different operator positions by way of link selecting trunk circuit, such as the CLR trunk circuit 401. However, as previously pointed out, the links at the different positions of the switchboard may be used for different classes of toll calls and in accordance with the usual practice, they may also be used for various special service calls. Accordingly, it is the usual practice to group the local selectors, including the selector 301, into several groups so that each group has access to different link selecting trunk circuits. The ten trunk lines, however, terminating in the fourth level of the banks accessible to the group of selectors, including the selector 301, will have access by way of the individually associated link selecting trunk circuits to all of the links at each of the ten operator positions. On large installations the trunks can easily be arranged to select one link in each position if 50 positions are employed.

In a system employing more than 50 links with less than 50 link selecting trunk circuits for each group of 50 links, allotter 2 and alternate allotter 2 would be used to allocate a second group of link selecting trunk circuits to the second group of 50 links and the gate circuit 800 would not be employed.

Likewise, if a third group of 50 links were used, a third allotter and alternate allotter would be employed, and the link selector trunk circuit divided to a third group and so on indefinitely.

As the operators' positions are vacated, as hereinbefore stated, the link selecting trunk circuits are automatically transferred to another group of link selecting trunk circuits that will have access to other links at occupied positions.

If three or more groups of 50 link circuits are employed, when, for example, operator positions in the third or fourth group vacate their positions, a predetermined percentage of the link selecting trunk circuits being allocated to these links, the link selecting trunk circuits will automatically be transferred to the second group of 50 link circuits and when the operator positions of the second group are vacated, these trunks will further automatically be transferred to the first group of 50 link circuits, and when operator positions in the first group vacate their positions, the calls from all link selecting trunk circuits of all groups will now be automatically transferred to the remaining links which could be provided at one night service position having five links, and should this operator abandon this last position, the calls from the link selecting trunk circuits will automatically be transferred to a predetermined attended office in another city.

As the operators return to duty and reoccupy the various positions, the calls from these link selecting trunk circuits will automatically restore to distribution to all links and all positions. Should the link selecting trunk circuits be in use at the time this restoration occurs, the individual link selecting trunk circuit in use will remain with the operator having control over the call until the call is completed after which it will automatically restore to its allocation of distribution.

The calling subscriber at substation A upon receiving the dial tone signal, dials the toll operator number, the last digit of which is the digit 4. The dialing of the digit 4 controls the local selector 301 to raise its wipers in a vertical direction in the well known manner to the fourth level of the associated contact banks. Thereafter, the wipers automatically rotate over the contacts of the fourth level to search for an idle trunk line, such as the trunk line 306, terminating in an idle CLR trunk circuit, such as the CLR trunk circuit 401.

In the present description, it will be assumed that the selector 301 selects the idle CLR trunk circuit 401 (Fig. 4) by way of the conductors C474 to C476 of the trunk line 306. The CLR trunk circuit 401 is marked idle in the banks of the local selector 301 by an absence of ground potential on the C conductor C476. Accordingly, when the selector 301 seizes the CLR trunk circuit 401, a loop circuit including the calling subscriber line, the line circuit 282, the line switch 283, the local selector 301, the tip and ring conductors C474 and C475 of the trunk line 306, the contacts 422 and 424, the upper and lower windings of the line relay R410 and ground and battery, respectively, is completed for operating the line relay R410. As soon as the line relay R410 operates, it completes, at its contacts 414, a circuit for returning ground potential over the C conductor C476 to the local selector 301, the line switch 283 and the line circuit 282 in order to retain the last mentioned apparatus in their operated positions and to mark the CLR trunk circuit 401 busy to other local selectors having access thereto.

As a further result of the operation of the line relay

R410, at its contacts 413, it connects the ring back tone conductor C436 to the circuit including the lower winding of the relay R410 in order to transmit a ring back tone signal to the calling subscriber and thus indicate that the toll operator is being signaled. As a further result of the operation of the line relay R410, at its contacts 411, it completes an obvious circuit for illuminating the pilot lamp L434. A pilot lamp, such as L434, is provided at all of the positions of the switchboard. Each of the above noted lamps are illuminated to indicate to the operators at the different positions that a CLR call is waiting to be answered. At the contacts 412, the relay R410 completes an obvious circuit for illuminating the pilot lamp L435 to indicate, to the exchange supervisor that a CLR call is unanswered. At the contacts 415, the relay R410 removes a busy marking ground potential from the BY conductor C481 in the cable C480 extending to the banks of the allotter 1 and the alternate allotter 1 illustrated in Fig. 9. At its contacts 416, the relay R410 completes a circuit, traced hereinafter, for initiating operation of either the allotter 1 or the alternate allotter 1 depending upon which one of the two allotters is in service at the time the circuit is completed.

Referring now to Fig. 9 it will be seen that the two regular allotters 1 and 2 are each provided with an alternate allotter. The circuits are arranged so that if any fault occurs in the normal operation of the allotter 1 or 2, the timing circuit 870A or the timing circuit 870 will automatically function after a predetermined delay period to connect up the associated alternate allotter. Furthermore, the gate circuit 800 (Fig. 8) (used only when there are more trunks than links in a group) is arranged to control the respective allotters 1 and 2 so that only one call at a time may be distributed to an idle link at an operator position. The operations of the gate circuit 800 and the allotters 1 and 2 will be described hereinafter.

As long as at least one position of the switchboard is available for use and links thereat are also available, the all position busy relay R855 (Fig. 8) remains in its restored position. At its contacts 857, the relay R855 normally applies ground potential to the APB conductor C484 which is multiply connected to all of the link selecting trunk circuits having access to links at the operator positions. As soon as the contacts 416 are closed, incident to the operation of relay R410, ground potential on the APB conductor C484 is extended by way of the ALB–1 start conductor C483 extending to Fig. 8, contacts 811 and 906, the winding of the allotter 1, start relay R910, contacts 913, 912, 932, 952, and 972 and the resistor 989, to battery. The relay R910 now operates to first close its X contacts 911, before any of the remaining contacts on the relay are actuated, in order to lock itself in its operated position over a circuit which is independent of its contacts 913 and 912. Shortly after the contacts 911 are closed by the operation of relay R910, the remaining contacts of the relay are actuated. At this time the contacts 912 and 913 are opened in order to prevent the completion of a start circuit for any one of the start relays R930, R950 or R970.

As a further result of the operation of the relay R910 it completes, at its contacts 915 and 916, a circuit for connecting the test relay R920 to the magnet M925 and to the test wiper 927. All of the link selecting trunk circuits have BY conductors, such as the conductor C481, terminating in the associated contact banks will have ground potential thereon provided the associated trunk circuit is in an idle condition. Ground potential will be removed therefrom if there is a call waiting on the associated trunk circuit. Therefore, if the wipers 927 and 928 of the allotter 1 are in engagement with contacts terminating an idle trunk circuit, the ground potential on the corresponding BY contact will complete a circuit including the wiper 927, contacts 916, 915 and 926 for operating the magnet M925. This ground potential also short-circuits the winding of the test relay R920 in order to prevent its operation. The magnet M925 operates and interrupts its own circuit, at its contacts 926, in order to restore the magnet to normal. Restoration of the magnet M925 advances the wipers 927 and 928 one step in a counterclockwise direction to test the next BY conductor. The above traced circuit will be recompleted for advancing the wipers an additional step if ground potential is encountered by the wiper 927. As soon as the wiper 927 engages the contact terminating the ungrounded BY conductor C481, the operating circuit for the magnet M925 is interrupted and the series circuit including the test relay R920 and the magnet M925 is completed in order to operate the relay R920. Due to the high resistance of the winding of relay R920, the magnet M925 does not operate.

Before describing the circuit controlled by the contacts of the operated relay R920, it should be noted that, at the contacts 914, the start relay R910 also completes a circuit for operating the relay R840 in the gate circuit 800 thereby to prepare the gate circuit to utilize the allotter 2 in distributing the next waiting call in the second group of link selecting trunk circuits. As illustrated in the drawings, the allotter 1 is utilized to control the distribution of calls on 50 link selecting trunk circuits, including the trunk circuit 401, to links associated with ten operator positions each having, for example, five links. The allotter 2, however, is utilized to distribute calls waiting in the link selecting trunk circuits of the second group to the same group of links provided at the operator positions. Thus, the link selecting trunk circuits are actually divided into two separate groups. One group is provided with a first allotter for distributing calls in the first group to certain of the links at the ten operator positions and the other group is provided with a second allotter for distributing calls in the second group to the same links at the ten operator positions. The gate circuit 800 is arranged so that one waiting call will be distributed from one group of trunk circuits and then another waiting call will be distributed from the second group of trunk circuits and if calls are waiting to be distributed in only one of the groups, then the calls in that group will be distribuetd one after another.

As soon as the test relay R920 operates, as noted above, it applies ground potential by way of its contacts 921, the wiper 928, G0 conductor C485 extending to Fig. 4 and the winding of the start relay R430, to battery. At its contacts 431 and 433, the relay R430 upon operating connects the magnet M450 to the C wiper 453 and it also connects the magnet M450, by way of the contacts 433 and the winding of the test relay R420, to ground at contacts 414. Since the wipers 451 to 454, inclusive, have access to idle links at different operator positions, the magnet M450 will control the wipers to select a link at one of the operator positions which is marked idle by an absence of ground potential on the C conductor C463 accessible to the wiper 453. It will be assumed, however, that the wiper 453 is in engagement with a contact terminating a grounded C conductor and, consequently, a circuit will be completed by way of the contacts 425, 431, 433 and 455 for operating the magnet M450 and for short-circuiting the test relay R420. The magnet M450 operates and interrupts its operating circuit, at its contacts 455. The magnet now restores to normal and advances its wipers one step in a clockwise direction. The above described stepping of the wipers 451 to 454, inclusive, will be controlled by the magnet M450 until an ungrounded C conductor is encountered by the wiper 453. When this occurs, the above traced circuit including the test relay R420 and the magnet M450 will be completed in order to operate the relay R420. However, due to the high resistance of the relay R420 the magnet M450 will not operate. As soon as the test relay R420 operates, it completes a locking circuit for itself, including the contacts 428, in series with the magnet M450. At its contacts 421 and 423, it connects the incoming tip and ring conductors C474 and C475 by way of the wipers 451 and 452 to the tip and ring conductors C461 and C462 extending to the link 500 (Figs. 5 and 6). At its contacts 426 the relay R420 connects the incoming C conductor C476 by way of the wiper 453 and the C conductor C463 to the link 500. Finally, at its contacts 427, the relay R420 connects ground potential by way of the wiper 454 to the I conductor C464 extending to the link 500.

The line relay R410 now restores to normal inasmuch as the operating circuit has been opened at the contacts 422 and 424 by the operation of relay R420. The relay R410 upon restoring extinguishes the lamps L434 and L435; it reapplies the ground potential to the BY conductor C481; and it disconnects the grounded conductor C484 from the ALB–1 start conductor C483. At this time, the test relay R420 is now locked in its operated position over a circuit including ground at the contacts 432, the winding of relay R420, contacts 428 and 455 and the winding of the magnet M450 to battery. The ground potential at the contacts 432 is also returned over the C conductor C476 to hold the preceding apparatus in its operated position and it is also extended by way of the contacts 426, the wiper 453 and the C conductor C463 but the latter circuit performs no control in the link 500. It is supplied in order to receive ground from link 500 at the proper sequence of operation.

Referring again to the allotter 1 (Fig. 9) it will be recalled that the test relay R920 operated as soon as the CLR trunk circuit 401 was found. As a result of this operation, a circuit is completed which may be traced from ground at the contacts 904 and then by way of the contacts 922 to the contacts 852 in the gate circuit 800. If a call is waiting in a link selecting trunk circuit associated with the second group of trunk circuits, the ALB–2 start conductor C493 will be grounded and a circuit will be completed by way of the contacts 842 for operating the relay R850. This relay in its operated position will close the contacts 852 thereby to complete the circuit for operating relay R860. This relay, upon operating, locks itself in its operated position over a circuit including the contacts 861 and 851.

As a further result of the previously noted operation of the test relay R920, at its contacts 924, it disconnects the circuit including the grounded conductor C483 from the timing circuit 870A in order to terminate operation of the timing circuit. In view of the foregoing description of the operation of the gate circuit 800 it will be understood that the relays R840, R850 and R860 are retained in their operated positions if a call is waiting on a trunk circuit in the second group of trunk circuits.

Referring again to the CLR trunk circuit 401, it will be recalled that the line relay R410 restores to normal when the test relay R420 operates to switch the call through to the link 500. At its contacts 416, the relay R410 removes ground potential from the conductor C483, thereby to interrupt the previously traced circuit for the start relay R910 in the allotter 1 and, at its contacts 415, it reapplies ground potential to the BY conductor C481 in order to busy the CLR trunk circuit 401 to the allotter 1 and the alternate allotter 1 having access thereto. The start relay R910 in the allotter 1 now restores to normal and interrupts, at its contacts 915, the circuit for the test relay R920 which now restores to normal. As a result thereof, a circuit is completed from ground at contacts 904, 923, 853 and 862 for operating the relay R810. The relay R810 in turn, at its contacts 811, disconnects the conductor C483 from the start relay R910 and it connects the conductor C483 by way of the contacts 812 in order to operate the relay R820. However, operation of the relay R820 only occurs if another call is waiting on one of the link selecting trunk circuits of the first group. As a final result of the restoration of the start relay R910, at its contacts 914, it removes ground potential from the winding of the relay R840 which now restores to normal in order to permit the starting ground on the ALB–2 start conductor C493 to control the operation of the start relay R950 in the allotter 2. In this manner, the next waiting call will be allotted from the second group of trunk circuits before a second call can be allotted from the first group of trunk circuits. The slow-to-release characteristics of the relay R850 will prevent the restoration of the relay R810 until after the allotter 2 has successfully distributed a call in the second group of trunk circuits.

The allotter 2 and its associated alternate allotter 2 (Fig. 9) are used only when there are more than 50 trunks provided to select fifty links or less. The first allotter 1, as well as its alternate allotter 1, should be filled to the capacity of 50 trunks before any trunks are assigned to the allotter 2. When additional trunks are required, the light load trunk circuits should be assigned to the allotter 2. The gate circuit 800 (Fig. 8) is required when two allotters are used to distribute two groups totaling more than 50 link selecting trunks assigned to a common group of links in order to prevent two link selecting trunk circuits from simultaneously searching and possibly seizing the same link and to prevent one of the two allotters from tying up all of the traffic and thereby preventing the other of the two allotters from allotting calls to the associated group of trunks. Consequently, the gate circuit 800 alternates the traffic between the two allotters as long as there are calls awaiting distribution by both allotters.

In view of the foregoing, it will be appreciated that if only one allotter and its alternate allotter is provided for assigning incoming calls to any one of the associated group of 50 links, then the gate circuit 800 may be omitted and the ALB–1 start conductor C483 will be connected in the manner illustrated except that the contacts 811 will be omitted. With this arrangement, the start relay R910 in the allotter 1 will remain in its operated position if two or more calls are waiting to be distributed to idle links. After the first waiting call is distributed in the manner described above, ground potential will be applied to the BY conductor C481 by the CLR trunk circuit 401 and short-circuit the test relay R920 through the closed contacts 916 of the operated start relay R910. The test relay R920 upon restoring to normal will open its contacts 921 in order to remove ground potential from the wiper 928 and permit the start relay R430 in the CLR circuit 401 to slowly restore to normal. Also, the ground potential on the conductor C481 completes a circuit including the wiper 927, contacts 916, 915 and 926 and the winding of the magnet 925 in order to control the magnet to advance the wipers step-by-step in a counterclockwise direction to search for another trunk circuit having a waiting call thereon. When such a trunk circuit is found the test relay R920 will again operate in series with the magnet M925 in order to terminate further stepping of the wipers 927 and 928. When all of the trunk circuits having waiting calls thereon have been found by the allotter 1, the ground potential will be removed from the ALB–1 start conductor C483 to permit the start relay R910 to restore to normal in the manner previously explained.

If two sets of allotters are provided as illustrated in the drawings, the gate circuit 800 is utilized to prevent the allotter 1 from distributing a second waiting call until the allotter 2 has been operated to distribute a waiting call in the second group of link selecting trunk circuits. In order now to describe the alternate operations of the allotters and the control of the gate circuit 800, it will be assumed that several calls are awaiting distribution in each of the two groups of trunk circuits and as a result thereof, ground potential is maintained on the ALB–1 and the ALB–2 start conductor C483 and C493. The ground potential on the conductor C483 will control the allotter 1 in the manner described above so that it will find a waiting call on a link selecting trunk circuit in the first group of trunk circuits. The start relay R910 of the allotter 1 completes, at its contacts 914, the circuit for operating the relay R840 and the latter relay, at its contacts 841 and 842, transfers the ground potential on the conductor C493 of the second group of link selecting trunk circuits from the allotter 2 to the winding of the relay R850. The relay R850 operates in order to prepare, at its contacts 852 an operating circuit for the relay R860 and to prepare at its contacts 851 a point in the locking circuit for the relay R850. As soon as the allotter 1 has found a waiting call in the trunk circuit in the first group of trunk circuits, the test relay R920 operates, as previously noted, and, at its contacts 922, it completes the previously traced circuit including ground at contacts 904 for operating the relay R860. Thereafter, the trunk circuit selected by the allotter 1 will find an idle link at one of the operator positions and thereby cause the release of the test relay R920. At its contacts 923, the relay R920 now applies the ground potential at the contacts 904 by way of the contacts 853 and 862 in order to operate the relay R810. Operation of the relay R810 transfers the start conductor C483 from the circuit including the winding of the start relay R910 of the allotter 1 to the winding of relay R820 which now operates. The operation of relay R820 is dependent upon whether or not ground potential is still maintained on the conductor C483 to indicate that there is an unanswered call in the first group of trunk circuits. When the above transfer of the conductor C483 is made, the start relay R910 in the allotter 1 restores to normal. The restoration of the start relay R910 prevents the allotter 1 from searching for another waiting call on a trunk circuit in the first group of trunk circuits and, at its contacts 914, it interrupts the circuit for the relay R840. The relay R840 now restores to normal and, at its contacts 841 and 842, it now retransfers the ALB–2 start conductor C493 from the winding of the relay R850 to a circuit including the start relay R950 in the allotter 2. This circuit includes the grounded conductor C493, contacts 841, 906A, the winding of the relay R950, contacts 953, 913, 912, 932, 952 and 972 and the resistor 989, and battery. The relay R950 operates and locks itself in its operated position over a circuit including its X contacts 951 in substantially the same manner as has been described above in connection with the operation of the allotter 1. Further operations, whereby the allotter 2 under control of the magnet M965 advances its wipers 967 and 968 to find a link selecting trunk circuit, such as the CLR trunk circuit 402, having a call waiting thereon is exactly the same as the operations described above in connection with the allotter 1. However, when the start relay R950 operates, at its contacts 954, it maintains the relay R810 in the gate circuit in its operated position in order to prevent the release of the latter relay when its original operating circuit is interrupted by the restoration of the relay R853.

As soon as the allotter 2 finds the link selecting trunk circuit in the second group having a call waiting thereon, the test relay R960 operates and, at its contacts 962, connects the ground potential at the contacts 904A to a circuit for operating the relay R830. This relay operates, however, only if there is a call waiting on a link selecting trunk circuit in the first group and has caused the operation of relay R820. Thereafter, the selected trunk circuit in the second group will search for and find an idle link at one of the operator positions. The test relay R960 restores to normal when the idle link is formed and applies ground at the contacts 904A, by way of contacts 963, 823 and 832 in order now to reoperate the relay R840. Operation of relay R840 transfers the starting ground potential on the conductor C493 from the circuit including the start relay R950 of the allotter 2 to the winding of the relay R850. The start relay R950 now restores to normal and removes the operating ground from the winding of the relay R810 in order to restore the latter relay. At its contacts 811 and 812 the relay R810 now reconnects the starting ground potential on the ALB–1 start conductor C483 to the start relay R910 of the allotter 1. The cycle of operations of the relays in the gate circuit 800 will now be repeated so that the allotter 1 and the allotter 2 will alternately distribute waiting calls.

If more than one call is waiting in one group of link selecting trunk circuits at a time when there are no calls waiting in the other group of link selecting trunk circuits, the gate circuit 800 will not shift the start control between the allotter 1 and the allotter 2 but will remain with the group of trunk circuits having calls waiting to be answered. However, as soon as another call is received in the said other group of link selecting trunk circuits, so that there are waiting calls in the two groups of trunk circuits, then the gate circuit 800 will again function to alternately select the allotters 1 and 2 for operation until no further calls are waiting to be answered in either one of the groups.

*Selection of an alternate allotter*

In the above description of the operation of the allotter 1, it was pointed out that the start circuit included ground potential on the conductor C483, contacts 811, 906, the winding of the start relay R910 and the chain circuit including contacts on the start relays of all of the allotters. A branch of the above traced circuit includes contacts 924 of the test relay R920, contacts 907 of the transfer relay R900, conductor C888A and the timing circuit 870A. The timing circuit 870A is exactly the same as the timing circuit 870 illustrated in Fig. 8. In the normal operation of the allotter 1, the test relay R920 will operate to interrupt, at its contacts 924, the circuit for controlling the timing circuit 870A. If the allotter 1 should fail for some reason or other and thus prevent the operation of relay R920, the ground potential will be retained on the conductor C888A for a sufficient time to permit the timing circuit 870A to operate in the manner to be described hereinafter. After a predetermined elapsed time interval, the timing circuit 870A operates the transfer relay R900, whereupon, the latter relay locks itself in its operated position by way of its contacts 902 to the grounded contacts 2 of the transfer key K909. At its contacts 901, the relay R900 illuminates the lamp L908 in order to indicate to the exchange attendant that the timing circuit has transferred the distribution of waiting calls in first group of link selecting trunk circuits from the control of the allotter 1 to the control of the alternate allotter 1. Thus, at the contacts 905 and 906 the transfer relay R900 transfers the previously noted start circuit from the winding of the start relay R910 to the winding of the start relay R930 of the alternate allotter 1. Also, at its contacts 903 and 904, the relay R900 transfers the gate control circuit from a circuit including the contacts of the test relay R920 in the allotter 1 to a circuit including the contacts of the test relay R940 in the alternate allotter 1 so that the gate circuit 800 will now be able to alternately control the alternate allotter 1 and the allotter 2 as long as calls are waiting in the first and second groups of link selecting trunk circuits. The detailed description of the operation of the alternate allotter 1 is exactly the same as the previously described operation of the allotter 1 and both of these allotters have access to each of the link selecting trunk circuits included in the first group. Finally, the transfer relay R900, at its contacts 907, interrupts the circuit for controlling the timing circuit 870A in order to permit the latter apparatus to restore to normal.

Since the details of the timing circuit 870 (Fig. 8) are illustrated in conjunction with the transfer of the allotter 2 to the alternate allotter 2, it will be assumed that the ground potential on the start conductor C493 has completed the previously traced circuit for operating the allotter 2 start relay R950 and that a branch circuit including the contacts 964 and 907A and the conductor C888 is completed for operating the relay R875 through its lower winding in the timing circuit 870. The relay R875 operates, and at its contacts 877 connects the conductor C813 to the upper winding of the relay R880 and the upper winding of relay R875. The conductor C813 receives a short ground pulse every six seconds from a motor-driven timing mechanism (not shown) so that in response to the next ground pulse received after the closing of the contacts 877, relay R875 will be held operated through its upper winding and the relay R880 will operate through its upper winding. A further result of the operation of relay R875 was the breaking of conductor C813 to contact 882 to prevent the ground potential on conductor C813 from going to conductor C889 at this time. As soon as the relay R880 operates, it connects a locking circuit to its lower winding by way of its contact 881 to conductor C888 which will still have ground potential if the test relay R950 has not operated and by way of the contacts 882 it has prepared a circuit to conductor C889. Upon the termination of the short six second interval ground pulse on conductor C813, relay R875 will release since ground potential to its lower winding has been broken at contacts 883. As a further result of the restoration of the relay R875, at its contacts 878, it now completes a circuit, including the contacts 882 for forwarding the next ground impulse from the 6 second timer over conductor C813 to conductor C889. Consequently, if the test relay R960 of the allotter 2 is operated incident to the finding of a waiting call on a link selecting trunk circuit in the second group, the contacts 964 will remove ground potential from the conductor C888 and restore the relay R875 or R880 depending on the timing interval. In any event, the allotter 2 must function to cause the test relay R960 to operate before the second ground pulse appears on the conductor C813 or the transfer of the allotters will automatically occur. Consequently, if relay R880 is maintained in its operated position by ground potential on the conductor C888, the second ground pulse appearing on the conductor C813 will pass through contacts 878 and 882 to conductor C889 and operate transfer relay R900A. The relay R900A, at its contacts 902A, locks itself to ground potential at the contacts 2 on the transfer key K909A. Since relay R880 restores to normal shortly after relay R900A operates, it will be seen that, at its contacts 882, ground potential is only momentarily advanced on conductor C889 to relay R900A.

As soon as the transfer relay R900A operates and locks, it completes an obvious circuit including its contacts 901A for illuminating the lamp L908A for the purpose of indicating the allotter transfer operation to the exchange attendant. At its contacts 907A, the relay R900A removes ground potential from the conductor C888 thereby to restore relay R880 in the timing circuit 870. Also, at its contacts 906A and 905A, the transfer relay R900A disconnects the start conductor C493 from the winding of the start relay R950 in allotter 2 and connects it to the winding of the start relay R970 in the alternate allotter 2. Finally, at its contacts 904A and 903A, the relay R900A transfers the circuit for controlling the gate circuit 800 from the allotter 2 to the alternate allotter 2.

At this point, another feature of timer circuit 870 should be described. The allotter may have operated and, thus, test relay R960 operated releasing the timing relays R875 and R880 in timing circuit 870 as heretofore described. However, the link selecting trunk circuit 401 may have failed to properly respond for some reason or other and, therefore, does not release test relay R950 so as to permit the allotter to advance to the next waiting call. In this event ground potential will be on conductor C887 from contacts 965 of test relay R960 and will operate relay R870 through its lower winding by way of contacts 893 of relay R890. The operation of relay R870 connects through its contacts 871 its upper winding and the upper winding of relay R890 to conductor C813 which, as heretofore described, is connected to a mechanical timing mechanism sending out short impulses of ground potential at six second intervals. On the first interval of this ground potential relay R870 remains held through its upper winding and relay R890 operates through its upper winding 2 and contacts 871. At contacts 872 this ground impulse is broken from contacts 891 preventing any ground impulse from going out on conductor C886 at this time. The operation or R890 at its contacts 892 and 893 transfers the ground potential on conductor C887 from the lower winding of relay R870 to the lower winding of relay R890. Thus, if the allotter has not, as yet, completed the movement of a trunk link distributor circuit 401 and restored, test relay R960 will still be operated and ground remains on conductor C887 from contacts 965 holding relay R890 operated. On the completion of the first cycle of ground on conductor C813, relay R870 restores and connects, at its contacts 872, a circuit through contacts 891 to conductor C886. On the next cycle of ground potential on conductor C813, it will pass through contacts 872 and 891 to conductor C886 and shorts out test relay R960 and also places ground potential through contacts 955 and 966 to magnet M965 causing it to take one step. Shorting out relay R960 restores that relay and removes ground potential, at its contacts 965, from conductor C887 which, in turn, restores relay R890. The allotter has now proceeded to the next call. In this case, it did not shift to the alternate allotter because there was no trouble in the allotter circuit. As a further function of the operation of relay R890, at its contacts 894, it connects the second cycle of ground potential on conductor C813 to the upper winding of relay R895. Relay R895 now operates and completes a locking circuit for its lower winding through its contacts 896 and key K898. At its contacts 897, relay R895 completes a circuit for operating the alarm 899. The alarm 899 indicates that some fault has developed in a trunk link distributor circuit that requires immediate attention.

From the foregoing description of the operation of the timing circuit 870, it will be seen that the two relays R875 and R880 are provided to prevent the alternate allotter 2 from being cut into service until after the elapse of at least six seconds, in the event the allotter 2 fails to start. Relay R875 operates on seizure of the timing circuit 870, but the relay R880 prevents the transfer operation from taking place until two pulses have been counted by the timing circuit.

When the allotter has allotted a trunk link distributor circuit, such as 401, to advance, relay R870 will always operate and possibly relay R890, if the six second timer ground potential is present at that moment, but the next six second impulse must appear before the allotter will take an emergency advancement. The selection of links by the trunk link distributor is very rapid, as will hereinafter be described, so unless a case of trouble has developed, the trunk link distributor will have dismissed the allotter substantially in advance of six seconds. In all cases, on every operation of the allotter the relays of timing circuit 870 are released and the timing function must start all over again with each call.

After the transfer has been made by the operation of relay R900A, the alternate allotter 2 will function in the same manner as the allotter 2 to control the distribution of waiting calls on the link selecting trunk circuits in the second group. The timing circuit 870A associated with the allotter 1 and the alternate allotter 1 cooperates with the transfer relay R900 in exactly the same manner as the timing circuit 870 cooperates with the transfer relay R900A. Accordingly, if the allotter 1 fails to operate, the timing circuit 870A will transfer the starting circuit to the alternate allotter 1 so that it will distribute waiting calls on link selecting trunk circuits in the first group in the manner previously described.

For the purpose of routining the previously noted allotters, the transfer key K909 and the transfer key K909A have been provided whereby the exchange attendant may selectively control the operation of the transfer relays R900 and R900A. In other words, the transfer keys K909 and K909A perform the same operations as the timing circuits 870 and 870A. However, this control is performed by the exchange attendant for the purpose of routining the different allotter circuits. The transfer keys K909 and K909A also may be used to restore the transfer relays R900 and R900A by actuating the respective keys sufficiently to open their contacts 2 and 3. Thus, at the contacts 2, the locking circuit for the transfer relay R900 is interrupted to permit the relay to restore to normal to again reconnect the allotter 1 and disconnect the alternate allotter 1. At the contacts 3 the transfer key K909 also extinguishes the alarm lamp L908. The same operating controls are performed by the momentary actuation of the transfer key K909A. It should be noted, however, that the transfer keys are constructed so that the contacts 2 and 3 are opened before the contacts 1 are closed when the key is actuated to the left and that in the reverse direction of operation, the contacts 1 will be opened before the contacts 2 and 3 are reclosed. With this arrangement the transfer relays may be restored to normal by slowly actuating the key to the left and then slowly restoring it to the right to the position illustrated in the drawings.

*Operation of the link 500*

In the previous description of the operation of the CLR trunk circuit 401 it was pointed out that the rotary switch thereof rotated its wipers to search for a C conductor, such as the conductor C463, of a link marked idle by an absence of ground potential on the said conductor. As soon as the CLR trunk circuit 401 connects with the link 500, the test relay R420 operates in order to connect the tip and ring conductors C474 and C475 of the calling subscriber loop circuit through to the tip and ring conductors C461 and C462 of the link 500.

Referring to the link 500 (Figs. 5 and 6) it will be seen that when the calling subscriber loop circuit is connected to the conductor C461 and C462, a circuit will be completed for the upper and lower windings of the rear supervisory relay R510. The circuit including the upper winding may be traced from tip conductor C461 by way of the contacts 541 and 613, upper left-hand winding of the repeating coil 627, contacts 521 and the upper winding of the relay R510, to battery. The circuit for the lower winding of the relay R510 may be traced from the ring conductor C462 by way of the contacts 543 and 615, lower left-hand winding of the repeating coil 627, contacts 523 and the lower winding of the supervisory relay R510, to ground. When the above traced circuit is completed the relay R510 operates and completes, at its contacts 513, a circuit including the resistor 575 for operating the hold relay R570. At its contacts 512, the relay R510 completes a circuit including the contacts 566, conductor C997, extending to Fig. 9, and the winding of the position of the all-links busy relay R990, to battery. This relay now operates and, at its contacts 991 to 995, inclusive, applies ground potential to the conductors corresponding to the conductors C996—1 and C996—8 extending respectively to each of the links at the operator position. Since only the link 500 at the particular operator position has been illustrated, the ground potential applied to the conductor C996—1 by the operation of relay R990 is extended back to the link 500, but due to the fact that the rear supervisory relay R510 is now operated, the ground potential on the conductor C996—1 performs no function at this time. However, in the remaining links at the particular operator position, the ground potential applied to the coresponding conductors C996—2 to C996—8 complete circuits in each of the remaining links including the contacts 622, 565 and 573 for operating the busy relay, corresponding to the relay R550, in the other links at the operator position. This relay, at its contacts 551, applies ground potential to the C conductors, such as the conductors C463 and C367 individual to each of the associated links thereby to mark all of the remaining links at the operator position busy during the time that the operator is handling the call received on link 500. In the link 500, however, the busy relay R550 will not operate, due to the operation of relay R570 which, at its contact 573, opened the circuit to busy relay R550.

As a further result of the operation of relay R510, at its contacts 514, it completes a circuit for initiating the operation of the zip-zip tone relays at the operators position icrcuit 1200. The last-mentioned circuit may be traced from ground at the contacts G of the restored link key K601, contacts 569 and 514, the tone start conductor C1253 extending to Fig. 12, contacts 1216 and the winding of the relay R1210, to battery. The relay R1210 upon operating, at its contacts 1211, completes an obvious circuit for operating the relay R1215 and the latter relay, at its contacts 1216, interrupts the circuit for the relay R1210. Thus, it wil be seen that the relays R1210 and R1015 will cyclically operate and restore. At the contacts 1212 and 1217, the two relays noted, apply ground potential by way of the sleeve of the jack J1244 to the receiver of the operator headset 1245 which is plugged into the jack J1244 as long as the position is attended. Also, at its contacts 1213, the relay R1210 connects the tone conductor C1239 by way of the contacts 1219 and the sleeve of the jack J1244 to the receiver of the operator headset 1245 thereby to give the operator a first short tone signal. Thereafter, the relay R1215 operates and interrupts, at the contacts 1219, the tone signal and upon the restoration of the relay R1210 a second short tone signal is transmitted by way of the contacts 1214 and 1218. Incident to the restoration of the relay R1215 the second short tone signal is terminated. The foregoing operation and restoration of the relays R1210 and R1215 will continue until the rear supervisory relay R510 is restored to normal or until the control relay R560 is operated. Normally, the restoration of the relay R510 will occur after two short tone pulses have transmitted to the operator headset.

Referring again to the rear supervisory relay R510, it will be noted that the battery and ground potential connected to the upper and lower windings of the relay are respectively connected to the tip and ring conductors C461 and C462, whereas, at the time the line relay R410 in the CLR trunk circuit 401 was connected to the tip and ring conductors C474 and C475, ground and battery potential are respectively conected by way of the upper and lower windings of the relay R410 to the tip and ring conductors C474 and C475 respectively. Thus, the connection of battery potential on the tip conductor C461 and the connection of ground potential on the ring conductor C462 reverse the direction of current flow back to the calling party in order to transmit a reverse battery answering supervisory signal.

As noted above, the rear supervisory relay R510, upon operating, causes the immediate operation of the hold relay R570. The latter relay, at its contacts 572, completes a circuit, including the contacts 537, for returning a holding ground potential to the C conductor C463 in order to hold the preceding switches, including the CLR trunk circuit 401, the local selector 301, the line switch 283, and the line circuit 282, in their operated positions. In the CLR trunk circuit 401, the ground potential returned over the conductor C463 from the link 500 completes a holding circuit for the test relay R420 which includes the wiper 453, contacts 426, the winding of the relay R420, contacts 428 and 455 and the winding of the magnet M455 to battery. The test relay R420 is retained in its operated position, but the magnet M450 remains in its restored position. At this time, the CLR trunk circuit 401 is locked in its operated position independently of the slow-to-release start relay R430 which normally restores to normal when ground is removed from the conductor C485 by the associated allotter. As a further result of the operation of relay R570, at its contacts 573, a circuit is broken to busy relay R550, because when the link is in use hold relay R570 will control the holding ground on the C or holding conductor C463 unless the hold key K670 is operated.

As a further result of the operation of the hold relay R570, at contacts 574, it completes a circuit including contacts 567 for operating the cut-in relay R610. However, before describing the circuit controls performed incident to the operation of the cut-in relay R610, a description will be given of the characteristics of the hold relay R570. This relay is of the slow-to-release type and it is also provided with a 50 mf. electrolytic condenser shunted across its windings for the purpose of extending release time of the relay to approximately 650 milliseconds. This slow-to-release characteristic provided on the relay R570 is sufficient to permit the calling subscriber to flash the rear supervisory relay R510 to recall or resignal the operator without releasing the relay R570. The resistor 575 is approximately 500 ohms and is provided in the circuit for relay R570 to absorb the discharge current from the condenser 576 and the resistor 577 is approximately 1,000 ohms and is provided to absorb the spark at the contacts 620 and 513.

The operator has now received the zip-zip tone signal to indicate that a call is about to be cut-through to the operator position circuit 1200 by the cut-in relay R610. This relay upon operating, in the manner described above, disconnects the tip and ring conductors C461 and C462 from the circuit of the rear supervisory relay R510 at its contacts 613 and 615, and at its contacts 614 and 616 it connects these conductors to the TR and RR conductors C1170 and C1171 extending to Fig. 11. In Fig. 11 the TR conductor C1170 is connected by way of normally closed contacts on the keys K1180 to K1184, inclusive, and then by way of the contacts 1114, contacts 5 on the key K1191, lower left-hand winding of the repeated coil 1155, contacts 1145 and the lower winding of the line relay R1120, to battery. The upper winding of the line relay R1120 is connected by way of the contacts 1142, upper left-hand winding of the repeating coil 1155, contacts 2 on the key K1191, contacts 1112, normally closed contacts on the keys K1180 to K1184, inclusive, RR conductor C1171. Consequently, the cut-in-relay R610 upon operating transfers the tip and ring conductors C461 and C462 on the rear of the link 500 from the windings of the supervisory relay R510 to the line relay R1120 in the operator common equipment 1100. The line relay R1120 now operates.

At the present time the receiver of the operator headset 1245 is bridged across the right-hand windings of the repeating coil 1155 over a circuit including the sleeve contacts of the jack J1244, the contacts 1233 and 1235, the upper and lower left-hand windings of the induction coil 1247, contacts 1231 and 1237, the upper and lower right-hand windings of the repeating coil 1155, the lower winding of the front supervisory relay R1160, and the rectifier 1162. Also at this time the transmitter of the operator headset 1245 is bridged across the right-hand winding of the induction coil 1247 and in multiple therewith across the upper and lower windings of the battery feed relay R1240 to ground and battery potential, respectively, by way of the tip contacts of the jack J1244. Thus, it will be seen that the operator headset 1245 is now connected through the inductive windings of the induction coil 1277 and the repeating coil 1155 to the calling subscriber line through the rear end of the link 500.

Referring again to the cut-in relay R610 in the link 500, it will be seen that, at the contacts 612 and 618, the tip and ring conductor C701 and C702, extending to the selector 700 over the front end of the link, are connected by way of the contacts 661 and 663, 612 and 618, the TF and RF conductors C1173 and C1174 extending to Fig. 11, the normally closed contacts of the keys K1185, K1186, K1187, K1188 and K1192 to the upper and lower right-hand windings of the repeating coil 1155 and then over the previously traced circuit including the lower winding of the front supervisory relay R1160 and the rectifier 1162. Consequently, the operator headset 1245 and the tip and ring conductors extending to the selector 700 are now multiply connected to the front supervisory relay R1160.

As a further result of the operation of relay R610, at its contacts 620, it connects the grounded CR conductor C627 to the relay R570 in order to hold it operated after the release of relay R510 and thereby continues to mark the C conductor C463 with the busy marking ground potential and in order to maintain the link identity lamp L669 in a flashing condition. The last-mentioned circuit may be traced from ground at the right-hand normally closed contacts of the release rear key K1184 (Fig. 11), conductor C627 extending to Fig. 6, contacts 620, rectifier R669, link identity lamp L669, contacts 563, and the flash-battery terminal. Battery pulses are transmitted over this circuit so that the lamp L669 will flash and indicate to the operator the particular link that has received the incoming call. Rectifier R669 is introduced into this circuit to prevent ground potential from returning, during the non-battery period of the flash, from other link circuits, which would cause false signals in the identity lamp from battery through the winding of relay R570.

At its contacts 622 and 623, the cut-in relay R610 disconnects the grounded ALB–1 conductor C996—1 from the incomplete circuit for the lower winding of the busy relay R550 and it connects the ground conductor C996—1 by way of the contacts 566 to the ALB–2 conductor C997 extending to Fig. 9 in order to retain the all-links busy relay R990 in its operated position. Thus, the busy relay R550 cannot be operated incident to the restoration of the rear supervisory relay R510, and other links at the operator position are maintained busy and cannot be selected to receive another call.

Finally, at its contacts 624 to 626, inclusive, the cut-in relay R610 connects the inward, tributary and CLR class identity lamps L633, L634 and L635 to the corresponding class identifying conductors. Thus, the identity conductor C464 of the CLR trunk circuit 401 is connected to the CLR lamp L635 and then by way of the G2 conductor C1076 extending to Fig. 10 and the winding of the connect relay R1070, to battery. Since the conductor C464 is grounded by the CLR circuit 401, the CLR identity lamp L635 is illuminated and the connect relay R1070 is operated. All of the identity conductors, such as the conductor C464 are multiply connected to all of the CLR trunk circuits, such as the CLR trunk circuit 401, in the group having access to links, such as the links 500. With this arrangement, whenever a call is received on a CLR trunk circuit it is extended to one of the links at one of the operator positions, the CLR identity lamp of the selected link is illuminated to indicate to the operator thereat the class of the incoming call.

Other identity conductors are grouped together in a similar manner and control corresponding identity lamps at the links of the operator position.

The connect relay R1070 is included in the circuit for illuminating the class identity lamps for the purpose of preparing the operator position equipment 1100 to transmit ringing current over the rear end of the connected link and to provide the necessary control potentials for collecting or rejecting coins deposited in a paystation telephone instrument. Finally, the connect relay R1070, at its contacts 1075, applies ground potential to the conductor C997A (Fig. 9) in order to retain the position all links busy relay R990 in its operated position. In view of the last mentioned circuit it will be appreciated that the relay R990 may be retained operated from the operator position equipment 1100 by the relay R1070 or from the contacts 512 of the rear supervisory relay R510 in the link 500, or from the D contacts spring on the link key K601 when the link 500 is occupied with a call and it will also be controllable from the operator position circuit 1200 from ground at contacts 1241 in the event that the operator restores the relay R1240 by removing her headset 1245 from the jack J1244.

The circuits are now in condition for the operator to converse with the calling subscriber, but before continuing with the answering of the call, it will be recalled that the operation of the cut-in relay R610 disconnected the rear supervisory relay R510 from the tip and ring conductor C461 and C462. The rear supervisory relay R510, consequently, restores to normal and, at its contacts 514, it interrupts the previously traced circuit for connecting group potential to the TS conductor C1253. The cyclic operation of the zp-zip tone relay R1210 and R1215 is thus terminated to prevent the tone signal from being transmitted to the operator headset 1245. As its contacts 513, the relay R510 now interrupts the previously traced circuit for the hold relay R570 which remains operated, however, as heretofore described from ground potential on the conductor C627 through contacts 620. Finally, at its contacts 515, the relay R510 reapplies the ground potential at the G contact springs of the link key K601 to the conductor C815 extending to Fig. 8 in order to retain the position busy relay R865 in its operated position. The remaining contacts on the rear supervisory relay R510 perform no function.

The incoming call received by the CLR trunk circuit 401 is now connected by way of the link 500 to the line relay R1120 in the operator common equipment 1100 and the CLR lamp L635 is illuminated to indicate to the operator that the call may be answered. Also, the link identity lamp L669 is flashing to identify the particular link.

*Operator's common equipment 1100*

The line relay R1120 in the operator common equipment 1100 is connected to the loop circuit including the calling subscriber line with battery potential on the tip and ground potential on the ring conductors so that the current flow over the line is maintained in a reverse condition. Inasmuch as the operator headset 1245 is inductively coupled by way of the repeating coil 1155 to the loop circuit including the line relay R1120, the operator may converse with the calling party without performing any manual controls to connect her headset to the particular link.

The line relay R1120 is operated as soon as it is connected to the tip and ring conductors C461 and C462 of the incoming line and, at its contacts 1121, it completes an obvious circuit for operating the hold relay R1150. This relay in turn, at its contacts 1152, locks itself in its operated position over a circuit including the contacts 1116, G1 conductor C1167 extending to the link 500 (Fig. 6), I contact springs on the link key K601 and then through corresponding contacts of the link keys of the remaining links at the operator position, to ground. The last mentioned chain circuit is provided to interrupt the locking circuit for the hold relay R1150 whenever the operator actuates any one of the link keys, such as the key K601, of any one of the links associated with her position. As a further result of the operation of the hold relay R1150, at its contacts 1151, it prepares a point in the incomplete circuit for controlling the front supervisory lamp L1165 in the common equipment 1100 and, at its contacts 1153, it prepares a point in the incomplete circuit for controlling the rear supervisory lamp L1166 in the common equipment 1100. It may be advisable at this time to mention the fact that if the calling subscriber should desire to signal the operator for any purpose, the switchhook at the calling station may be momentarily depressed in order to momentarily restore the line relay R1120 any number of times. Each time the line relay R1120 restores, it completes, at its contacts 1122, the above mentioned circuit for illuminating the rear supervisory lamp L1166. In this manner the calling subscriber may signal the operator at will.

Each link at the operator position is directly connected to a selector such as the link selector 700. In Fig. 7 this selector is shown in detail and it will be described hereinafter. It should be seen, however, that the line relay R710 is provided with two windings, one of which connects battery potential to the ring conductor C702 and the other of which connects ground potential to the tip conductor C701. With link 500 in an idle condition, the circuit including the tip and ring conductors C701 and C702 is open at the contacts 563 of the restored control relay R560. However, as soon as the link is seized and the cut-in relay R610 operates as noted above, the tip and ring conductors C701 and C702 are connected by way of the contacts 612 and 613 and the TF and RF conductors C1173 and C1174 to the lower and upper right-hand windings respectively of the repeating coil 1155. Thus, the battery potential from the lower winding of the line relay R710 in the link selector 700 is connected by way of the ring conductor C702 through the upper right-hand winding of the repeating coil 1155, lower winding of the front supervisory relay R1160, rectifier 1162, lower right-hand winding of the repeating coil 1155 and then over the tip conductor C701 to ground potential through the upper winding of the line relay R710. When the above traced circuit is completed, the line relay R710 in the link selector 700 operates in order to seize the selector and the front supervisory relay R1160 operates in series therewith. It should be noted, however, that the rectifier 1163 is polarized so that the current will not flow through the upper winding of the differential relay. As soon as the relay R1160 operates, it completes, at its contacts 1161, the previously mentioned circuit for illuminating the front supervisory lamp L1165 thereby to indicate to the operator that the selector 700 has been connected to the front of the link and is in condition to be operated under control of the impulse key sender at her position. Furthermore, it may be well to mention at this time that the front supervisory relay R1160 will remain in its operated position as long as battery potential is connected to the ring conductor C702 and ground potential is connected to the tip conductor C701. Whenever the potentials on the two conductors are reversed, for example, at a time when a called subscriber answers a call or some other type of supervision reverses the potentials, the front supervisory relay R1160 will restore to normal because the battery potential on the tip conductor will now flow through the upper winding of the relay R1160, the rectifier 1163 and then through the lower winding of the relay R1160 to ground potential on the ring conductor. In the last mentioned circuit the current flow through the upper and lower winding of the relay R1160 in series will cause the relay to restore to normal due to the fact that these windings are wound in opposition to one another. Restoration of the relay R1160 interrupts the circuit, at its contacts 1161, for the lamp L1165 to indicate to the operator that the front end of the link requires her attention or that the call has been released on the front end of the link.

The operator may now converse with the calling subscriber and ascertain the destination of the particular call.

*Connecting the impulse sender 1900A with the link 500*

In the previous description of the operation of the toll switching system it was pointed out that the operator at the operator position circuit 1200 upon answering a call received over the rear end of the link 500 obtains the information as to the destination of the call.

The first operation performed by the operator, after ascertaining the destination of the call is to actuate the dial front key K1189. This key, at its contacts 2, completes a circuit for operating the dial front relay R1410 (Fig. 14). The circuit for operating the dial front relay R1410 may be traced from battery through the lower winding of the relay, the DFO conductor C1485, contacts 2 of the key K1189, SRN conductor C1488, contacts 1467A on the restored common sender control relay R1460 (Fig. 14), and contacts 2078 and 2045, to ground. The dial front relay R1410 operates over this circuit and, at its contacts 1411, locks itself in its operated position over a circuit including its upper winding to ground potential applied to the DFH conductor C1484 by contacts 1 of the key K1189.

The operation of the dial front relay R1410 in the link finder 1400A initiates operation of the wipers 1403 to 1407, inclusive, to search for the particular link at the operator position that has been utilized in receiving the above mentioned toll call. Thus, at the contacts 1413, the relay R1410 connects the wiper 1407 by way of the contacts 1423 and 1402 to the winding of the rotary magnet M1401. Simultaneously, at its contacts 1412, the relay R1410 connects ground potential through the winding of the switch relay R1420 and the contacts 1402 to the winding of the rotary magnet M1401. The wipers 1403 to 1407, inclusive, have access by way of the associated bank contacts to each of the links provided at the position for use by the operator. All of the links at the position normally apply ground potential to the DBY conductor C673 accessible to the wiper 1407 if the associated link is not connected to the operator common equipment 1100. In the present example, however, the link 500 has been associated with the common equipment 1100 (Fig. 11) by operation of the cut-in relay R610. Consequently, at the contacts 621, the relay R610 disconnects the grounded CR conductor C627 from the DBY conductor C673 to mark the link 500 as the calling link in the bank contacts accessible to the wiper 1407.

If the wipers 1403 to 1407, inclusive, are standing on contacts terminating any other link at the position, the grounded DBY conductor will complete a circuit including the contacts 1413, 1423 and 1402 for operating the rotary magnet M1401 and this ground potential will short-circuit the switch relay R1420. The magnet M1401 is self-interruptedly operated under control of its contacts 1402 thereby to advance the wipers 1403 to 1407, inclusive, step-by-step until the wiper 1407 engages the ungrounded DBY conductor C673 of the link 500. The magnet M1401 is arranged so that it will advance the associated wipers incident to restoration of the magnet. Since the engaged conductor C673 is ungrounded, the short-circuit is removed from the switch relay R1420 and the relay now operates in series with the rotary magnet M1401. It should be noted, however, that due to the high resistance of the winding of the relay R1420, the magnet M1401 does not operate. As soon as the relay R1420 operates, it disconnects, at its contacts 1423, the previously described stepping circuit for the magnet M1401 and thereby prevents further stepping of the wipers of the link finder 1400A. As a further result of the operation of the relay R1420, at its contacts 1421, it connects ground potential by way of the contacts 1462A, SRS conductor C1872, contacts 1921, and the upper winding of the sender relay R2040, to battery. The relay R2040 now operates and, at its contacts 2047, completes a circuit including ground at contacts 2083, contacts 1974 and 2047, SRL conductor C1881, contacts 1469A and 1426, and the SFL conductor C1490 in order to illuminate the sender pilot lamp L1154. This indicates to the operator that the impulse sender 1900A is connected to the link 500 and that it is ready to transmit loop impulses in accordance with digits registered in the digit register 1500A.

As a further result of the above described operation of the switch relay R1420, at its contacts 1424, it completes an obvious circuit for operating the key connect relay R1440. The latter relay, at its contacts 1442 to 1445, inclusive, connects the four code marking conductors C1492W to C1492Z, inclusive, from the operator keyset K1474 to the digit register 1500A by way of the contacts 1470A to 1473A, inclusive, on the restored common sender connect relay R1460. Thus, the code marking conductors may now be controlled by actuation of the various keys (not shown) of the keyset K1474 to register desired digits in the digit register 1500A.

Finally, at its contacts 1422, the switch relay R1420 completes a circuit including ground at contacts 1436, wiper 1404, DF conductor C674 extending to Fig. 6, and the winding of the dial front relay R660, to battery. The relay R660 now operates and, at its contacts 661 to 664, inclusive, transfers the tip and ring conductors C701 and C702 from the link 500 to the DT and DR conductors C671 and C672 terminating in the contact banks of the link finder 1400A. Also, at its contacts 665 and 666, the relay R660 transfers the circuit for the front supervisory lamp L668 in the link, from the link 500 to the DLP conductors C675 terminating in the bank contact engaged by the wiper 1406 of the link finder 1400A.

Incident to the operation of the relay R660, the line relay R710 in the link selector 700 is included in a circuit, whereby, loop impulses from the impulse sender 1900A will control the line relay in order to operate the link selector 700. This circuit may be traced from ground at contacts 761 (Fig. 7), the upper winding of the line relay R710, contacts 781 and 791, the tip conductor C701, contacts 662, DT conductor C671, wiper 1405 of the link finder 1400A, contacts 1438 and 1464A, +D conductor C1908, and the contacts 2065. The circuit is further traced over one branch including contacts 2088 and 2066, and over another multiple branch including contacts 2064 and 2025, to the resistor 1908, the low resistance lower winding of the loop pulsing supervisory relay R1910, −D conductor C1871, contacts 1416A and 1431, wiper 1403, DR conductor C672, contacts 664, ring conductor C702, contacts 793 and 783 and the lower winding of the line relay R710, to battery. In the above traced circuit, the line relay R710 is included in the loop circuit through the lower winding of the loop pulsing supervisory relay R1910 in the impulse sender 1900A. The upper winding of the relay R1910 is pre-energized over a circuit including contacts 2041 of the operated sender relay R2040. The last-mentioned circuit is completed to pre-energize the relay R1910 but the relay does not operate until the above mentioned loop circuit is completed through its lower winding. However, when the loop circuit is completed, the direction of current flow through the lower winding of the relay R1910 is in the proper direction to operate the relay R1910 in series with the line relay R710. The operation of the line relay R710 in the link selector and the various circuits controlled thereby is described in detail under the heading "Operation of the link selector 700."

In the above description it was pointed out that the dial front relay R660 transferred the circuit for the front supervisory lamp L668 from the link 500 to the DLP conductor C675 terminating in the bank contact engaged by the wiper 1406. The last-mentioned wiper is grounded at the present time over a circuit including the contacts 1432' and 1465A, the SP conductor C1876, and contacts 1977. Consequently, the front supervisory lamp L668 remains in an illuminated condition to indicate to the operator that the associated link 500 is being utilized in extending the present call from the position.

When the sender relay R2040 operated, as noted above, it completed, at its contacts 2047, the circuit for illuminating the sender pilot lamp L1154 at the operator position to inform the operator that she may operate her keyset K1474 in accordance with the digits required to route the call to the desired destination. Also, at its contacts 2044, the relay R2040 extends ground potential by way of the contacts 2051′ to the RLS conductor C2001 extending to the digit register 1500A. The grounding of the above mentioned conductor prepares circuits for various digit register relays in the digit relay 1500A so that such relays will operate and lock to register the digits. Also, at its contacts 2049, the relay R2040 applies ground potential by way of the contacts 2063′, 2049 and 2196 to the CI conductor C2015 extending to the digit register 1500A thereby to condition other relays for operation in the digit register circuit. A multiple of the above mentioned circuit also includes the lower winding of the relays R2190 and the HG conductor C2014 extending to the rigit register 1500A.

As soon as the operator actuates one of the keys (not shown) of her keyset K1474 in accordance with the first digit to be transmitted by the impulse sender 1900A, the conductor C1492W to C1492Z, inclusive, will be grounded in accordance with the conventional WXYZ code in order to register the corresponding digit in the digit register 1500A. The code is marked on the WXYZ conductors in accordance with the following table:

| Digit key: | C**1492** conductors grounded |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

In view of the foregoing table, it will be understood that when any one of the above ten keys is actuated in accordance with a particular digit, the conductors C1492W to C1492Z, will be grounded to register the corresponding digit in the digit register 1500A. It should be understood that the digit register 1500A is arranged to register the successive digits as they are keyed by the operator on the keyset K1474. The digit register 1500A may be, for example, of the type illustrated in Figs. 33 and 34 of the Molnar Patent No. 2,361,313 and reference may be made to this patent for a detailed description of the operation of the digit register.

As soon as the operator actuates the first digit key to register a digit in the digit register 1500A, the latter register applies ground potential to the hold conductor C2002 in order to operate the digit send relay R2010 in the impulse sender 1900A. At its contacts 2013, the digit send relay R2010 applies ground potential by way of the contacts 1923, DS conductor C1873, contacts 1463A and 1411A, and the upper winding of the dial front relay R1410, to battery. The dial front relay R1410 is now locked in its operated condition under control of the impulse sender 1900A and, consequently, the operator may now restore her dial front key K1189 to its normal position.

*Operation of the impulse sender 1900A*

Referring now to the loop pulsing supervisory relay R1910, it will be seen that when this relay operates in series with the line relay R710 of the link selector 700, it completes, at its contacts 1911, a circuit including contacts 2018 for operating the auxiliary relay R1940. The relay R1940 prepares various circuits which are completed after a plurality of spacer pulses have been counted by the counting relays (Fig. 17) for the purpose of allowing the link selector 700 to become fully conditioned to receive the impulses of the first transmitted digit.

The manner in which the spacer pulses are counted by the impulse sender 1900A, prior to the transmission of switch controlling impulses will now be described. It will be recalled that when the digit send relay R2010 operated in response to the registration of the first digit in the digit register 1500A, at its contacts 2013, it applied ground potential to the DS conductor C1873 in order to lock the impulse sender 1900A to the link selector 700. Also, at its contacts 2012, the relay R2010 completes a circuit including contacts 2051, 1922, 1971, 2021 and 2031, conductor C2118, contacts 2091 and the winding of the prime mover relay R2080, to battery. The relay R2080 operates and, at its contacts 2081, completes a locking circuit for itself by way of the contacts 2092. At its contacts 2082, the relay R2080 completes an obvious circuit for operating the relay R2085 and the latter relay, at its contacts 2089 completes an obvious circuit for operating the relay R2090. As a further result of the operation of the relay R2085, at its contacts 2088, it interrupts one of the previously described branch circuits included in the loop impulsing circuit of the relay R1910 and the line relay R710, but this interruption is of no importance at this time due to the fact that the loop circuit is retained over the multiple branch circuit including contacts 2025 and 2064. As a further result of the operation of relay R2085, at its contacts 2086, it completes a circuit for operating the counting relay R2130. Incident to the operation of the prime mover relay R2190, at its contacts 2091 and 2092, it interrupts the circuit for relay R2080 which now restore to normal.

It may be well to mention at this time that the impulse sender 1900A, illustrated in Figs. 15 to 17, inclusive, is, for the most part, exactly the same as the impulse sender 1900A illustrated in Figs. 19 to 21, inclusive, of the Balzer application, Serial No. 181,508, filed August 25, 1950. The present impulse sender, however, has been modified so that it will transmit loop impulses over the −D and +D conductors C1871 and C1908 instead of sransmitting EC pulses over the conductor C1908 as is illustrated in the Balzer application. Furthermore, the impulse sender of the prior Balzer application is provided with an automatic ring control relay R1980 which has been omitted from the disclosure of the present impulse sender. Consequently, the various circuits, including the contacts of the prior automatic ring relay R1980, have been deleted from the present disclosure. Fundamentally, however, the present modification has converted the prior Balzer impulse sender from EC pulsing and supervision to loop impulsing and reverse battery supervision.

The manner in which the spacer pulses are counted by the impulse sender 1900A prior to transmitting the switch controlling loop impulses will now be described. When the prime mover relay R2085 operates, as noted above, at its contacts 2086, it completes a circuit which may be traced from the grounded conductor C2118 by way of the conductor C2116, contacts 2174, 2165, 2154, 2145 and 2134 for operating the relay R2130. The latter relay, at its contacts 2135, locks itself by way of the contacts 2181 to the conductor C2116. Finally, at its contacts 2089, the relay R2085 completes an obvious circuit for operating the prime mover relay R2190. The latter relay, at its contacts 2091 and 2092, interrupts, the circuit for the relay R2080 which now restores to normal.

When the first counting relay R2130 operates, it prepares, at its contacts 2136, a point in the circuit for operating the second counting relay R2140. Also, the first counting relay R2130, at its contacts 2131, connects the B1 marking conductor C2018—1 from the digit register 1500A to the test conductor C2112. Finally, at its contacts 2133, the first counting relay R2130 connects its winding by way of the contacts 2143 to the lower winding of the transfer relay R2180. The last-mentioned relay, however, is short-circuited at this time by ground potential applied to the conductors C2115 and C2118. It should be noted that the B1 to B9 marking conductor C2018—1 to C2018—9, inclusive, from the digit register 1500A have no ground potentials applied thereto during the spacer pulse counting period and, consequently, perform no function at this time.

When the prime mover relay R2080 restores to normal, it interrupts, at its contacts 2082, the circuit for the relay R2085 and the latter relay upon restoring, at its contacts 2089, interrupts the circuit for the relay R2090. As a further result of the restoration of relay R2085, it removes the short-circuit from the lower winding of the transfer relay R2180, at its contacts 2087, to permit the latter relay now to operate in series with the counting relay R2130. As a further result of the operation of relay R2180, at its contacts 2182, it connects the second counting relay R2140 to the conductor C2116 and, at its contacts 2184, it prepares a circuit for locking its upper winding over a circuit including the conductor C2115.

As soon as the prime mover relay R2090 restores to normal it again completes, at its contacts 2091 and 2092, the circuits for reoperating and locking the relay R2080. Consequently, as long as the conductor C2118 remains grounded the counting relays R2080, R2085 and R2090 operate in the order named and then restore in the order named. The relay R2085, at its contacts 2086, applies a pulse of ground potential on the conductor C2115 each time it operates and, at its contacts 2086, it applies a pulse of ground potential to the conductor C2116 each time it operates. The second pulse applied to the conductor C2115 locks the transfer relay R2180 over a circuit including its upper winding and the second pulse applied to the conductor C2116 completes a circuit including the contacts 2182 and 2136 for operating the second pulse counting relay R2140. As soon as the counting relay R2140 operates, it interrupts, at its contacts 2143, the locking circuit for the first pulse counting relay R2130 which now restores to normal. As a further result of the operation of relay R2140, at its contacts 2144, it prepares a point in the operating circuit for the third counting relay R2150 and, at its contacts 2141, it connects the B2 marking conductor C2018—2 to the conductor C2112. Thus, the prime mover relays R2080, R2085 and R2090 will control the operation of the counting relays R2130, R2140, etc., one after another to count the number of cycles of operation of the prime mover relays.

The transfer relay R2180 restores to normal at the end of the counting of the second pulse and prepares, at its contacts 2181, the circuit to the third pulse counting relay R2150 and, at its contacts 2183, it prepares a point in the circuit for locking the third counting relay R2150 in its operated position. Consequently, the third counting relay R2150 will operate when the third pulse is transmitted by the relay R2085 and it will lock itself in series with the transfer relay R2180 when the pulse is terminated. The latter relay upon operating, at its contacts 2151, completes a circuit including the test conductor C2112 in order to terminate the spacer pulse counting period and in order to signal the digit register 1500A to mark one of the marking conductors C2118—1 to C2118—9, inclusive, in accordance with the first digit registered therein. The test circuit noted above may be traced from ground at the contacts 1951 and then by way of the contacts 2023, 1932 and 2061, conductor C2114, contacts 2151 of the operated third counting relay R2150, contacts 2121, test conductor C2112, contacts 1953, 2072, 1942 and 2027, and the lower winding of the alternator relay R2020, to battery. In multiple with the above traced circuit an additional circuit is completed including the contacts 2036 and the upper and lower windings of the relays R2020 and R2030 and battery. The upper and lower windings of the relay R2020 are both energized over the above circuits but due to the fact that the relay is of the differential type with its windings wound in opposition to one another, it does not operate at this time. However, the relay R2030 operates over the circuit including only its lower winding and locks itself by way of the contacts 2035, 2042 and 2053, to ground. Also, at its contacts 2037, the relay R2030 connects its operating ground potential by way of the contacts 2029 and the winding of the prime mover relay R2090 to battery. The last-mentioned circuit retains the relay R2090 in its operated position to prevent the prime mover relays from continuing the cyclic operation whereby pulses are transmitted to the counting relays. Also, at its contacts 2031, the relay R2030 removes ground potential from the conductor C2118 thereby to restore the third counting relay R2150.

As soon as the third counting relay R2150 restores to normal, it interrupts, at its contacts 2151, the previously traced circuit for the lower winding of the alternator relay R2020. Consequently, the latter relay now operates over the remaining circuit including its upper winding and, at its contacts 2025, it removes the short-circuit from across the contacts 2088. Also, at its contacts 2026', the relay R2020 connects the —D conductor C1871 to the +D conductor C1908 so that loop impulses may be transmitted by the contacts 2088 over a circuit that is independent of the lower winding of the loop pulsing supervisory relay R1910.

Thus, at the present time the —D conductor C1871 is connected to the +D conductor C1908 over a circuit including the contacts 2026', 2066, 2088 and 2065. Subsequent operations of the prime mover 2085 will interrupt, at the contacts 2088, the loop circuit including the —D and +D conductors C1871 and C1908 in order to transmit switch controlling loop pulses to the link selector 700 and subsequent switches in the switch train. During the above mentioned impulsing period of the contacts 2088, the lower winding of the loop pulsing supervisory relay R1910 is short-circuited at the contacts 2026' of the operated relay R2020. The latter relay will restore to normal during the inter-digital pause between the transmission of successive digits in order to remove the short-circuit from around the lower winding of relay R1910. Consequently, the latter relay will be reconnected in series with the —D and +D conductors during the inter-digital pause and will restore to normal if a reverse battery flashing signal is returned from the link selector 700 or any subsequent switch in the switch train. The relay R1910, however, remains operated over the circuit including its upper winding and it does not interfere with the loop impulses transmitted by the impulse sender 1900A.

As a further result of the operation of the relay R2020, at its contacts 2021', it completes a circuit including the contacts 1959, 1945 and 2018 for locking the auxiliary supervisory relay R1940 in its operated position during the time that the first series of impulses are being transmitted by the ampulse sender. At its contacts 2024', the relay R2020 completes a circuit from ground at contacts 2063' by way of the contacts 2049, 2024' and 1946 for operating the send digit relay R1930. This relay, at its "X" contacts 1937, locks itself to ground at contacts 2017 and is accordingly retained in its operated position until the relay R2010 subsequently restores to normal. At its contacts 2022, the relay R2020 reconnects ground potential to the conductor C2118 in order to reinitiate the cyclic operation of the prime mover relays R2080, R2085 and R2090.

Finally, at the contacts 2024, the relay R2020 connects ground at the contacts 1951 by way of the contacts 2033, 1961 and 2011, conductor C2117, contacts 2191, to the B conductor C2012 in order to control the digit register 1500A so that it will mark one of the conductors C2018—1 to C2018—9, inclusive, in accordance with the first digit register in the digit register. The counting relays in turn will connect the marking conductors one after another to the test conductor C2112 each time an impulse is transmitted by the contacts 2088 over the loop circuit including the —D and +D conductors C1871 and C1908. It should be noted that during the cyclic operation of the prime mover relays, the contacts 2083 are periodically opened and thereby cause the sender pilot lamp L1154 at the operator position to be flashed at the pulsing rate of relay R2080. The flashing condition of the lamp L1154 indicates to the operator that the impulse sender is operating to transmit impulses.

The reapplication of ground potential to the conductor C2118 by the operation of relay R2020, causes the cyclic operation of the prime mover R2080, R2085 and R2090 and the counting operations of the counting relays R2130 to R2170, inclusive, to be restarted. Accordingly, the contacts 2088 will transmit impulses over the —D and +D conductors and simultaneously therewith, the counting relays will be operated to count the number of pulses to be transmitted.

In the link selector 700 the line relay R710 will restore and reoperate each time the loop circuit is interrupted by the contacts 2088 in order to raise the wipers 773 to 776, inclusive, in a vertical direction a number of steps corresponding to the number of impulses transmitted.

As the counting relays R2130, etc., operate, the contacts 2131, 2141, 2151, 2161 and 2171 successively connect the marking conductors C2018—1 to C2018—5, inclusive, to the test conductor C2112. If the first digit registered in the digit register 1500A is greater than the digit 5, no ground potential will be found on any one of the above noted marking conductors. Therefore, when the fifth counting relay R2170 operates, at its contacts 2176, it connects the grounded conductors C2118 to the winding of the transfer relay R2110. The relay R2110 now operates and, at its contacts 2111, prepares a locking circuit for itself in series with the transfer relay R2120 and the grounded conductor C2118. The locking circuit, however, does not become effective until the prime mover relay R2085 restores at the end of the fifth counting cycle and causes the restoration of the fifth counting relay R2170. The latter relay, at its contacts 2174, reestablishes the circuit for the first counting relay R2130 and, at its contacts 2176, it interrupts the initial operating circuit for the transfer relay R2110. The relay R2110 now locks itself in its operated position in series with the relay R2120 and the latter relay now operates and locks to the conductor C2118. At its contacts 2121, the relay R2120 disconnects the test conductor C2112 from the contacts 2131, etc., on the counting relays. Also, at its contacts 2122, the relay R2120 connects the test conductor C2112 to the contacts 2132, 2142, 2152, 2162 and 2172. Accordingly, as the counting relays count the pulses 6 to 10, inclusive, during the second cycle and the above noted contacts will respectively connect the marking conductors C2018—6 to C2018—9 to the test conductor C2112. Actually, the fifth counting relay R2170 upon operating the second time in response to the tenth pulse will connect ground at its contacts 2172 to the test conductor C2112 and will accordingly stop pulsing of the prime mover relays after ten impulses have been counted.

From the foregoing description of the operation of the counting relays R2130 to R2170 and the operation of the transfer relays R2110 and R2120, it will be understood that the counting relays will count through the first cycle of five pulses and then will reoperate to count through a second cycle of five pulses to successively test the marking conductors C2018—1 to C2018—9, inclusive.

As soon as the counting relays find the conductor marked with a ground potential in accordance with the digit registered in the register 1500A, the test conductor C2112 will be grounded in order to now complete an energizing circuit for the upper winding of the differential relay R2030. The lower winding of this relay is also energized at this time from ground at contacts 2053 and since the relay is of the differential type, the relay will now restore to normal. At its contacts 2038, the relay R2030 connects ground potential to the relay R2090 in order to terminate further operation of the prime mover relays. Also, at its contacts 2032, the relay R2030 removes ground potential from the conductor C2118 thereby to cause the restoration of operated ones of the counting relays R2130, etc. As a further result of the restoration of relay R2130, at its contacts 2039, it completes a circuit which may be traced from ground at contacts 2048 and then by way of the contacts 2022′ 2039, 2019, 1952′ and 1918 for operating the first digit relay R1915. This relay upon operating locks itself by way of its "X" contacts 1916 to ground at contacts 2017 and indicates that the first digit has been transmitted. Also, at its contacts 1918, the relay R1915 interrupts its initial operating circuit; and, at its contacts 1917, it disconnects the auxiliary start relay R1905 from the SAS conductor C1880.

When the counting relays restore to normal, as noted above, ground potential is removed from the test conductor C2112 in order to interrupt the energizing circuit for the upper winding of the relay R2020. This relay has been locked in its operated position over the circuit including its upper winding, contacts 2035, 2042 and 2053 and when the relay R2030 restores, the relay R2020 locks itself by way of the contacts 2036 to ground on the test conductor C2112. Thus, the removal of ground from the test conductor C2112 now permits the relay R2020 to restore. Also, the removal of the holding ground potential from the test conductor C2112 permits the prime mover relay R2090 to restore and reinitiate cyclic operation of the prime mover relays.

As soon as the relay R2020 restores, at its contacts 2025′, it also removes ground potential from the A conductors C2017 in order to control the digit register 1500A so that it will remove the marking ground potential from the particular marking conductor C2018—1 to C2018—9 that has been marked in accordance with the first registered digit. Furthermore, it should be noted that after the restoration of the relay R2030 and before the restoration of the relay R2020, ground potential at the contacts 1951 is connected by way of the contacts 2024, 2033, 1961 and 2011, conductor C2117, and the contacts 2191 to the B conductor C2012 extending to the digit register 1500A. This ground is removed from the conductor C2012 as soon as the relay R2020 restores and opens its contacts 2024. Thus, a pulse of ground potential is applied to the conductor C2012 to indicate that the impulses corresponding to the first digit registered in the digit register 1500A have been transmitted. In response to the momentary pulse of ground on the conductor C2012, the digit register 1500A is controlled to return battery potential over the HG conductor C2014. This battery potential operates the digit register transfer relay R2190 in the impulse sender 1900A and, at its contacts 2194, the relay locks itself in its operated position to ground at contacts 2063′. Also, at its contacts 2191 and 2192, the relay R2190 transfers the conductor C2117 from the B conductor C2012 to the OG conductor C2013 extending to the digit register 1500A. Also, at its contacts 2197 and 2198, it disconnects the A conductor C2017 and connects the MG conductor C2016 extending to the digit register 1500 in order to prepare a point in the circuit for sequentially controlling the second, third, etc., digit register relays in the register sender 1500A. This control of the sequential selection of the different register relays occurs after the impulses corresponding to the digit registered therein has been transmitted by the impulse sender.

The impulse sender 1900A, having transmitted the series of impulses corresponding to the first registered digit over the loop circuit to the link selector 700, is now conditioned so that it will automatically provide an inter-digital pause before transmitting the impulses of the next registered digit. Accordingly, a description will now be given of the operation of the impulse sender 1900A to provide an inter-digital pause between the transmission of successive registered digits. When the alternator relays R2020 and R2030 restore to normal at the end of the transmission of the impulses of a first digit, ground potential is reapplied to the conductor C2218 at the contacts 2021 and 2031. This reinitiates the cyclic operations of the prime mover relays R2080, R2085 and R2090 so that impulses are again transmitted to the counting relays and the contacts 2088 are interrupted in the normal manner in an attempt to send corresponding loop impulses over the −D and +D conductors. However, during the inter-digital pause the contacts 2088 are short-circuited over a circuit including the contacts 2064 and 2025. Thus, thes interruptions at the contacts 2088 are ineffective to control the loop impulsing circuit during the inter-digital pause.

The counting relays, however, operate, in the manner previously described, one after another until the second counting relay R2040 operates a second time in response to the counting of the seventh impulse and closes its contacts 2142. When this occurs, ground potential at the contacts 1951 is connected by way of the contacts 2023 and 1933, conductor C2113, contacts 2142, 2122, 1953, 2072 and 1942 in order to operate the alternator relay R2030 in the manner previously described. It may be well to mention at this time that the digit space test conductor C2113 may be connected to any one of the contacts on the counting relays so that the inter-digital pause may be arbitrarily varied in accordance with any number of pulses from 1 to 10. The relays R2030 and R2020 cooperate in the manner previously described to restore the counting relays to normal. Also, these relays reinitiate operation of the prime mover relays so that loop pulses will again be transmitted in accordance with the next digit registered in the digit register 1500A. Also, at the contacts 2025′, the relay R2030 now applies ground potential to the M conductor C2016 extending to the digit register 1500A thereby to cause the register to apply the marking potential to one of the marking conductors in accordance with the second digit registered by the toll operator.

The impulses corresponding to the remaining digits and the inter-digital pause between successive digits are transmitted in the manner described above and it should be understood that each of the digits registered in the digit 1500A are transmitted one after another over the −D and +D conductors C1871 and C1908 by the impulse sender 1900A.

When the last digit registered in the digit register 1500A has been transmitted, the digit register 1500A removes ground potential from the hold conductor C2002 in order to restore the digit send relay R2010. When the relay R2010 restores to normal, it interrupts, at its contacts 2018 the circuit for the auxiliary supervisory relay R1940. Since the relay R2020 is in its restored position at this time it interrupts, at its contacts 2021′, the previously described alternate locking circuit for the relay R1940. Consequently, at the time the digit send relay R2010 restores and interrupts its contacts 2018, the relay R1940 was held from ground at contacts 1911 on the operated loop pulsing supervisory relay R1910. As a further result of the restoration of the relay R1910, at its contacts 2012, it interrupts a further point in the circuit for applying ground potential to the conductor C2118 and, consequently, prevents the prime mover relays from reoperating. At its contacts 2017, the relay R2010 interrupts a point in the locking circuit for the relays R1915 and R1930. Accordingly, the restoration of the relay R2010 causes the relays R1915, R1930 and R1940 to restore to normal and in fact the restoration of the latter relays initiates the release of the impulse sender 1900A.

On certain types of toll connections, the operator may desire to retain the impulse sender 1900A connected to the link 500 and set up connection after the last digit has been transmitted. Normally, the operator will permit the impulse sender to release itself automatically but if she retains the impulse sender connected she may then reoperate her keyset to cause the impulse sender to transmit one or more additional digits. In order to retain the impulse sender 1900A connected to the link 500 after the last registered digit has been transmitted, the operator refrains from actuating the disconnect key K1409 after she has keyed-up the last digit on the operator keyset K1474. By refraining from actuating the disconnect key K1409, the operator prevents the completion of a circuit for the disconnect relay R1450. Also, the operator does not restore the dial front key K1189 so that ground potential at the key contact 1 will hold the dial front relay R1410 in its operated position over the DFH conductor C1884. Consequently, when the digit send relay R2010 restores to normal in response to the transmission of the last digit registered in the digit register 1500, the removal of ground potential at the contacts 2013 from the DS conductor C1873 does not release the dial front relay R1410. Therefore, the switch relay R1420 remains in its operated position and, at its contacts 1421, retains ground potential on the SRS conductor C1872 in order to hold the sender relay R2040 in its operated position. The latter relay, at its contacts 2044, retains ground potential on the release conductor C2001 in order to hold the digit register relays in the digit register 1500A in readiness to respond to additional digits keyed-up by the operator. Also, at the contacts 2049, the relay R2040 holds the digit register transfer relay R2190 in its operated position.

Since the prime mover relays R2080, R2085 and R2090 are in their restored positions, the ground potential at the contacts 2083 is extended over the previously traced circuit including the SRL conductor C1881 in order to retain the sender pilot lamp L1154 in a steady illuminated condition. The steady illuminated condition of the above noted lamp will indicate to the operator that the impulse sender 1900A has completed the transmission of all of the registered digits and that the impulse sender is still connected to the link 500 and the established connection.

The operator may now actuate her keyset K1474 in accordance with one or more additional digits which may be required to control the automatic switch or switches utilized in the above connection to cut-in on the called subscriber line. The additional digits will be registered in the digit register 1500 in the manner previously described and the digit send relay R2010 will reoperate in response thereto. After registering the additional digits the operator will restore her dial front key K1189 to now place the dial front relay R1410 under control of the impulse sender 1900A; she will momentarily actuate the disconnect key K1409 in order to operate the disconnect relay R1450; and, she will momentarily actuate the dial auxiliary start key K1190 in order to operate the auxiliary start relay R1905.

The operation of the disconnect key K1409 will complete a circuit including the contacts 1441 for operating the disconnect relay R1450 and the latter relay, at its contacts 1452, locks itself in its operated position to ground at contacts 1425. Also, at its contacts 1451, the relay R1450 interrupts the circuit for the key control relay R1440 which relay restores to normal and disconnects the operator keyset K1474 from the digit register 1500A.

The momentary actuation of the auxiliary start key K1190 applies ground potential by way of the SAS conductor C1489, contacts 1468A, SAS conductors C1880, contacts 1917 and 2046 for operating the auxiliary start relay R1905. The latter relay, at its contacts 1907, locks itself in its operated position and, at its contacts 1906 it completes an obvious circuit for operating the auxiliary supervisory relay R1940. It should be noted that the operation of the auxiliary start key K1190 is only required in the event that the loop pulsing supervisory relay R1910 has been restored to normal. In other words, if during the setting-up of the connection a reverse battery condition is encountered, the current flow returned over the loop circuit including the —D and +D conductors will be in such a direction that the loop pulsing supervisory relay R1910 will be in its restored position. It will then be necessary to operate the auxiliary start relay R1905, as noted above, so that it in turn will operate the relay R1940 and thereby cause the impulse sender 1900A to transmit loop impulses over the reverse battery loop circuit.

Reoperation of the digit send relay R2010, as noted above, controls the prime mover relays R2080, R2085 and R2090 and the counting relays so that impulses corresponding to the first of the additional digits registered in the digit register 1500A are transmitted over the —D and +D conductors C1871 and C1908 to the link 500 and subsequent switches in the switch train. The additional series of impulses will further control the setting-up of the connection to the desired called party.

Since the operator has now completed her control of the impulse sender 1900A, she may disconnect her common equipment 1100 from the link 500 by operating and then restoring the link key K601 to its normal position and then restoring the dial front key K1189. The impulse sender, however, will continue to transmit the additional digits registered in the digit register 1500A as previously described. After all of the digits are transmitted, the digit send relay R2010 will restore to normal and thus cause the restoration of the first digit relay R1915, the send digit relay R1930 and the auxiliary relay R1940 in the manner described above. Also, at the contacts 2013, the relay R2010 removes ground potential from the DS conductor C1873 in order to restore the dial front relay R1410. The latter relay, at its contacts 1412, opens the circuit for the switch relay R1420 which also restores to normal. At its contacts 1422, the relay R1420 removes ground potential from the DF conductor C674 in order to restore the dial front relay R660 in the link 500. The latter relay, at its various contacts, now connects the tip and ring conductors C701 and C702 to the circuit including the upper winding of the front supervisory relay R640 in the link 500 and it opens the previously described loop circuit including the loop impulsing conductors C671 and C672 extending to the link finder 1400A. The latter conductors are connected respectively to the +D and —D conductors C1908 and C1871 in series with the lower winding of the loop pulsing supervisory relay R1910. The latter relay, however, does not restore to normal. At the present time the impulse sender 1900A is disconnected from the link 500. Also, the connection between the calling and called parties is established through the link 500 in the manner to be described hereinafter.

As a further result of the restoration of the switching relay R1420, at its contacts 1421, it disconnects ground potential from the SRS conductor C1872 thereby to interrupt the circuit of the sender seize relay R2040 which now restores to normal. At its contacts 2044, the relay R2040 removes ground potential from the RLS conductor C2001 extending to the digit register 1500A thereby to release the last-mentioned register. At its contacts 2045, the relay R2040 applies ground potential to the SRN conductor C1879 extending to the operator common equipment 1100 so that the operator may reconnect her position equipment with the impulse sender 1900A in the event that she desires to extend another call. Also, at its contacts 2049, the relay R2040 interrupts the digit for the digit register transfer relay R2190 to permit the latter relay to restore to normal for use in the subsequent call. Finally, at its contacts 2041, the relay R2040 interrupts the circuit for the upper winding of the loop pulsing supervisory relay R1910 in order to restore the latter relay. At the present time the impulse sender 1900A has been fully restored to normal and may be connected by means of the link finder 1400A to a link selector, such as the link selector 700, of another link.

As a further result of the restoration of the switching relay R1420, at its contacts 1425, it interrupts a point in the locking circuit for the disconnect relay R1450, whereupon, the latter relay restores to normal. Finally, at its contacts 1426, the relay R1420 interrupts a point in the circuit including the SRL conductor C1881 and the SFL conductor C1490 in order to extinguish the sender pilot lamp L1154 at the operator common equipment 1100. As soon as the sender pilot lamp L1154 is extinguished, it will indicate to the operator that the impulse sender 1900A is available for use in transmitting impulses to set up another toll connection.

As noted previously, the operator may disconnect her common equipment 1100 from the link 500 as the impulse sender 1900A sends out the registered digits by operating and then restoring the link key K601 and then restoring the dial front key K1189. As soon as the key K601 is operated, the contact springs A to D, and F to I, inclusive, of the key will be actuated. Thus, the contact springs D of the key K601 applies ground potential to the ALB–2 conductor C997 extending to Fig. 9 in order to retain the position all links busy relay R990 operated and the contact springs B complete a circuit for operating the control relay R560 over a circuit including its lower winding. When the key K601 is restored the above key contacts are opened.

It should be noted that the relay R570 was held operated under control of the contact 620 to ground potential on the conductor C627. The subsequent operation of the rear supervisory relay R510 will return ground potential, at contacts 513, in order to hold relay R570 operated so that ground potential is not inadvertently removed from the C conductor C463.

The application of ground potential to the ALB–2 conductor C997 under control of the contact springs D on the key K601 is for the purpose of holding the position all links busy relay R990 operated until the key K601 is subsequently restored to normal.

As soon as the control relay R560 operates under control of the contact springs B on the link key K601, it completes a locking circuit for iself which includes ground at its contacts 554, the upper winding of the relay R560, the resistor 574, and battery. This relay is retained in its operated position until the link is subsequently released by operation of the link release key K573. As a further result of the operation of relay R560, at its contacts 555, it prepares a point in the circuit to be traced hereinafter for connecting the front supervisory relay R640 to the front end of the link 500 over the tip and ring conductors C701 and C702. Also, at its contacts 553, the relay R560 completes a circuit including the lower winding of relay R640 whereby the latter relay is preenergized and, thus, conditioned to quickly operate when the current flow through its upper winding is in the proper direction. At its contacts 569, the relay R560 interrupts a further point in the previously traced circuit including the TS conductor C1253 in order to prevent reoperation of the zip-zip tone relays R1210 and R1215 when the rear supervisory relay R510 subsequently reoperates. At its contacts 566, the relay R560 interrupts a point in the circuit including the conductor C997 whereby the latter conductor will be ungrounded incident to the subsequent restoration of the link key K601. Also at its contacts 562 and 563, the relay R560 transfers the circuit for controlling the link identity lamp L669 from the flashing battery conductor to direct battery potential by way of the resistor 579. Consequently, the link identity lamp L669 will be in a steady illuminated condition to indicate to the operator that the call on the link 500 has been answered. At its contact 565, the circuit heretofore traced from ALB–1 over conductor C996–1 for the operation of busy relay R550 is interrupted, since ground potential on the C conductor C463 must now remain principally under the control of relay R570. At its contact 564, a point is prepared to operate busy relay R550 so as to cause its reoperation at the completion of the conversation and the release of relay R570 in order to return a ground on the C conductor C463 after the chain of circuits leading up to link 500 have been released by the removal of ground potential on the C conductor by the release of relay R570. This return of ground potential to the C conductor C463 now prevents this link 500 from reuse or reseizure until the operator has released the link. Finally, at its contacts 567, the relay R560 interrupts a point in the circuit for the cut-in relay R610. When the contacts F of the key K601 are open the relay R610 restores to normal.

Restoration of the cut-in relay R610 now couples the rear end of the link 500 to the front end thereof in order to prepare the talking connection between the calling and called ends of the connection. Thus, at the contacts 612 and 618, the relay R610 disconnects the tip and ring conductors C701 and C702 from the TF and RF conductors C1173 and C1174. At the same instant, the contacts 611 and 617 of the relay R610 are closed to complete a circuit from the tip conductor C701 to the ring conductor C702 by way of the contacts 661, 611, the upper right-hand winding of the repeating coil 627, the resistor 645, the winding of the polarized front supervisory relay R640, the lower right-hand winding of the repeating coil 627, contacts 555, 617 and 663 to the ring conductor C702. In the last mentioned circuit, the loop connection established over the front end of the link now includes the upper winding of the front supervisory relay R640. As a further result of the restoration of the relay R610, at its contacts 614 and 616, it disconnects the tip and ring conductor C461 and C462 at the rear end of the link from the TF and RR conductors C1170 and C1171 extending to the common control equipment thereby to interrupt the circuit for the line relay R1120 in the common control equipment. The relay R1120 restores to normal and, at its contacts 1121, interrupts the circuit for the hold relay R1150. The latter relay now restores to normal due to the fact that the hold circuit including its contacts 1152 has been interrupted by the operation of the link key K601 at the contact springs I thereof. The common control equipment has now been restored to normal.

At the contacts 613 and 615, the restoration of the relay R610 reconnects the tip and ring conductor C461 and C462 on the rear end of the link to the rear supervisory relay R510 which now reoperates. At the contacts 621, the relay R610 reapplies the ground potential on the CR conductor C627 to the DBY conductor C673 in order to mark the link 500 busy to the link finder 1400A associated with the impulse sender 1900A. Finally, at the contacts 624, 625 and 626, the relay R610 disconnects the identity lamps L633, L634 and L635 from the class identity conductors. As a result of the last mentioned circuit interruptions, ground potential is removed from the G2 conductor C1076 extending to Fig. 10, whereupon, the connect relay R1070 restores to normal to remove the ringing and coin reject and collect potentials from the keys of the common equipment 1100. As a further result of the restoration of the connect relay R1070, at its contacts 1075, it interrupts a further point in the circuit for the position all links busy relay R990.

Upon observing the steady illuminated condition of the lamp L669 and the extinguished identity lamps in the link 500, the operator may now restore the link key K601 to its normal unoperated position as previously noted. All of the contact springs of the key K601, consequently, resume the positions illustrated in the drawings. The contact springs B, interrupt the circuit for the lower winding of the relay R560 but the latter relay is now locked in its operated position over the circuit including its upper winding. At the contact springs D, the key K601 removes the final holding ground from the ALB–2 conductor C997 thereby to restore the position all links busy relay R990. Restoration of the latter relay, at its contacts 991 to 995, inclusive, removes the link busy marking ground potential from each of the links associated with the operator position. However, the link 500 is still marked busy to further incoming calls by the ground potential retained on the C conductor C463. The remaining links at the operator position are now rendered available to receive on additional call. At the contact springs G, the key K601 connects ground potential by way of the contacts 568 and 526 to the open contacts 516 on the relay R510 to prepare a circuit for illuminating the rear supervisory lamp L533 in the event the subscriber on the rear end of the link should disconnect. Also, this ground potential is extended by way of the contacts 568, 642 and 666 to complete the circuit for illuminating the front supervisory lamp L668.

In this type of a call the link 500 will be conditioned, as previously explained, prior to the time that the sender has released the dial front relay R660. After the sender has sent out the impulses of the digits necessary to establish the connection over the front end of the link, the relay R660 will restore, as previously noted, to connect the front supervisory relay R640 to the tip and ring conductor C701 and C702 prior to the time that the so-called reverse battery supervisory signal is transmitted back to the link 500. Consequently, the current flow through the upper winding of the front supervisory relay R640 will be in such a direction that the relay will not operate and the contacts 642 will remain closed to complete the previously traced circuit for illuminating the front supervisory lamp L668. The illuminated condition of the lamp at this time will indicate to the operator that the called party has not answered the call. However, as soon as the call is answered, the current reversal will take place over the conductors C701 and C702 so that the current flow through the upper winding of the front supervisory relay R640 will be in the proper direction to operate the relay. At the contacts 642, the relay R640 will now interrupt the circuit for the lamp L668 to indicate to the operator that the call has been answered. Having noted the time that the call has been answered, the operator may make out the usual toll ticket and then time the call so that an appropriate charge may be made for the toll call. As a further result of the operation of relay R640, at its contacts 641, it now completes a circuit for operating the marginal flash front relay R650 from ground at the contact springs G on the link key K601, contacts 568, 641, 653, resistor 643 and the upper winding of the relay, to battery. Due to its marginal characteristics, the relay R650 will be energized to close only its X contacts 651. The closing of the X contacts 651 prepares a point in the circuit for operating both of the windings of the relay R650 in series in response to the subsequent opening of the contact 641 by the relay R640.

*Supervision*

In the previous description of the operation of the apparatus, it was pointed out that the operator upon receiving a call may disconnect her common equipment 1100 from the particular link over which the call was received immediately after the impulse sender 1900A is controlled to set up the connection. It is the momentary actuation of the link key K601 associated with the link 500 that disconnects the operator equipment 1100 from the link. When the disconnection has been accomplished, the loop circuit from the calling subscriber substation is connected to the rear supervisory relay R510 over the tip and ring conductors C461 and C462. The loop circuit, including the called party, is connected to the front supervisory relay R640 over the tip and ring conductors C701 and C702. When the above mentioned connections have been completed, the calling and the called ends, that is the rear and the front ends of the link 500 are inductively coupled for conversation through the left and right hand windings of the repeating coil 627 in the link 500. Transmission current is supplied to the calling subscriber line through the windings of the rear supervisory relay R510 and the transmission current for the called party line is supplied from the switching apparatus over which the connection is completed to the called party. If a connector, such as the connector 1306, is included in the connection, the transmission current will be supplied back to the link 500 from the line relay R1320 and the transmission current will be supplied to the called party line from the answer relay R1310. If a toll line involving a remote exchange is included in the connection, the transmission current may be supplied back to the link 500 and to the called destination from the repeaters included in such a connection.

During the time that the connection is established between the calling and called stations, it may become necessary for the calling subscriber, at substation A for example, to again require the services of the operator. In order to recall the operator into the established connection, the subscriber at substation A may momentarily interrupt the loop circuit including the windings of the rear supervisory relay R510 a number of times by means of the switchhook at the calling substation. When the loop circuit is thus interrupted, the rear supervisory relay R510 restores to normal and completes, at its contacts 516, a circuit for operating the flash rear relay R630. This circuit may be traced from ground at the contact springs G on the link key K601 and then by way of the contacts 568, 526, 516, 561 and the upper winding of the relay R630, to battery. The relay R630, upon operating completes, at its contacts 631, a locking circuit for its lower winding which includes ground at the contact springs G on the key K601. Accordingly, the relay R630 will operate and lock itself upon the first momentary restoration of the rear supervisory relay R510. If the subscriber should continue to momentarily actuate the switchhook, the rear supervisory relay R510 will momentarily restore and reoperate. Due to its slow-to-release characteristics, the hold relay R570 will normally remain in its operated position during the flashing of the relay R510.

As soon as the flash rear relay R630 operates, it completes, at its contacts 632, a circuit for transmitting ground impulses at the rate of 30 impulses per minute to the rear supervisory lamp L533. This circuit may be traced from the 30 IPM conductor C676, the rectifier 667, contacts 632 and 561 and the rear supervisory lamp L533 to battery. The supervisory lamp L533 will now flash 30 times per minute to indicate to the operator that the subscriber connected to the rear of the link 500 desires to converse with the operator.

If the operator now desires to bridge her headset 1245 across the established connection so that she may converse with the interconnected parties, she may do so by operating the link key K601 in the link 500. However, if the operator desires to split the connection between the calling and called ends, that is the rear and front ends, of the link 500, she will also operate either the split rear key K1191 or the split front key K1192 in the operator common equipment 1100 immediately after she operates the link key K601. If the split rear key K1191 is operated, the operator headset 1245 will be connected to the front or called end of the link and the calling or rear end of the link will be disconnected from the conversational circuit established between the called party and the operator. If the split front key K1192 is operated, the headset 1245 will be connected to the rear or calling end of the link and the called of front end of the link will be disconnected from the conversational circuit.

When the key K601 is actuated to reconnect the operators equipment 1100 to the link 500, various operations previously described are repeated. At the contact springs B the control relay R560 is held in its operated position. At the contact springs D, ground potential is applied to the conductor C997 in order to reoperate the position all links busy relay R990 and prevent additional calls from being distributed to other links at the operator position. At the contact springs G, the locking circuit for the flash rear relay R630 is interrupted so that the latter relay will restore to normal and remove the flashing condition from the rear supervisory lamp L533. At the contact springs I, ground potential is removed from the conductor C1167 to interrupt a further point in the incomplete hold circuit for the hold relay R1150. Finally, at its contact springs F, the link key K601 connects the winding of the cut-in relay R610 in the link 500 through the chain contacts of the link keys of all of the remaining links at the operator position to the conductor C1169 extending to Fig. 11. The purpose of the chain contacts thru the keys of all links at an operator's position in the circuit path from ground potential equipment on conductor C1169 thru contacts F of key K601 to relay R610 is to make certain that the operators common equipment is associated with only one link at only one time. The cut-in relay R610, however, will not operate at this time unless the operator actuates one of the plurality of keys in the position equipment. Finally, at the contacts A and C on the link key K601, the operator will bridge her headset circuit across the righthand windings of the repeating coil 627.

Referring now to Fig. 12, it will be seen that the operator's headset 1245 is bridged across the conductors C1251 and C1252, which extend to the contact springs A and C, respectively, of the key K601 and which are also multiply connected to corresponding contact springs on the link keys of all of the remaining links at the operator position. Since the contact springs A and C of the link key K601 are closed, the operator headset will now be connected to the right hand windings of the repeating coil 627 and in multiple therewith to the tip and ring conductors C701 and C702 extending to the called destination. The operator when connected in this manner to the connection, may listen and converse with both subscribers involved in the established connection.

With the link key K601 operated in the manner noted above, the operator headset 1245 is connected directly to the link 500 and bypasses the circuits included in the common position equipment 1100.

If the operator should desire to split the established connection between the calling and called stations and connect her headset 1245 to the calling line, she may now actuate the split front key K1192. As soon as the contact springs 1 of the key K1192 are closed, ground potential is applied to the A conductor C1169 extending to Fig. 6, then through the closed chain contacts of all of the link keys at the other links at the position, the contact springs F of the link key K601 and the winding of the cut-in relay R610, to battery. The relay R610 now operates in order to disconnect the tip and ring conductors C461 and C462 from the left-hand windings of the repeating coil 627 and the rear supervisory relay R510 and in order to connect these conductors by way of the conductors C1170 and C1171 to the windings of the line relay R1120 in the position equipment 1100. In transferring the tip and ring conductors C461 and C462 from the rear supervisory relay R510 in the link 500 to the line relay R1120 in the common position equipment 1100 the circuit for the latter relay is the same as previously described and includes the left hand windings of the repeating coil 1155. The line relay R1120 operates and completes, at its contacts 1121, the previously described circuit for operating the hold relay R1150. The latter relay operates but inasmuch as ground potential has been removed from the conductor C1167, the relay will not lock in its operated position.

As a further result of the operation of the cut-in relay R610, at its contacts 611 and 617, it disconnects the called end of the connection including the tip conductor C701 and the ring conductor C702 from the previously described circuit including the right hand windings of the repeating coil 627 and the winding of the front supervisory relay R640 and simultaneously therewith, at its contacts 612 and 618, it connects the tip and ring conductors C701 and C702 by way of the TF and RF conductors C1173 and C1174 to the contacts 3 and 4, respectively, of the now actuated split front key K1192, and the upper and lower windings of the front supervisory relay R1160. The latter relay does not operate at this time due to the fact that the current flow over the tip and ring conductors C701 and C702 has been reversed and is in such a direction that both windings of the differential relay R1160 are energized and prevents its operation. In view of the last-mentioned circuit, it will be apparent that the operation of the split front key K1192 holds the connection established over the front end of the link 500 and, at its contact springs 2 and 5, the key K1192 disconnects the front end of the connection from the right hand windings of the repeating coil 1155. Other operations performed by the contacts on the cut-in relay R610 are substantially the same as has been previously explained, but it should be noted that the CLR lamp L635 is again illuminated to indicate the class of the call through the link 500 to which the operator is reconnected.

At the present time the operator headset 1245 is bridged across the right-hand windings of the repeating coil 1155 and is, consequently, inductively coupled with the left-hand windings of the repeating coil so that the operator may now converse with the calling subscriber to ascertain the reason for the recall supervisory signal on the rear of the link 500.

If the calling subscriber at substation A should now decide to release the connection and hangs up the receiver at the substation, the loop circuit for the line relay R1120 will be interrupted and the relay will restore to normal and also cause the release of the hold relay R1150. Since the operator is connected directly to the calling line, as noted above, she will be aware of the release of the connection and may inform the called party of the disconnection. Thereafter, the operator may release the link 500 and the switching apparatus involved in the connection in a manner to be described hereinafter.

After the calling subscriber has obtained the desired information from the operator on a flashing recall supervisory signal, as described above, the operator may reconnect the calling and called stations involved in the connection with the link 500 by restoring the split front key K1192 to its normal position and then restoring the link key K601. Restoration of either the key K601 or the key K1192 will cause the cut-in relay R610 to restore to normal and again disconnect the operator common equipment 1100 from the link 500 and the restoration of the link key K601 will remove the operator's talking connections and again establish the previously described conversational connection through the link 500 between the calling and called stations.

It was assumed in the previous description that the calling subscriber desired to recall the operator and did so by flashing the rear supervisory relay R510 in the link 500. However, if the subscriber releases the connection by hanging up the receiver at the calling substation instrument, the loop circuit for the rear supervisory relay R510 will be interrupted and the relay will remain in its restored position instead of only momentarily restoring as is the case on a flashing recall. As previously stated, the contacts 516 of the relay R510 are again closed in order to cause the operation of the flash rear relay R630 and the latter relay, at its contacts 632, again connects the ground pulses on the 30 I. P. M. conductor C676 to the rear supervisory lamp L533. On a flashing recall, the lamp L533 will flash due to the fact that the relay R510 reoperates and opens its contacts 516. On a disconnect signal, the relay remains in its restored position and ground potential at the contact springs G on the link key K601 is connected by way of the contacts 568, 526 and 516 to the lamp L533 and, consequently, the lamp burns in a steadily illuminated condition instead of flashing. The steady illuminated condition of the lamp L533 will indicate to the operator that the calling subscriber has released the connection. Therefore, the operator may release the link 500 in the manner to be described hereinafter without re-entering the connection by the actuation of the link key K601.

It should be noted, that on a disconnect signal from the calling line, the rear supervisory relay R510 remains in its restored position and interrupts, at its contacts 513, the circuit for the hold relay R570 which, subsequently, restores to normal. At its contacts 572, the relay R570 now removes the holding ground potential from the C conductor C463 in order to release the CLR trunk circuit 401 and the remaining switching apparatus included in the connection between the now released calling subscriber substation A and the CLR trunk circuit 401. As a further result of the restoration of the relay R570, at its contacts 571, it completes a circuit including the contacts 564 for operating the busy relay R550. The latter relay upon operating, at its contacts 551, reapplies ground potential to the C conductor C463 in order to immediately mark the link 500 busy to any of the trunk circuits, such as the trunk circuit 401, having access thereto. In other words, the release of the call by the calling subscriber on the rear end of the link 500 signals the operator of the disconnection and the link automatically operates to permit the restoration of the preceding switching apparatus. Immediately after the release of the preceding switching apparatus under control of the removal of ground potential on the C conductor C463, the link again applies ground potential to the C conductor C463 in order to mark the link busy until it is fully released by actuation of the link release key K573.

*Hold subscriber*

If the operator desires to prevent the calling party from releasing the switching apparatus included in a connection extended to the link 500, she may do so by operating the hold key K670. Each link is provided with a similar key and when it is operated it completes an operating circuit for the busy relay R550 which holds ground potential, at contacts 551, on the C conductor C463 thereby preventing any of the preceding circuits from releasing when the relays R510 and R570 subsequently restore, incident to a disconnect by the calling party. The usual disconnect signal will be given to the operator but the preceding switches are retained in their operated positions. By operating the link key K601 and the ring rear key K1181 the operator may ring the calling party that has replaced the receiver.

Before describing the release of the link 500, the operations in the link 500 in response to a flashing recall signal and a disconnect signal received over the front end thereof will be discussed. During the time that the connection is retained between the calling and called ends of the link 500, the front supervisory relay R640 is in its operated position and the flash front relay R650 is operated in its first step to close its X contacts 651.

If the called subscriber or a distant operator included in the connection over the front end of the link 500 returns recall supervision to the link 500, the reverse battery potential on the T and R conductors C701 and C702 will momentarily again be reversed so that battery potential will be momentarily applied to the ring conductor C702 and ground potential will be momentarily applied to the tip conductor C701. Each time this occurs, the current flow through the front supervisory relay R640 will be in a direction that will cause the relay to momentarily restore to normal. Incident to the first restoration of the relay R640, the contacts 641 are opened thereby to remove the short circuit from around the lower winding of relay R650. The relay will then operate fully over the circuit including both its windings in series and completes, at its contacts 652, a circuit for connecting a 30 I. P. M. conductor C676 by way of the rectifier 667, contacts 652 and 666 to the front supervisory lamp L668. Consequently, the lamp L668 will flash to indicate to the operator that the connection established over the front end of the link 500 requires her attention. As a further result of the operation of relay R650 in its second step, the contacts 653 are opened in order to interrupt the initial operating circuit for the upper winding of the relay R650. As soon as the front supervisory relay R640 reoperates, at the end of the momentary current reversal over the conductor C701 and C702, it opens its contacts 642 in order to prevent direct ground potential from shorting the 30 I. P. M. ground pulses and, at its contacts 641, it again recloses a point in the previously described circuit for operating the relay R650 in its first step over the circuit including the resistor 643 and its upper winding. The last-mentioned circuit, however, is interrupted at the contacts 653 as soon as the relay R650 operates in its second step.

As soon as the operator observes the flashing front supervisory lamp L668, she may bridge her headset 1245 across the right-hand windings of the repeating coil 627 by operating the link key K601 in the manner previously described. When this is accomplished, the operator may converse with the calling and called parties involved in the connection through the link 500 and ascertain the reason for the recall by the called subscriber or operator connected to the front end of the link 500. As soon as the link key K601 is operated, the contact springs G thereof, are opened in order to interrupt a point in the locking circuit for the flash front relay R650 which restores to normal and interrupts, at its contacts 652, the flashing circuit for the lamp L668. As a further result of the restoration of relay R650, at its contacts 653, it again completes the initial energizing circuit for operating the relay R650 to reclose its X contacts 651.

If the operator should desire to split off and hold the connection over the rear of the link 500 while she converses with the called party or operator connected over the front end of the link, she may operate the split rear key K1191 in the common equipment 1100 immediately after she has actuated the link key K601. Actuation of the split rear key K1191 will cause the cut-in relay R610 to reoperate and connect the rear and front ends of the link respectively to the common equipment 1100 in the same manner as has been described above in connection with the operations resulting from actuation of the split front key K1192.

The circuit for operating the cut-in relay R610 includes the ground potential at the contact springs 1 of the split rear key K1191, conductor C1169 extending to Fig. 5, the chain contact springs of the link keys at the remaining links at the operator position, contact springs F of the actuated link key K601 and the winding of the cut-in relay R610, to battery. The relay R610 operates in the manner previously explained to disconnect the tip and ring conductors at the rear and front ends of the link respectively from the repeating coil 627 and to connect these conductors respectively to the common equipment 1100. In Fig. 11 the tip and ring conductors from the front end of the link are connected over the previously traced circuits including contact springs 2 and 5 of the split front key K1192, right-hand windings of the repeating coil 1155 and the serially connected windings of the front supervisory relay R1160. In the last-mentioned circuit, the relay R1160 remains in its restored position, even though it is energized over both of its windings in series, because the windings are in opposition to one another. Since the operator headset 1245 is bridged across the right-hand windings of the repeating coil 1155, the operator may now converse with the called party or operator that has transmitted the recall signal back over the front end of the link 500.

As a further result of the actuation of the split rear key K1191, at its contact springs 2 and 5, it disconnects the left-hand windings of the repeating coil 1155 from the TR and RR conductors C1170 and C1171 connected to the rear end of the link and, at its contact springs 3 and 4, it connects these conductors to the line relay R1120 in the manner previously described. Since the left-hand windings of the repeating coil 1155 are now disconnected from the connection including the rear end of the link 500, the calling party cannot hear the conversation between the operator and the called party connected to the front end of the link.

After the called party has obtained the desired information from the operator, the operator may reconnect the calling and called stations involved in connection with the link 500 by restoring the split rear key K1191 to its normal position and thereafter restoring the link key K601. Incident to the restoration of the key K1191, the cut-in relay R610 will restore to normal and again disconnect the operator common equipment 1100 from the link 500. The restoration of the link key K601 will again establish the previously described conversational connection through the link 500 between the calling and called stations.

It was assumed in the above description that the called subscriber or operator included in the connection over the front end of the link 500 caused the flashing recall signal on the front supervisory relay R640. However, if the connection established over the front end of the link 500 is released by either the called subscriber or the operator included in such a connection, the current flow over the tip and ring conductors C701 and C702 back to the link 500 will be reversed so that the supervisory relay R640 will remain in its restored position instead of only momentarily restoring as is the case in a flashing recall. As previously stated, the restoration of the relay R640 completes the circuit for operating the flash front relay R650 in order to transmit the 30 I. P. M. pulses on the conductor C676 to the front supervisory lamp L668. However, since the front supervisory relay R640 remains in its restored position in response to a disconnect signal, the contacts 642 remain closed so that the ground potential at the contact springs G on the link key K601 is connected by way of the contacts 568, 642 and 666 to the front supervisory lamp L668. When this circuit is completed, the lamp will be steadily illuminated to indicate the disconnect signal. instead of flashed to indicate the recall signal.

If the connection to the link 500 is also released by the calling subscriber, the rear supervisory lamp L533 will be steadily illuminated to indicate to the operator that the link has now been released at both ends of the established connection. The operator may release the link 500 without re-entering the connection.

*Releasing the link 500*

Incident to the release of a connection by the calling and called parties, the rear supervisory lamp L533 and the front supervisory lamp L668 in the link 500 will be steadily illuminated. The only relays in the link that remain in their operated position after the disconnection by the calling and called parties are the control relay R560 which is locked in its operated position over a circuit including its contacts 554, its upper winding and the resistor 574; the flash rear relay R630 which locked in its operated position over a circuit including its lower winding and ground at the contact springs G of the link key K601; the flash front relay R650 which is locked in its operated position over a circuit including both of its windings in series and ground at the contact springs G of the link key K601; and the busy relay R550 which is held in its operated position over a circuit including contacts 564 and 571. All of the switching apparatus involved in establishing the connection from the calling subscriber station to the link 500 has been released. However, the switching apparatus included in the connection over the front end of the link to the called subscriber line or called operator is retained in its operated position. The busy relay R550, as previously noted, at its contacts 551, maintains a busy marking ground potential on the conductor C463 in order to busy the link 500 against seizure by any link selecting trunk circuit.

Each link, is provided with a link release key K573 for the purpose of releasing the associated link. In order to release the link 500, the operator momentarily actuates the link release key K573. Consequently, ground potential is now connected by way of the left-hand contacts of the key K573, upper winding of the control relay R560 and the contacts 554, to ground. The control relay R560 is thus short-circuited and it restores to normal. Also the ground potential is connected through the right-hand contacts of the link release key K573 to the PC meter conductor C556 in order to operate a peg count meter (not shown). Accordingly, the peg count meter is actuated each time a link is released in order to record the number of calls handled by the links at the operator position.

When the control relay R560 restores to normal it interrupts, at its contacts 553, the preenergizing circuit for the lower winding of the front supervisory relay R640. This relay, however, is in its restored position due to the reverse battery disconnect signal transmitted thereto from the called end of the connection. At its contacts 555, the relay R560 interrupts the previously described loop circuit including the tip and ring conductors C701 and C702 over the front end of the link, thereby to cause the release of all of the switching apparatus utilized in the connection established over the front end of the link 500. At its contacts 564, the relay R560 interrupts the circuit for the lower winding of the busy relay R550, whereupon the latter relay restores to normal. At its contacts 568, the relay R560 removes the ground potential at the spring contacts G of the link key K601 from the previously described circuits including the holding circuit for the flash rear and flash front relays R630 and R650 whereupon these relays restore to normal and also the circuit for illuminating the lamps L533 and L668. At its contacts 569, the relay R560 reapplies ground potential to the conductor C815 in order to return one of the multiple grounds to the relay R865 to indicate that the position has an available link. All of the relays in the link 500 have now been restored to normal thus rendering the link available for use in another toll call.

Attention is now directed to one of the novel features of this invention which makes it impossible for an operator to disconnect the subscribers making long distance calls. Attention is called to the fact that during the release, above described, the subscriber's loop circuit including conductors C461 and C462 has not been opened and therefore if the release key K573 is depressed, in error, before the subscriber has restored his receiver, the rear supervision relay R510 remains operated. Thus, the release by the key K573 of relay R560 causes the contacts 567 to complete the circuit from ground at 574 to reoperate relay R610. The operation of relay R610 connects the loop circuit from the calling subscriber, as heretofore described, back to the operator's common equipment 1100 where the operator's telephone circuit is always attached. The calling subscriber and operator are automatically instantly connected with each other. The link identity lamp L669 will now flash, through the same circuit heretofore traced, from flash battery contacts at 563, to ground on conductor C627 by way of contacts 620 on the link she has erroneously released. Thus the operator may now challenge the connection and is notified of her error and must reestablish the connection before she can proceed with other calls.

However, if the operator fails to receive a disconnect signal when a subscriber hangs up, for example, due to the failure of the subscriber's telephone circuit to properly function, such as the failure of the hook switch to open the loop, or if an extension telephone receiver is not replaced, or other possible mechanical difficulties, the same routine, as described above may be followed. The operator, under the latter conditions, would get no response from the subscriber when she challenges the line. The operator can now proceed, through a secondary method of release, to disconnect this "out of order line" from the toll positions. To accomplish this the operator will now operate key K1184. The operation of key K1184 opens the subscriber's loop circuit including conductors C1170 and C1171 which are traceable through contacts 614 and 616, 541 and 543 to conductors C461 and C462. As a further result of the operation of key K1184, ground potential is removed from the CR conductor C627 in order to restore the hold relay R570. It is remembered that relay R510 restored to normal following the operation of relay R610 and thereby removed the holding ground from relay R570 at contacts 513. The release of R570 removes ground from the C conductor C463, at its contact 572, in order to release all of the switches in the connection extended to the link 500. The "out of order" line will now be locked out of service in the well known conventional manner.

*First aid*

Each position of the switchboard is provided with at least three supervisory pilot lamps for indicating the class of the calls received at the different link selecting trunk circuits. These supervisory lamps are physically associated with the common equipment 1100 at each position but they have been illustrated as being associated with the respective trunk circuits. For example, the pilot lamp L434 is associated with the CLR trunk circuit 401 (Fig. 4) but it should be understood that each CLR link selecting trunk circuit in the first group having access to links at the positions of the switchboards are provided with circuits (including the contacts 411) for illuminating the pilot lamp L434 at each of the positions of the switchboard whenever a CLR call is received by one of the trunk circuits in the group and is waiting to be answered. Also, each CLR link selecting trunk circuit, such as the CLR trunk circuit 402 (Fig. 4) in the second group having access to links at certain positions of the switchboard are provided with circuits (including the contacts 411A) for illuminating the pilot lamp L434A at the said certain positions whenever a CLR call is received by one of the link selecting trunk circuits in the second group and is waiting to be answered. The inward trunk circuit 360 illustrated by the block diagram in Fig. 3 is exactly the same as the CLR trunk circuit 401 (Fig. 4) and the pilot lamp for the inward trunk circuit 360 and all other inward trunk circuits having access to the links at the operator positions will illuminate an inward pilot lamp associated with the operator common equipment 1100 at each of these positions whenever a call is received on an inward trunk circuit.

In view of the foregoing explanation, it will be understood that the operator common equipment 1100 provided at each of the positions of the switchboard is provided, for example, with a CLR, an inward, a tributary and perhaps a TX pilot lamp. Furthermore, these lamps will be illuminated at each of the positions arranged to handle the corresponding classes of calls whenever a call of that class is waiting to be answered. Thus, each operator at each position will always be aware of the fact that a call is waiting to be answered. If only one call is waiting to be answered in any one class and is routed to an idle link at an operator position in the manner described above, the link identity lamps, such as the lamps L633 to L635, inclusive, common to all of the links at each position, will be illuminated in accordance with the particular class of the call received. Also, the supervisory pilot lamp associated with the operator common equipment 1100 at each of the positions will be extinguished if no other call of the same class is waiting to be answered. Thus, the link used in answering the call will now indicate the class of the call and the common equipment supervisory lamps will be extinguished if no other call of the same class is waiting to be answered. However, if additional calls of the same or different classes are still waiting to be answered, the corresponding pilot lamps at the common equipment 1100 will remain illuminated.

Accordingly, one or more of the call waiting supervisory pilot lamps at the common equipment 1100 of each of the positions may remain in an illuminated condition to indicate unanswered calls at a time when all of the positions of the switchboard are marked busy in answering calls on links at the associated positions. In order to prevent subscribers or operators from abandoning calls at a time when all of the operators are busy, facilities have been provided whereby an operator may hold a connection that she is handling on one of her links and give first aid service to a waiting call that cannot be routed to idle links at the operator position due to the fact that all of the links thereat are marked busy. In order to permit an operator to connect with a waiting call, facilities have been provided at the operator positions for holding a call that the operator is handling on one of the links and for causing a waiting call on one of the link selecting trunk circuits to be routed to one of the links at her position so that she may identify herself and tell the waiting party that she will take care of the connection shortly.

In order to describe the operations involved in giving first aid service to a waiting call on one of the link selecting trunk circuits at a time when the operator is handling a call through one of her links, it will be assumed that the link 500 (Figs. 5 and 6) has been operated in the manner described above to answer a call on the CLR trunk circuit 401. If, at this time, a second call is waiting to be answered on a CLR trunk circuit, similar to the CLR trunk circuit 401, the line relay R410 of the second trunk circuit will be in its operated position and a circuit will be completed, at its contacts 411, for retaining the pilot lamp L434 associated with the common equipment 1100 of each of the positions of the switchboard in an illuminated condition. Thus, the operator handling the first call on the first link 500 will be informed that a second CLR call is waiting to be answered. If it is also assumed at this time that all of the positions of the switchboard are busy handling calls on associated links, the position all-links busy relays, such as the relays R990, at each position of the switchboard will be in an operated position and will thereby mark the C conductors, such as the C conductor C463, individual to each of the links at each of the positions of the switchboard busy in the manner previously described. Also, the position busy relay R865, individual to each position of the switchboard, will be in a restored position so that a chain circuit will be completed through contacts, such as the contacts 866, of the different position busy relays in order to operate the common all position busy relay R855. In its operated position, the all position busy relay R855, at its contacts 857, removes direct ground potential from the APB conductor C484 and at its contacts 856, it applies ground potential through the waiting call relay R845, for example, having a resistance of 5000 ohms, to APB conductor C484. As previously described, the latter conductor is common to all of the link selecting trunk circuits having access to the different links at the operator positions and normally controls one of the start relays, such as the start relay R910, in one of the allotter circuits whenever the line relays of one of the link selecting trunk circuits is operated. With the waiting call relay R845 connected in series with one of the start relays, such as R910, in response to the receipt of a call on a trunk circuit, the waiting call relay R845 will operate but due to its high resistance, the start relay in the allotter will not operate. In response to the operation of relay R845, a circuit is completed by way of its contacts 846 and the contacts 837 for operating the timer start relay R825. Operation of the relay R825 will initiate the stepping action of the delay answer timer 895 in order to operate the peg count meter 892 in the event that the waiting call is not answered, for example, within 36 seconds.

At its contacts 826, the relay R825 upon operating connects the pulse conductor C814 to the winding to the rotary magnet M898. The pulse conductor C814 has ground potential momentarily connected thereto every six seconds so that the magnet M898 will operate and restore to advance its wiper 896 one step every six seconds. As a further result of the operation of relay R825, at its contacts 828, it applies ground potential to the wiper 896 so that after the wiper has been advanced six times by the magnet M898 a circuit will be completed for operating the peg count meter 892. As illustrated, the meter 892 will be operated at the end of 36 seconds but it is apparent that the circuit for controlling the meter may be altered by connecting the same to different contacts in the banks accessible to the wiper 896. As soon as the seventh pulse appears on the conductor C891, the magnet M898 will advance the wiper 896 from engagement with the contact 6 into engagement with the contact 7. In this position, the wiper 896 will complete an obvious circuit for operating the hold relay R835 over a circuit including its lower winding. The relay now operates and, at its contacts 836, locks itself to ground at contacts 846. As a further result of the operation of relay R835, at its contacts 837, it interrupts the circuit for the timer start relay R835 which now restores to normal and, at its contacts 826, interrupts the pulsing circuit for the magnet M898.

The off-normal contacts 897 on the delay answer timer 895 are arranged so that they are in the illustrated open position when the wiper 896 is in its illustrated home contact position. However, as soon as the wiper is advanced in a clockwise direction away from its home contact position, the off-normal contacts ON897 are closed and remain in the closed position until the wiper again is advanced into its home contact position. Consequently, when the relay R825 restores it completes, at its contacts 827, a circuit including the contacts ON897, contacts 899, and the winding of the magnet M898, to battery. The magnet M898 operates and interrupts its own circuit, at its contacts 899, whereupon, the magnet restores to normal to advance its wiper 896 an additional step into engagement with the contact 8. The above described self-interrupting circuit for the magnet M898 is repeated until the wiper 896 again engages its home contact position and opens the off-normal contacts ON897. As a further result of the restoration of the timer start relay R825, it completes a circuit including its contacts 827, the off-normal contacts ON897 and the upper winding of the hold relay R895 in order to prevent the latter relay from restoring to normal during the time that the wiper 896 is being advanced step-by-step to its home contact position. In other words, the hold relay R835 would otherwise be restored to normal if the locking circuit for its lower winding is opened by the restoration of the waiting call relay R845 before the delay answer timer 895 has returned the wiper 896 to its home contact position. With this arrangement, the operation of the meter 892 will occur once during any one delay period and a new cycle for determining a waiting call period will not be reinitiated either during the time a wiper 896 is being restored to its home contact position or if the waiting call relay R845 is not restored to normal.

If the waiting call relay R845 is restored to normal, indicating that the waiting call or calls have been answered, it will restore the timer start relay R825 any time prior to the elapse of 36 seconds and cause the magnet M898 to be self-interruptedly operated to advance the wiper 896 until it again is returned to its home contact position, but no registration will be made on the meter 892 if the timer start relay R825 is restored before the elapse of 36 seconds.

In some systems, one position of the switchboard may be designated as an overflow position and the links thereat will be selected for answering calls only in the event that waiting calls are not answered within the time set by the delay answer timer 895. If an overflow position is provided it will normally include an overflow call allotter or distributor, for example, such as the allotter 1 which will be arranged so that it will cause the links at the overflow position to be available to the link selecting trunk circuits only after an overflow condition is encountered. The allotter or distributor in the latter arrangement may be started by operation of the hold relay R835.

In the above description it was assumed that a waiting call could not be routed to idle links because the operators were busy handling at least one call at each of the positions and that the waiting call was not answered within 36 seconds. As a result thereof, a record is made of the fact that the call was not answered within a predetermined elapsed time period.

Upon observing an illuminated pilot lamp associated with her common control equipment 1100, indicating, for example, that a CLR call is waiting to be answered, the operator may operate and then restore the link key K601 of the link having the call thereon that she is handling. As a result of the momentary operation and restoration of the key K601, the common position equipment 1100 is disconnected from the associated link. In the first link, that is, the link in which the key K601 was momentarily operated in order to disconnect the common equipment 1100 therefrom, the relay R560 will be in its operated position. This relay removes ground potential from the ALB2 conductor C997 and thereby causes the restoration of the position all links busy relay R990 to render the remaining links at this position available to answer calls. As soon as the position all links busy relay R990 is restored to normal, at its contacts 998, it interrupts the chain circuit that includes corresponding contacts on other position all links busy relays at other busy positions of the switchboard. Consequently, the relay R855 will now restore to normal and again place direct ground potential on the APB conductor C484. If the operator renders the links at her position available for answering a second waiting call before the delay answer timer 895 has operated for 36 seconds, no record will be made of the delay answer condition due to the fact that the waiting call relay R845 will be restored to normal before the regislation is made by the meter 892.

As soon as the direct ground potential is replaced on the APB conductor C484, the particular trunk circuit having the waiting call thereon will operate in the manner previously described in connection with the operation of the CLR trunk circuit 401 and will seize one of the links, such as the link 500, at the operator position. This call upon seizing the link at the switchboard will give the operator the usual zip-zip tone signal and one of the class identity lamps L633 to L635 associated with the links at her position will be illuminated to indicate the particular class of the call. Accordingly, the operator may now identify herself in accordance with the class identification and request the calling party to wait a moment. Thereafter, the operator will momentarily actuate the link key of the link over which the second call has been received in order to hold that call at her position and simultaneously disconnect the common equipment 1100 from that link. Having disconnected her common equipment from the second link, the operator may then actuate the link key K601 of the first link and thus reconnects her common equipment 1100 thereto so that she may now complete the connection received thereover to its called destination in the manner previously described.

In view of the foregoing description of operation, it is apparent that an operator can answer a call on one of the links at her position, hold that call, then answer a second call on another link at her position, and then return to the first call to complete the same to its destination. Thereafter, the operator will re-enter and complete the call on the second link to its destination. In this way the operator may in fact answer two calls at her position at the same time and the party who has received the first aid service will be more patient in waiting for the completion of the call.

*Inward call from a distant office*

A description will now be given of the operation of the system in response to a ring down call from the distant manual office 200. When the operator at the toll switchboard 201 extends a call over the toll line 203 to the central office 100 she transmits a splash of ringing current over the toll line 203 to the ring and tip conductors C205 and C206. The toll ring down trunk 202 provided in the central office 100 is connected to the inward trunk circuit 360 which is equipped with the wipers 261 to 264, inclusive, having access to the different links at the operator positions of the switchboard. The inward trunk circuit 360 is exactly the same as the CLR trunk circuit 401 and will operate in the same manner in conjunction with the gate circuit 800 and the allotters of Fig. 9 to route a call thereon to an idle link at one of the operator positions to be answered.

As soon as the ringing current appears on the ring and tip conductors C205 and C206, a circuit is completed for operating the ring down relay R220 by way of the left-hand windings of the repeating coil 237 and the contacts 212 and 214 on the restored rering relay R210. As soon as the ring down relay R220 operates it completes, at its contacts 224, a circuit including the contacts 235 and 335 for operating the control relay R320. The relay R320 upon operating changes the toll ring down trunk 202 from outward operation to inward operation in order to prevent the trunk from being operated on an outward call to the distant manual office 200. At its contacts 321, relay R320 applies ground potential to the C conductor C381 of the trunk line 304 in order to prevent selectors, such as the toll selector 302, from seizing the trunk 304. Also, at its contacts 323 and 328, the relay R320 disconnects the ring and tip conductors C382 and C383 in the trunk 304 from the circuit including the right-hand windings of the repeating coil 237.

As a further result of the operation of the control relay R320, at its contacts 324 and 326, it disconnects the circuit including the windings of the line relay R330 from the right-hand winding of the repeating coil 237. Finally, at its contacts 322 and 327, it connects the circuit including the right-hand windings of the repeating coil 237 to the ring and tip conductor C385 and C386 extending to the inward trunk circuit 360 and it connects the circuit including the winding of the loop relay R310, at its contacts 325, to the right-hand windings of the repeating coil 237. Accordingly, a loop circuit is now completed for operating the line relay in the inward trunk circuit 360 that corresponds to the line relay R410 in the CLR trunk circuit 401. This loop circuit may be traced from ground by way of the upper winding of the line relay (not shown) in the inward trunk circuit 360, tip conductor C386, contacts 327, the lower right-hand winding of the repeating coil 237, contacts 325, winding of the loop relay R310, the upper right-hand winding of the repeating coil 237, contacts 322 and 352, the ring conductor C385 and the lower winding of the line relay (not shown) in the inward trunk circuit 360 to battery. The line relay in the inward trunk cicuit 360 will operate in series with the loop relay R310 and it will return ground potential over the C conductor C384 in order to hold the control relay R320 in its operated position after the ring down relay R220 restores to normal.

As soon as the loop relay R310 operates in series with the line relay in the inward trunk circuit 360 it completes, at its contacts 311, an obvious circuit for operating the control relay R230. The control relay R230 is of the slow-to-operate and slow-to-release type and the condenser 236 shunted across the winding of the relay is utilized to further increase the slow-to-release time of the relay. As soon as the relay R230 operates, at its contacts 231, it also applies busy marking ground potential to the C conductor C381 in the trunk 304; it interrupts, at its contacts 235, a point in the initial operating circuit for relay R320; it prepares, at its contacts 234, a point in the circuit of the supervisory 1 relay R340; and it prepares, at its contacts 232, a point in the circuit for controlling the re-ring relay R210.

When the splash of ringing current is removed from the toll line 203 by the manual operator at the toll switchboard 201, the ring down relay R220 restores to normal. At its contacts 221, the relay R220 prepares a further point in the incomplete circuit for controlling the re-ring relay R210 and, at its contacts 222, it now completes a circuit for operating the supervisory 1 relay R340. The later relay upon operating, at its contacts 341, prepares a point in the incomplete circuit for the supervisory 2 relay R350 which circuit is provided to repeat a recall signal transmitted by the operator at the toll switchboard 201 to an operator at the central office switchboard.

As previously stated, the operation of the line relay (not shown) in the inward trunk circuit 360 controls either the allotter 1 or the allotter 2 through the gate circuit 800 in the manner previously described. If the link 500 at one position of the switchboard is available to receive the inward call, the allotter controls the rotary switch of the inward trunk circuit 360 so that the wipers 261 to 264 thereof are advanced step-by-step over the associated banks to search for an idle link.

For the purpose of this description it will be assumed that the link 500 is selected by the inward trunk circuit 360 over the tip, ring, C and I conductors C365 to C368, inclusive, extending to Fig. 5. The operations of the inward trunk circuit 360, the gate circuit 800 and the allotters of Fig. 9, whereby the call received on the inward trunk circuit 360 is routed to the link 500 is exactly the same as has been previously described in connection with the CLR call received on the CLR trunk circuit 401. Accordingly, the line relay in the inward trunk circuit 360 completes a circuit for illuminating the inward pilot lamp, similar to the lamp L434, to indicate to all of the operators that an inward call is waiting to be answered. As soon as the link 500 is found by the inward trunk circuit 360, the lamp will be extinguished and the ring and tip conductors C385 and C386 will be connected through the inward trunk circuit 360 to the ring and tip conductors C366 and C365 respectively, terminating in the link 500. Thus, the loop circuit, including the loop relay R310 in the toll ring down trunk 202 is completed for operating the rear supervisory relay R510 in the link 500. The remaining operations in the link 500, whereby the hold relay R570 returns the holding ground potential over the C conductor C367 to hold the inward trunk circuit 360 in its operated position and to hold the control relay R320, are the same as have been previously described.

Also, the cut-in relay R610 in the link 500 operates in order to further extend the connection from the distant manual toll switchboard 201 to the common position equipment 1100 so that the operator may answer the call. The operation of the cut-in relay R610 also conditions the associated link selector 700 for operation and the inward lamp L633 common to the links at the operator position is illuminated over a circuit including the I conductor C368 to indicate to the operator the class of the call routed to her position.

Subsequent operations of the apparatus to complete the connection to the desired destination and to control recall and disconnect supervision from either end of the connection are substantially the same as previously described. However, since the operation of the toll ring down trunk 202 in response to recall and disconnect signals is somewhat different, a description will first be given of a recall signal transmitted in either direction thereover.

After the operator in the central office 100 has established a connection through the link 500, it may be necessary for the operator at the distant manual office toll switchboard 201 to recall the central office toll operator. This may be accomplished in the present system by transmitting an additional splash of ringing current over the toll line 203 in order to reoperate the ring down relay R220. Reoperation of the ring down relay R220 at this time will complete, at its contacts 223, a circuit including the contacts 341 for operating the supervisory 2 relay R350. Also, at its contacts 222, the relay R220 interrupts a point in the circuit for the slow-to-release supervisory 1 relay R340. The relay R340 subsequently restores to normal and interrupts, at its contacts 341, the circuit of the supervisory 2 relay R350. Thus, in response to a single operation of the ring down relay R220, the relay R350 will operate, the relay R340 will restore, and relay R350 will thereafter restore. Incident to the operation of the supervisory 2 relay R350, at its contacts 352, it will interrupt the previously described loop circuit including the ring and tip conductors C385 and C386, the loop relay R310 and the rear supervisory relay R510. The loop relay R310 and the rear supervisory relay R510 restore to normal and then reoperate as soon as the supervisory relay R350 again restores to normal. The momentary restoration of the rear supervisory relay R510 in the link 500 completes the previously described circuit for flashing the rear supervisory lamp L533 in order to indicate that the distant toll operator desires the services of the central office operator. Although the loop relay R310 in the toll ring down trunk 202 momentarily restores to normal at this time, it performs no circuit control at this time. The operator may reconnect with the link 500 in response to the recall signal by actuating the link key K601 in the manner previously described and she may disconnect her common equipment 1100 from the associated link by thereafter restoring the link key K601.

It should be noted that when the operator at the toll switchboard 201 terminates the transmission of the single splash of ringing current, the ring down relay R220 restores to normal and again completes the circuit for operating the supervisory 1 relay R340. The toll ring down trunk 202 is thereby conditioned to respond to a further recall signal, if necessary.

Facilities are also provided, whereby the operator associated with the central office operator may reconnect her position equipment 1100 with the link 500 and transmit a flashing recall signal over the rear or answering end of the link to the operator at the toll switchboard 201. In order to do this, the operator actuates the link key K601 in the manner previously described and then operates the flash rear key K1180, associated with the common equipment 1100. At the right-hand contacts of the flash rear key K1180, ground potential is connected to the A conductor C1169 in order to operate the cut-in relay R610 of the link 500. Incident to the operation of relay R610, the tip, ring and C conductors C365 to C367, inclusive, are disconnected from the link 500 and connected to the common equipment 1100. Also, the tip and ring conductors C701 and C702 on the front end of the link are connected by way of the TF and RF conductors C1173 and C1174 to the front supervisory relay R1160 in the common equipment 1100 in the manner previously described in order to hold the connection established over the front end of the link 500.

Referring now to the tip and ring conductors C365 and C366, it will be seen that in response to the operation of the link key K601 and the flash rear key K1180, these conductors are connected by way of the contacts 541 and 543, 614 and 616, TR and RR conductors C1170 and C1171, and the inner make contacts of the flash rear key K1180 to the FL1 and FL2 conductors C1175 and C1176 extending to Fig. 13, contacts 1352 and the resistor 1342. Thus, the previously described circuit for operating the loop relay R310 in the toll ring down trunk 202 is connected in a "dry" loop circuit, that is, the loop circuit does not include battery and ground potentials. Consequently, the loop relay R310 restores to normal.

As a further result of the operation of the flash rear key K1180, at its left-hand make contact, ground potential is applied to the conductor C1177 extending to Fig. 13 in order to complete a circuit, including contacts 1331, for operating relay R1340. At its contacts 1341, the relay R1340 completes an obvious circuit for operating relay R1350 and the latter relay, at its contacts 1351 completes an obvious circuit for operating the relay R1330. The latter relay upon operating, at its contacts 1331, interrupts the circuit for relay R1340 which relay in turn interrupts the circuit for relay R1350 and the latter relay upon restoring interrupts the circuit for relay R1330. Thus, the three relays noted are cyclically operated and restored in the order named as long as ground potential is retained on the conductor C1177. Each time the relay R1350 operates, it interrupts, at its contacts 1352, the loop circuit including the conductors C1175 and C1176 and each time the relay restores to normal, the loop circuit is again completed. The cyclic operation of the relays noted above in the flash impulser 1302 breaks and then makes the loop circuit, including the conductors C1175 and C1176, at the conventional dial speed of ten pulses per second.

In the present circuit for transmitting a flash recall signal to the toll ring down trunk 202, it is the mere "drying" of the loop circuit for the relay R310 that causes the relay to restore to normal. The subsequent interruptions of the loop circuit at the contacts 1352 in the flash impulser 1301, does not affect the circuit for relay R310. The flash impulser 1302, however, will operate in the manner described above to control flashing recall signals over the front end of the link 500 and it may also be utilized to control flashing recall signals on delay calls which are originated at the toll operator position in the central office 100 and extended over the rear end of the link in the manner to be described hereinafter.

Referring now to the toll ring down trunk 202 it will be seen that when the relay R310 restores to normal it interrupts, at its contacts 311, the circuit for the control relay R230. Also, at its contacts 312, it completes a circuit including contacts 333, 232, 221, re-ring relay R210, contacts 351, and battery. The re-ring relay R210 now operates and, at its contacts 211 and 213, it connects generator current on the conductor C215 and ground potential respectively to the ring conductor C205 and the tip conductor C206. Consequently, a splash of ringing current is transmitted over the toll line 203 to the toll switchboard 201 in order to recall the operator thereat.

After the ringing current is connected to the ring and tip conductors C205 and C206, the slow-to-release control relay R230 restores to normal and, at its contacts 232, interrupts the circuit for the re-ring relay R210 which relay restores to normal and disconnects the splash of ringing current from the conductors C205 and C206. If the central office operator desires to transmit an additional recall signal to the toll switchboard 201, she must momentarily restore and reoperate the flash rear key K1180 so that the loop relay R310 in the toll ring down trunk 202 will operate and restore.

After transmission of the flash recall signal to the distant toll switchboard 201, the operator at the central office restores her flash rear key K1180. As a result thereof, ground potential is removed from the A conductor C1169 in order to restore the cut-in relay R610 and the latter relay reconnects the rear and the front ends of the link through the repeating coil 627 to the rear supervisory relay R510 and the front supervisory relay R640, respectively. As long as the link key K601 remains in its operated position, the central office operator may converse with the interconnected parties. Furthermore, if the operator desires to split the connection in the manner previously described, she may actuate the split front key K1192 in order to hold the connection over the front end of the link and to converse with the operator at the distant toll switchboard 201 over the rear end of the link 500.

Flashing recall signals may be transmitted over the front end of the link 500 in substantially the same manner as has been described above except that after operating the link key K601, the flash front key K1185 is operated in order to connect the flash impulsers 1302 to the TF and RF conductors C1173 and C1174 and to cause the loop circuit over the front end of the link to be interrupted at the rate of ten pulses per second. Therefore, any battery feed line relay or supervisory relay bridging the tip and ring conductors C701 and C702 on the front end of the link 500 will restore and reoperate ten times a second in order to transmit the flashing recall signal over the called end of the established connection.

When the connection is to be released by the operator at the toll switchboard 201, she transmits a splash of ringing current over the toll line 203 to the toll ring down trunk 202 in exactly the same manner as has been described above in connection with the transmission of a flash recall signal. Consequently, the rear supervisory relay R510 in the link 500 momentarily restores to normal to cause the flashing of the rear supervisory lamp L533. The central office operator may now reenter the connection by actuating the link key K601 in the manner previously described in order to connect her headset 1245 across the tip and ring conductors of the link 500. If the connection established over the front end of the link 500 is also released at this time, the front supervisory relay R640 will be in its restored position and the front supervisory lamp L668 will be in a steady illuminated condition to indicate the disconnection of the front end of the link. The central office operator may now challenge the connection on the link 500 and upon ascertaining that it has been released, she will initiate the release of the link 500.

The release of the link 500 at a time when the rear end thereof is involved in an inward call including the toll ring down trunk 202 is somewhat different then the release of the link after a CLR call. More specifically, the loop relay R310 in the toll ring down trunk 202 and the rear supervisory relay R510 are held in their operated positions over the previously described loop circuit, after the release of the connection by the operator at the toll switchboard 201. The relay R510, at its contacts 513, in turn completes a circuit for retaining the hold relay R570 in its operated position. If the link release key K573 is operated at this time to release the link 500 it would fail to do so due to the fact that relays R510 and R570 are in their operated positions. Therefore, to release an inward call including the toll ring down trunk 202, the central office operator must first actuate the link key K601, as noted above, to challenge the connection and having ascertained that the connection has been released, she then actuates the release rear key K1184 in the common equipment 1100. At the intermediate right-hand make contact of key K1184, ground potential is applied to the A conductor C1169 in order to operate the cut-in relay R610. Operation of the cut-in relay R610 connects the tip and ring conductors C365 and C366 to the TR and RR conductors C1170 and C1171 extending to the common equipment 1100 and it connects the tip and ring conductors C701 and C702 to the TF and RF conductors C1173 and C1174 extending to the common equipment 1100. As a further result of the operation of the cut-in relay R610, the rear supervisory relay R510 restores to normal and, at its contacts 513, opens a point in the holding circuit for the hold relay R570 which also restores to normal as soon as ground potential is removed from the CR conductor C627, at the right-hand break contacts of the release rear key K1184. Finally, at the inner break contacts of the release rear key K1184, the loop circuit which normally includes the line relay R1120 and the conductor C1170 and C1171 is interrupted to cause the restoration of the incoming trunk link selector circuit 360 and the loop relay R310 in the toll ring down trunk 202.

Referring now to the toll ring down trunk 202 (Figs. 2 and 3) it will be seen that when the ground potential is removed from the C conductor C367, the inward trunk circuits 360 will restore to normal in the manner described above in connection with the release of the CLR trunk circuit 401 and it will accordingly remove the holding ground potential from the C conductor C384 in order to release the control relay R320. The relay R320 upon restoring removes the busy marking ground potential from the conductor C381, at its contacts 321, and, at its contacts 322 and 327, it disconnects the ring and tip conductors C385 and C386 from the right-hand windings of the repeating coil 237. The loop relay R310 restores to normal and, at its contacts 311, interrupts the circuit for the control relay R230 which slowly restores to normal. This relay upon restoring, at its contacts 231, removes the final busy marking ground potential from the conductor C381 in order to render the toll ring down trunk 202 available for use in extending outward calls over the toll line 203 to the distant manual switchboard 201. The toll ring down trunk circuit 202 and the inward trunk circuit 360 are now restored to normal.

Referring again to the link 500 (Figs. 5 and 6) it will be noted that the control relay R560 is in its operated position and, consequently, when the hold relay R570 restores to normal, a circuit including the contacts 571 and 564 is completed for operating the busy relay R550. This relay, at its contacts 551, reapplies ground potential to the C conductor C367 shortly after the holding ground potential has been removed therefrom as noted above. The replacement of the ground potential on the C conductor C367 prevents subsequent seizure of the link 500 until after it has been fully restored to normal. In order to complete the restoration of the link 500 and the switching apparatus utilized in establishing the connection over the front end of the link, the central office operator restores the release rear key K1184 and the link key K601. This will disconnect the position equipment 1100 and the operator position circuit 1200 from the link 500 in the manner previously described. As a result thereof the cut-in relay R610 restores to normal and again connects the tip and and ring conductors C701 and C702 to the loop circuit including the windings of the front supervisory relay R640. This relay remains in its restored position due to the fact that the current flow thereover is in the reversed direction and prevents the relay from operating. At the present time the relays R550, R560, R630 and R650 are in their operated positions and the rear supervisory lamp L533 and the front supervisory lamp L668 are steadily illuminated to indicate the disconnect signals received over the rear and front ends of the link 500. The operator at the position circuit 1200 now momentarily actuates the link release key K573 in the manner previously described to cause the restoration of the control relay R560, the busy relay R550, the flash rear relay R630 and the flash front relay R650 in the manner previously described. The link 500 has now been fully restored to normal. Incident to the restoration of relay R560, at its contacts 563, it interrupts the loop circuit including the tip and ring conductors C701 and C702 and thereby causes the release of the switching apparatus utilized in establishing the connection over the front end of the link 500. Also, at its contacts 551, the busy relay removes the busy marking ground potential from the C conductor C367.

*Outward call through toll ring down trunk 202 to the distant toll switchboard 201*

The operation of the toll ring down trunk 202 in response to an inward call from the toll switchboard 201 to the link 500 has been described. In order to describe the operation of the toll ring down trunk 202 in response to an outward call in the opposite direction, it will be assumed that the central office operator has controlled her keyset K1474 and the impulse sender 1900A so that the link selector 700 (Fig. 7) individually associated with the link 500 is operated to associate its wipers 773 to 776 with the set of contacts in the bank 1301 terminating the tip, ring and C conductors C303T, C303R and C303C in the cable 303. These conductors terminate in a schematically illustrated toll selector, such as the toll selector 302 (Fig. 3). In response to an additional series of impulses transmitted by the impulse sender 1900A, the toll selector 302 operates its wiper set in a vertical and rotary direction to select, for example, the tip conductor C382, the ring conductor C383 and the C conductor C381 in the trunk line 304 extending to the toll ring down trunk 202.

As a result of the last-mentioned connection, the line relay R330 is operated. It should be noted that battery potential through the lower winding of the relay R330 is connected over a circuit including the contacts 326, lower right-hand winding of the repeating coil 237, contacts 328 and 356 to the tip conductor C382 and ground potential is connected through the upper winding of the relay R330 by way of the contacts 324, upper right-hand winding of the repeating coil 237, contacts 323 and 354 to the ring conductor C383. With battery connected to the tip conductor C382 and ground connected to the ring conductor C383, an answer supervisory signal is accordingly transmitted back to the link 500 in order to operate the front supervisory relay R640 in the manner previously described.

In the toll ring down trunk 202, the line relay R330 operates and, at its contacts 331, returns ground potential over the C conductor C381 in order to retain the toll selector 302 in its operated position and to retain the switch relay R790 in the link selector 700 in its operated position. Also, at its contacts 332, the relay R330 completes a circuit for operating the control relay R230 and, at its contacts 334, it completes a circuit including ground potential, contacts 312, 233 and 221, winding of the re-ring relay R210, contacts 351, and battery for operating the last-mentioned relay. It should be noted, however, that the contacts 233 on the control relay R230 are not opened until after the operation of the re-ring relay R210, due to the slow-to-operate characteristics of the relay R230. Accordingly, at its contacts 211 and 213, the relay R210 transmits a splash of ringing current over the tip and ring conductors C206 and C205 and the toll line 203 to signal the operator at the toll switchboard 201. Shortly thereafter, the slow-to-operate control relay R230 operates its contacts 233, thereby to restore the re-ring relay R210 and thus terminate the transmission of the splash of ringing current over the toll line 203. As a further result of the operation of relay R230, at its contacts 234, it completes a circuit including the contacts 222 for operating the supervisory 1 relay R340 in order to place the toll ring down trunk 202 in condition for a recall signal. Upon answering the call the operator at the toll switchboard 201 may converse with the operator at the position circuit 1200.

The operator at the toll switchboard 201 will complete the connection to the desired called party and the central office operator will disassociate her common equipment 1100 and her operator position circuit 1200 from the link 500 in the manner previously described. Accordingly, the calling party connected to the rear end of the link 500 may now converse with the desired called subscriber in the distant manual office 200.

In the event that the toll operator at the toll switchboard 201 desires to recall the operator at the central office, she may do so by transmitting a flash of ringing current over the toll line 203 and cause the operation of the ring down relay R220 in the manner described above. However, at this time the line relay R330 in the toll ring down trunk 202 is bridged across the tip and ring conductors C382 and C383 extending to the tip and ring conductors C701 and C702 in the link 500; and the front supervisory relay R640 in the link 500 is bridged across the tip and ring conductors C701 and C702. The direction of current flow through the winding of the relay R640 is such that the relay is in its operated position.

Incident to the momentary operation of the ring down relay R220 in response to the flash recall on an outward call from the link 500, a circuit is momentarily completed at the contacts 223 for operating the supervisory 2 relay R350. This relay, at its contacts 353 to 356, inclusive, momentarily reverses the current flow over the tip and ring conductors C382 and C383 and, consequently, causes the front supervisory relay R640 in the link 500 to momentarily restore. Thus, the flash front supervisory relay R650 operates fully in order to close its contacts 652 and complete the flashing circuit for the front supervisory lamp L668. In this manner, the operator at the central office is informed that the toll operator at the toll switchboard 201 has transmitted a recall signal. The manner in which the central office operator re-enters the connection established over the link 500 has been described hereinbefore and need not be repeated.

In the event that it is necessary for the central office operator to recall the toll operator at the toll switchboard 201, she may do so by first actuating the link key K601 and then actuating the flash front key K1185. The resulting circuit controls will reconnect the common equipment 1100 and the operator position circuit 1200 with the link 500 in the manner described previously, incident to the operation of the link key K601 and the flash rear key K1180. However, the operation of the flash front key K1185 will now cause the flash impulser 1302 to momentarily restore and reoperate the line relay R330 in the toll ring down trunk 202.

It will be recalled that when the conductor C1177 is grounded, the relays in the flash impulser 1302 are cyclically operated so that the contacts 1352 will open and reclose at the rate of ten pulses per second. The last-mentioned impulsing contacts 1352 will control the loop circuit for the line relay R330 by way of the conductors C1175 and C1176, the inner make contacts of the flash key K1185, the TF and RF conductors C1173 and C1174, contacts 612 and 618, 661 and 663, the tip and ring conductors C701 and C702 which are now connected through the link selector 700, cable 303, toll selector 302, tip and ring conductors C382 and C383 in the trunk 304, to the line relay R330 in the toll ring down trunk 202. Each time this loop circuit is interrupted by the flash impulser 1302, the line relay R330 restores and completes a circuit including contacts 312, 333, 232 and 221, winding of the re-ring relay R210, and contacts 351, to battery. The re-ring relay R210 upon each operation transmits a splash of ringing current over the toll line 203 to the toll switchboard 201 thereby to recall the toll operator thereat. It should be noted, however, that due to the slow-to-release characteristics of the re-ring relay R210, it will remain in its operated position during the time that the line relay R330 is restoring and reoperating under control of the flash interrupter 1302.

Shortly after the flash front key K1185 has been operated, the central office operator will restore the same in order to terminate the operation of the flash impulser 1302 and to disconnect the position equipment 1100 from the link 500. However, as long as the link key K601 remains in its operated position the operator headset 1245 will be bridged across the tip and ring conductors of the link 500 through the contact springs A and C of the key K601.

The link 500 may be restored to normal after disconnect signals have been received from the rear and front ends thereof by momentarily actuating the link release key K573. It should be noted, however, that if the established connection received over the rear end of the link 500 includes a toll ring down trunk, such as the trunk 202, from another manual office, it will then be necessary to release the link 500 in the manner described above in connection with the inward call received over the toll ring down trunk 202.

*Operation of the CLR trunk circuit 402*

The CLR trunk circuit 402 included in a second group of link selecting trunk circuits has access by way of its wipers 451A to 454A, inclusive, to a second group of links, say for example, links 51 to 100 associated with certain operator positions. As previously pointed out, the CLR trunk circuit 401 is included in a first group of fifty link selecting trunk circuits which may be used for handling CLR inward, tributary calls and various special service calls and which have access to the links at the different operator positions. The second group of link selecting trunk circuits, such as the CLR trunk circuit 402, is also provided for handling CLR and inward calls. The link selecting trunk circuits, including the CLR trunk circuit 402, are exactly the same as the link selecting trunk circuits of the first group, including the CLR trunk circuit 401. The transfer relay R440A in each of the trunk circuits of the second group are provided for the purpose of transferring a call received on the associated trunk circuit to a particular link selecting trunk circuit in the first group. This relay is normally in its restored position so that calls received on the associated trunk circuit will be routed to an idle link at the second group of operator positions. If the operator positions for normally handling calls routed from the CLR trunk circuit 402 and the other trunk circuits in the same group, are vacated by the operators thereat, a circuit will be completed for operating the transfer relay R440A. Thereafter, the calls received by the trunk circuit 402 will automatically be transferred to the CLR trunk circuit 401. The latter trunk circuit will operate in the normal manner previously described to automatically route the transferred call to an idle link at one of the attended operator positions. Thus, during light traffic periods, the operators handling calls received by the second group of link selecting trunk circuits may vacate their positions and all calls normally routed to such positions will then be automatically transferred by way of predetermined link selecting trunk circuits in the first group to idle links at attended operator positions.

In order to describe the operation of the CLR trunk circuit 402, it will be assumed that a local subscriber has extended a call thereto over the local selector 301 and the trunk line 305. When this connection is completed, the line relay R410A operates over a loop circuit including the tip and ring conductors C477 and C478. This relay, at its contacts 413A, transmits a ring back tone signal from the conductor C436A to the calling party to indicate that the call is being answered; it returns ground potential, at the contacts 414A, over the C conductor C479 in order to hold the local selector 301 and preceding local switching apparatus in an operated position; at its contacts 411A, it completes a circuit for illuminating the pilot lamp L434A provided at each of the operator positions arranged to handle calls received by CLR trunk circuits in the second group. Also, at its contacts 416A and 415A, the relay R410A controls the gate circuit 800, if a gate circuit 800 is employed, and the allotter 2 in the manner previously described so that the start relay R430A is operated. When there are less link selecting trunks than links, the gate circuit 800 is not employed and conductor C493 (Fig. 8) is connected directly to conductor C483 (ALT) in Fig. 9 and conductor C483 (Fig. 8) is connected directly to conductor C483' in Fig. 9. The operation of the start relay R430A controls the magnet M450A in the manner previously described so that the wipers 451A to 454A, inclusive, will search for and seize an idle link, such as the link 500, at one of the operator positions arranged to handle CLR calls in the second group. When the link is seized, the stepping of the wipers under control of the magnet M450A is terminated and the test relay R420A is operated to extend the loop circuit, including the tip and ring conductors C477 and C478, to the seized link in the manner previously described. Subsequent operations of the seized link, whereby the call is answered by the operator and extended therefrom to the called destination is exactly the same as has been previously described in connection with operation of the CLR trunk circuit 401, the link 500, the common position equipment 1100 and the operator position circuit 1200. The release of the connection is also the same as has been previously described.

In the above description of the operation of the CLR trunk circuit 402, it was assumed that idle links were available at the operator positions arranged to handle calls received by trunk circuits in the second group. As such operators vacate their respective positions, the links thereat are automatically marked busy so that all of the trunk circuits having access to links thereat will distribute their calls to only the links at the attended positions. When the last operator position arranged to handle calls received by trunk circuits in the second group vacates her position, she will withdraw her headset, such as 1245, from the associated jack thereby cause the operation of the transfer relay R440A in the CLR trunk circuit 402 and corresponding transfer relays in the other link selecting trunk circuits in the second group.

Referring to Fig. 12, it will be noted that the battery feed relay R1240 is normally operated as long as the plug of the operator headset 1245 is inserted into the jack J1244. Consequently, the ground potential at the contacts 1242 is normally removed from the night transfer conductor C1255 if the associated operator position is attended. Each position of the switchboard is arranged in the same manner and, consequently, the night transfer conductor C1255 at each position that is arranged to handle calls received by link selecting trunk circuits in the second group, may be connected in series through contacts 1242 to the night transfer conductor C406A of each of link selecting trunk circuits, such as the CLR trunk circuit 402 in the second group. With this arrangement, when an operator withdraws the plug of her headset 1245 from the associated jack J1244, ground potential will be applied to the corresponding contacts of the next position handling calls in the second group. When the last remaining operator handling calls in the second group vacates her position by withdrawing her headset 1245 from the jack J1244, the night transfer conductor C1255 is grounded. All of the conductors, such as conductor C406A, of the second group trunk circuits that are connected to the conductor C1255, will thereby be grounded in order to operate the transfer relay R440A in each of said trunk circuits. Subsequent calls in the second group will be transferred to first group trunk circuits having access to links at attended operator positions.

As an alternative arrangement, each operator position that handles calls from the second group can have its night transfer conductor C1255 multiply connected to a percentage of the link selecting trunk circuits that might relate to the total number of operators positions in the second group. Therefore, as these positions are vacated, the transfer relay R440A of the corresponding link selecting trunk circuits will operate and transfer subsequent calls to first group link selecting trunk circuits. With the latter arrangement, the calls will be transferred from the second group to the first group of link selecting trunk circuits in small groups as each operator position handling second group calls is vacated. When the last position in the group becomes unattended then all subsequent calls in the second group will be automatically transferred to links of the first group.

Referring now to the second group CLR trunk circuit 402, it will be assumed that the associated night transfer conductor C406A has been grounded and has caused the operation of the transfer relay R440A, due to the fact that one of the operator positions handling second group calls has been vacated. As soon as the transfer relay R440A operates, at its contacts 441A and 443A, it disconnects the line relay R410A from the incoming tip and ring conductors C477 and C478. Simultaneously, at its contacts 442A and 444A, it connects the tip and ring conductors C477 and C478 to the conductors C471 and C472 in the cable C403 extending to the CLR trunk circuit 401 included in the first group of trunk circuits. Also, at its contacts 445A, the relay R440 connects the incoming C conductor C479 to the C conductor C473 in the cable C403 extending to the CLR trunk circuit 401.

In view of the above circuit description, it will be understood that when the transfer relay R440A is operated, the incoming trunk line 305 including the tip, ring and C conductors C477, C478 and C479, is transferred through the CLR trunk circuit 402 to the tip, ring and C conductors C471, C472 and C473 in the cable C403 terminating in the CLR trunk circuit 401. The last-mentioned conductors C471 to C473, inclusive, are connected in multiple with the incoming conductors C474 to C476, inclusive, and as a result thereof, the CLR trunk circuit 401 is selectable over two separate paths.

If a CLR call is now routed over the conductors C477 to C479, inclusive, the line relay R410 in the CLR trunk circuit 401 will operate in the manner previously explained to cause the selection of an idle link at one of the attended operator positions. At its contacts 414, the line relay R410, upon operating, will return ground potential to the C conductor C476 in order to busy the CLR trunk circuit 401 and prevent it from being selected over the trunk line 306. Also, the ground potential will be returned over the C conductor C473 in the cable C403 in order to lock the transfer relay R440A in its operated position over a circuit including its contacts 446A and its upper winding. At the contacts 445A, the ground potential on the C conductor C473 is also extended to the C conductor C479 in the trunk line 305 in order to hold the preceding switches in their operated positions.

Subsequent operations of the CLR trunk circuit 401, the allotter 2 and the selected link at an attended operator position is exactly the same as has been described previously. It may be well to mention, however, that the holding ground potential returned over the C conductor from the selected link will hold the CLR trunk circuit 401, the transfer relay R440A and the preceding switches in the established connection in their operated positions. This ground potential will also ground the conductor C476 in order to maintain the busy condition on the CLR trunk circuit 401.

In the event that the operator returns to her position and plugs her headset 1245 into the associated jack J1244 at her position, the ground potential will be removed from the associated night transfer conductor C406A and thereby interrupt the energizing circuit for the lower winding of the associated transfer relay R440A. However, if a transfer connection has been established through the CLR trunk circuit 402 in the manner described above, the transfer relay R440A will remain in its operated position to prevent interruption of the conversational circuit established through the CLR trunk circuit 402, the CLR trunk circuit 401 and the selected link at an operator position. When this conversational path is interrupted by the calling party, ground potential will be removed from the C conductor C463 by the link utilized in the established connection. Removal of ground potential from the C conductor C463 will restore the CLR trunk circuit 401 to normal; it will remove the holding ground potential from the upper winding of the transfer relay R440A so that the latter relay will restore to normal and it will remove the holding ground potential from the conductor C479 in order to permit the preceding switches in the switch train to restore to normal. Thus, the restoration of the transfer relay R440A, incident to the termination of the connection, will now prepare the CLR trunk circuit 402 so that subsequent calls will be routed in the normal manner to an idle link at one of the operator positions arranged to handle calls from the second group of link selecting trunk circuits.

From the foregoing description it is apparent that the CLR trunk circuit 402 will not be transferred back to its normal operation if the circuit for the lower winding of the transfer relay R440A is interrupted at a time when a transferred connection is established through the CLR trunk circuit 402. Furthermore, if the transfer relay R440A is operated incident to the removal of the headset 1245 at an operator position at a time when the CLR trunk circuit 402 is busy with a call, the ground potential on the C conductor C473 will be extended by way of the cable C403, contacts 445A and the C conductor C479 in the trunk line 305 in order to busy the CLR trunk circuit 402 in the banks of the selector. The conversation, including the trunk circuit 402 would not be disturbed under this condition because relay R420A would be operated and the transfer circuit would be broken at contacts 422A and 424A. In other words, either the operation of the transfer relay R440A or its restoration at a time when the first group CLR trunk circuit 401 is included in a conversational circuit including its rotary switch or is included in a transfer conversational connection including the CLR trunk circuit 402, will be ineffective until the conversational circuit through the CLR trunk circuit 401 is disconnected.

*Call to the wire chief desk 240*

The wire chief desk 240 illustrated in Fig. 2 may be provided with a plurality of wire chief trunk circuits, such as 291, accessible by way of banks of the various selectors provided in the exchange. However, only one wire chief trunk circuit 291 has been shown in detail.

For the purpose of describing the operation of the wire chief desk 240 and the associated trunk circuit 291, it will be assumed that a local subscriber desires to extend a connection to the wire chief desk. When the local subscriber extends a local connection to the selector 301 and dials the same to the contacts of the level terminating the trunk lines extending to the wire chief desk, a loop circuit will be completed from the calling subscriber telephone to the tip and ring conductors C277 and C278 in the cable 307. Consequently, a circuit will be completed for operating the line relay R250. The upper winding of the line relay is connected to the tip conductor C277 by way of the contacts 262 and 272 and the lower winding of the line relay is connected to the ring conductor C278 over a circuit including the contacts 266 and 275. As soon as the line relay R250 operates, at its contacts 251, it returns ground potential over the C conductor C276 in order to hold the local selector 301 and the preceding switches included in the connection in their operated positions. Also, at the contacts 253, the relay R250 connects the ring back tone conductor C245 to the loop circuit including the windings of the line relay R250 in order to transmit a signal to the calling subscriber indicative of the fact that the wire chief is being signalled. Finally, at its contacts 252, the line relay R250 completes an obvious circuit for illuminating the signal lamp L243 at the wire chief desk 240.

As soon as the wire chief observes the illuminated condition of the lamp L243, the answer key K242 is actuated closing a loop circuit to answer relay R270, traceable from ground at upper winding R270, contact A of the key K242, telephone headset circuit 241, contact B of key K242, lower winding of relay R270, to battery. Upon operating, the answer relay R270, at its contacts 278, maintains the holding ground potential on the C conductor C276; at its contacts 273, it interrupts the circuit for the lamp L243; and, at its contacts 276, it interrupts the ringback tone to the calling party. At its contacts 271 and 274, relay R270 causes the battery and ground potential on T and R conductors C277 and C278 respectively to be reversed thus passing answer supervision back to the calling party, if the call came by way of a trunk, or, for example, from link circuit 500 by way of selector 700.

The wire chief may now converse with the calling party. The connection established between the calling subscriber and the wire chief is now held under control of the wire chief through relay R270 and key K242. Consequently, the release of the connection by the calling subscriber will not cause the release of the switching apparatus included in the connection until after the wire chief restores the answer key K242. Thus, when the connection is terminated, the wire chief will restore the answer key K242 and cause the restoration of the answer relay R270. The latter relay, at its contacts 276, will remove the holding ground potential from the conductor C276 and thereby permit the switching apparatus included in the connection to restore to normal. However, if the calling subscriber has not released the connection at the time the wire chief restores the answer key K242, the line relay R250 will remain operated and, at its contacts 251, it will retain the ground potential on the C conductor C276 and thus prevent the restoration of the preceding switches. Also, at its contacts 252, the operated line relay R250 will again illuminate the signal lamp L243. Normally, however, the wire chief will not restore the answer key K242 until the calling subscriber has replaced the receiver on the associated switchhook.

In the above descripton it has been assumed that the call has been established to the wire chief desk 240 by a calling subscriber but it should be understood that similar trunk circuits are associated with, for example, the information desk 240A, the repair clerk's desk or any other service desks provided in the exchange.

Normally, the wire chief desk 240 will not be staffed by an operator during the light load traffic periods of the exchange and particularly during the night hours. Whenever the wire chief desk remains unstaffed, the plug P293 is withdrawn from the jack J292 and causes the restoration of the battery feed relay R290 in a conventional manner. At its contacts 291, the relay R290 completes an obvious circuit for operating the transfer relay R260. The last-mentioned relay in its operated position disconnects the line relay R250 from across the tip and ring conductors C277 and C278, at its contacts 262 and 266. Also, at its contacts 261, 263 and 265 it will transfer the conductors C276, C277 and C278 in the cable 307 to the conductors C279, C280 and C281 respectively, terminating in the information trunk circuit 291A.

If a call is now extended to the wire chief desk in the manner previously described, a loop circuit including the tip and ring conductors C277 and C278 will be extended by way of the contacts 263 and 265 and the tip and ring conductors C280 and C281 to the information trunk circuit 291A. The information trunk circuit 291A is exactly the same as the illustrated wire chief trunk circuit 291 and the information operator desk 240A is exactly the same as the wire chief desk 240. Thus, during the time that the wire chief desk 240 is unattended, calls normally routed thereto will be transferred by way of the wire chief trunk circuit 291 and the information trunk circuit 291A, to the information operator desk 240A to be answered.

*Call to the information operator desk 240A*

The information desk 240A schematically illustrated in Fig. 2 may be provided with a plurality of information trunk circuits, such as the schematically illustrated trunk circuit 291A, which are accessible by way of the banks of the various selectors provided in the exchange. If it is assumed that a local subscriber desires to extend a connection to the information desk 240A, the subscriber dials the information number in the conventional manner. As a result thereof, the local selector 301 will be operated to the level terminating the trunk lines extending to the information trunk circuit 291A and a loop circuit will be completed from the calling subscriber telephone to the tip and ring conductors C280 and C281 in the cable 307A. Consequently, the information trunk circuit 291A will operate in the same manner as the wire chief trunk circuit 291 to extend the information call to the information desk 240A. The answering and the release of the established connection is the same as has been described previously.

Since the information desk 240A and the associated trunk circuit 291A are the same as the wire chief desk 240 and the wire chief trunk circuit 291, it will be appreciated that when the information operator withdraws the plug of her headset from the jack at her desk the associated battery feed relay will restore to normal and cause the operation of the transfer relay in the information trunk circuit 291A that is similar to the relay R260A in the wire chief trunk circuit 291. This relay will transfer the tip, ring and C conductors C280, C281 and C279 in the cable 307A to corresponding conductors in the cable 308 extending to the special service transfer trunk circuit 370. Thus, when the information desk is unattended, subsequent calls intended for the information desk will be transferred by way of the information trunk circuit 291A to the special service transfer trunk circuit 370. It should also be understood that if the wire chief desk 240A is also unattended at this time, calls normally routed thereto will now be transferred by way of the wire chief trunk circuit 291 and the information trunk circuit 291A to the special service transfer trunk circuit 370. In other words, as the special service desks become unattended, the associated trunk circuit transfer relays are controlled to automatically transfer calls normally routed thereto to the next special service desk. When all of the special service desks are unattended, all calls normally routed to the different special service desks will be automatically transferred to the special service transfer trunk circuit 370.

The use of the above described special service trunk 291 and 291-A is not limited for use as wire chief trunks, information trunks, etc. They may be used for innumerable services such as Chief Operator, Trouble Clerk, Plant Superintendent, Cashier, Manager's Office, etc. The answer relay R270 is provided with loop battery supply so that it can be connected to a regular conventional telephone set at points 1 and 4 of answer key K242, Fig. 2, eliminating answer key K242. Eliminating relay R290 and replacing contact 296 with a manually operated key. In this arrangement, the answer relay R270 is placed in the loop circuit, traceable from ground at the upper winding of R270, the telephone instrument (not shown) at the special service position, back to lower winding of R270, to battery.

The operation is identical with that described for trunk circuit 291 except that in place of the relay R290, a manually operated key connects ground potential to operate the relay R260. This key is operated at the location of the telephone instrument when an attendant is not available at such location. Lamp L243 may be supplemented or replaced by a buzzer in this arrangement.

*Operation of the special service transfer trunk circuit 370*

The special service transfer trunk circuit 370 schematically illustrated in Fig. 3 includes the wipers 371 to 374, inclusive, having access by way of its associated contact banks to conductors, such as the conductors C365 to C368-I, inclusive, terminating in links at predetermined positions of the switchboard. This transfer trunk circuit is exactly the same as the CLR trunk circuits 401 and 402. In the operation of the present system, certain of the positions of the switchboard will be assigned to answer special service calls including wire chief and information calls when the corresponding special service positions are vacated. Therefore, the links terminating in the bank contacts accessible to the wipers 371 to 374, inclusive, will be provided at those positions that are assigned to answer special service calls. These links are not used exclusively for this transfer service, they also accept calls from other trunks as heretofore described.

When an information or wire chief call is transferred to the special service transfer trunk circuit 370 in the manner described above, the gate circuit 800, if employed, and the allotters of Fig. 9 will be controlled to operate the transfer trunk circuit 370 and cause it to route the special service call to an idle link at one of the designated positions of the switchboard. If it is assumed that the link 500 is selected, ground potential will be returned over the C conductor C367 and the wiper 373 to hold the transfer trunk circuit 370 in its operated position. This ground potential will also be extended by way of the C conductor in the cable 308 to the information trunk circuit 291A and the C conductor C279 in the cable 307A to the banks of the local selector 301 in order to hold the latter selector in its operated position. In the above circuit for holding the selector 301 in its operated position, it is assumed that the special service call transferred to the link 500 is an information call. If on the other hand the special service call is a wire chief call, then the ground potential on the conductor C279 will busy the information trunk circuit 291A so that it can not be seized by the local selector 301 and the ground potential will also be returned to the wire chief trunk circuit 291 by way of the conductors C279 and contacts 261 to the C conductor C276 in the cable 307. Consequently, the ground potential on the conductor C276 will hold the local selector 301 in its operated position on a wire chief call and it will busy the wire chief trunk circuit 291 if an information call has been transferred to the link 500.

The central office operator handling calls on the link 500 may now answer the special service call in the same manner that she answers any other call routed to a link at her position. However, the operator will be informed that the call received on the link 500 is a special service call by the illuminated condition of the special service lamp L532. The last-mentioned lamp corresponds to the class identity lamps L633, L634 and L635 and it is controlled over a circuit including the conductor C368–I engaged by the wiper 374 of the special service transfer trunk circuit 370.

Referring now to the wire chief trunk circuit 291, it will be seen that the ground potential returned from the link 500 to the C conductor C276 completes a locking circuit including the contacts 264 and the upper winding of the transfer relay R260. Consequently, the relay R260 is now locked in its operated position under control of the ground potential returned from the link 500. If the wire chief now inserts the plug P293 into the jack J292 in order to operate the relay R290, the transfer relay R260 will not restore to normal. Consequently, a connection transferred either through the wire chief circuit 291 or through the information trunk circuit 291A can not be interrupted by either the wire chief or the information operator. However, subsequent information or wire chief calls may be routed in a normal manner to the corresponding positions over the other trunk circuits individual to such desks. When the transferred call over the wire chief trunk circuit 291 or the information trunk circuit 291A is released by the calling party, the transfer relays therein will be restored to normal and the trunk circuits become available to route calls to the corresponding desks.

*Operation of the link selector 700*

The link selector 700 comprises the well known Strowger switch mechanism having vertical and rotary movement and having a set of wipers 773 to 776, inclusive, having access to a conventional set of bank contacts 1301. This selector is also provided with a set of left normal post springs designated LNP713 and LNP714 which are controlled by the wiper shaft (not shown) when the wiper set is actuated to predetermined two-digit levels of the associated banks. Thus, the left normal post springs are actuated when the wiper set is actuated in a vertical direction in accordance with predetermined first digits to predetermined levels in order to condition the selector so that the wipers thereof may be controlled in a rotary direction in accordance with a second digit. If the normal post springs are not actuated, the rotary stepping of the wipers of the selector 700 is automatic. As illustrated, the selector switch has access by way of its wipers to ten bank levels, any one of which may be selected by the dialing, the digits 1 to 9 and 0, respectively. The EC wiper 775 performs no function on single digit operation of the selector, but on two-digit operation of the selector, the EC wiper 775 is utilized in controlling the selector when all the trunks in a group in the selected two-digit level are busy. The EC wiper 775 also permits the associated bank contacts to be divided into two or more groups, each group being selectable under control of two-digit operation of the selector.

The setting-up of the connection through the link selector 700 responsive to the transmission of loop impulses, corresponding two digits registered in the digit register 1500A, by the associated impulse sender 1900A will now be described. When a toll call is received over the rear of the link 500 by the central office operator, she controls the link finder 1400A to associate the impulse sender 1900A with the link 500 in the manner previously described so that the impulse sender will transmit loop impulses over the tip and ring conductors C701 and C702 to the line relay R710 in the link selector 700. The impulses transmitted by the impulse sender are registered in the digit register by actuation of the operator keyset K1474 at her position. The number of digits registered will, of course, depend upon the destination of the received toll call.

The line relay R710 in the link selector 700 is bridged across the tip and ring conductors C701 and C702 over a circuit which includes ground at contacts 761, the upper winding of the line relay R710, contacts 781 and 791 and the tip conductor C701; and an additional circuit including battery potential, the lower winding of the line relay R710, contacts 783 and 793 and the ring conductor C702. Thus, when the impulse sender completes the loop circuit including the windings of the line relay R710, the relay operates and completes, at its contacts 711, a circuit including ground at contacts 799 for operating the slow-to-release hold relay R720. Incident to the operation of relay R720, ground potential, at the contacts 721, is extended by way of the vertical off-normal springs VON716 and the lower winding of the series relay R730, to battery.

If the link selector 700 is utilized as a toll selector, such as the toll selector 302, or as a local selector, such as the selector 301, the "Y" wiring will be added so that the ground potential at contacts 721 will be returned to the C conductor C703 for the purpose of holding preceding switches in their operated positions as is conventional in automatic switching and for the purpose of marking the selector busy to other switches having access thereto. However, when the link selector 700 is directly connected with an associated link, such as the link 500, the "Y" strap is omitted in order to prevent the ground potential at contacts 721 from being returned over the C conductor C703 when the selector is seized for operation. In the present combination, including the link 500 and the link selector 700, the busy key K704 may be actuated whenever the link selector 700 is out of service or is being tested. The ground potential at the contacts 705 of the busy key K704 will then be returned over the C conductor C703 in order to operate the busy relay R550 in the link 500 and thereby mark the link busy to all link selecting trunk circuits having access thereto.

The series relay R730 operates when the above described circuit is completed for its lower winding and it prepares, at its contacts 734, a point in the circuit for its upper winding in multiple with the circuit for the vertical magnet M718. Thus, in response to the seizure of the link 700 over the loop circuit including the conductors C701 and C702, the line relay R710, the hold relay R720 and the series relay R730 are operated in the order named to prepare the selector to respond to the first series of impulses transmitted by the impulse sender 1900A.

The line relay R710 will now restore and reoperate a number of times in accordance with the number of impulses corresponding to the first digit. The first time the line relay R710 restores, at its contacts 712, it completes a circuit including ground at contacts 799, contacts 712, 723 and 734 for energizing the upper winding of the series relay R730 and in multiple therewith, the contacts 757 and the winding of the vertical magnet M718. The vertical magnet operates and at the end of the pulse it restores to normal. Operation of the vertical magnet M718 will control the wiper shaft to raise the wipers 773 to 776, inclusive, one step in a vertical direction in the well known manner. As soon as the wiper shaft is raised from its normal position, the vertical off-normal contacts VON715 and VON717 are closed and the contacts VON716 are opened. The opening of the contacts VON716 interrupts the previously traced circuit for the lower winding of the series relay R730 but due to its slow-to-release characteristics, the relay does not restore to normal during the time the impulses are being transmitted to the vertical magnet M718 and to its upper winding. At the contacts VON717, a circuit is now completed for operating the step relay R770 which may be traced from battery by way of the winding of the relay R770, contacts 749, VON717, 722, 753, 764, 733, the left normal post springs LNP713 and contacts 721 to ground. Upon operating the relay R770 prepares, at its contacts 772, a point in the incomplete circuit for controlling the rotary magnet M748, and at its contacts 771, it completes locking circuit for itself which is independent of the contacts 733 on the series relay R730. This locking circuit may be traced from battery by way of the winding of the relay R770, contacts 749, VON717, 722, 753, 764, 771, CAM727 and contacts 721, to ground.

Each time the line relay R710 restores and reoperates the vertical magnet M718 will advance the wiper 773 to 776, inclusive, an additional step in the vertical direction and the circuit for the upper winding of the series relay R730 will be completed to prevent the restoration of the relay. At the end of the first series of impulses transmitted to the link selector 700, the line relay R710 will remain in its operated position and, at its contacts 712, it will open the previously described pulsing circuit for the vertical magnet and the upper winding of the series relay R730 so that the slow-to-release relay R730 will restore to normal.

If the wipers of the switch have been raised to a level which does not control the left normal post springs LNP713 and LNP714, the rotary magnet M718 will automatically control the rotary stepping of the wipers. In other words, the selector will operate as a single digit switch. Consequently, when the series relay R730 restores to normal it completes, at its contacts 736, a circuit for operating the rotary magnet M748 which may be traced from ground at contacts 721, left normal post springs LNP713, contacts 736, 772 and 759 and the winding of the magnet M748 to battery. Upon operating, the rotary magnet M748 rotates the shaft and wiper 773 to 776, inclusive, one step into engagement with the first set of bank contacts in the level selected by the vertical stepping of the magnet M718. Also, the rotary magnet M748 upon operating, at its contacts 749, interrupts the circuit for the step relay R770 which relay now restores and, at its contacts 772, it opens the circuit for the rotary magnet M748 which also restores to normal. As a further result of the restoration of the relay R770, at its contacts 771, it interrupts the previously described locking circuit for itself.

The selector is now in condition to test the trunk line terminated in the first set of contacts engaged by the wipers 773 to 776, inclusive. Further operation of the link selector 700 at this moment is dependent upon whether the trunk line connected to the first set of bank contacts is busy or idle. If it is assumed that this trunk line is busy, ground potential will be encountered by the C wiper 776 and cause the reoperation of the step relay R770. This circuit may be traced from the grounded wiper 776, contacts 797, 764, 753, 722, VON717, 749 and the winding of the step relay R770, to battery. The relay R770 operates and, at its contacts 772, completes the above described circuit for operating the rotary magnet M748. Also, at its contacts 771, the step relay R770 locks itself in its operated position over the previously described circuit including its contacts 771 which circuit is independent of the grounded C wiper C776. The rotary magnet M748 upon operating rotates the shaft and wiper 773 to 776, inclusive, an additional rotary step and it opens the circuit for the step relay R770 at its contacts 749. The step relay now restores to normal and, at its contacts 772, interrupts the circuit for the rotary magnet M748, which also restores to normal.

The above described cyclic operation of the step relay R770 and the rotary magnet M748 will be repeated each time a ground potential is encountered by the C wiper 776 indicating that the selected set of bank contacts terminates a busy trunk line. When the wiper 776 rotates into engagement with the contact terminating a trunk line that is not busy, no ground potential will be applied to the C wiper C776 and the step relay R770 will not operate. Consequently, the rotary magnet M748 remains in its restored position to prevent further rotary stepping of the wipers 773 to 776, inclusive. During the stepping of the above noted wipers, the switch relay R790 was shunted by ground potential applied to both terminals of the winding of the relay. Consequently, when the C wiper C776 fails to encounter ground potential, the switch relay R790 will operate in series with the step relay R770 over a circuit which may be traced from battery, the winding of the step relay R770, contacts 749, VON717, 722, 753, 764, the winding of the relay R790, the cam contacts CAM727 and ground at contacts 721. Due to the high resistance of the winding of the relay R790, the relay R770 does not operate.

For the purpose of this description it will be assumed that the wipers 773 to 776, inclusive, engage the contacts in the associated contact banks terminating the conductor C1303 to C1305, inclusive, extending to the connector 1306. Thus, the wiper 773 engages the contacts terminating the conductor C1303; the wiper 774 engages the contact terminating the conductor C1304; the wiper 776 engages the contact terminating the conductor C1305; and the EC wiper 775 engages vacant contacts.

As soon as the switch relay R790 operates, it transfers the loop circuit including the conductors C701 and C702 from the circuit of the line relay R710, at its contacts 791 and 793, and, at its contacts 792 and 794, it connects the loop circuit by way of the wiper 773 and 774, conductor C1303 and C1304, contacts 1311 and 1313 to the upper and lower windings of the line relay R1320 in the connector 1306. The line relay R1320 operates over the loop circuit and in turn operates a hold relay, similar to the hold relay R720, which returns ground potential to the C conductor C1305. This ground potential is extended by way of the C wiper C776, contacts 798, through the winding of the relay R790 to the previously traced circuit including the winding of the step relay R770 and battery. Consequently, the switching relay R790 is now locked in its operated position in series with the unoperated step relay R770 from ground potential returned by the seized connector 1306. As a further result of the operation of the switch relay R790, at its contacts 799, it interrupts the circuit for the hold relay R720 which slowly restores to normal.

After the switching relay R790 operates to switch the connection through to the connector 1306, the line relay R710 and the hold relay R720 restore to normal as noted above. Since the hold relay is somewhat slow-to-release it does not restore to normal until after the line relay R710 has restored. As soon as the hold relay R720 restores it interrupts, at its contacts 721, a point in the previously traced circuit for controlling the step relay R770 and the switch relay R790.

If the link selector 700 is utilized as a regular selector or a toll selector in the switch train, instead of being tied directly to a link at the operator switchboard, the ground potential, at the contact 721, will be returned by way of the "Y" wiring and the contacts 706 of the busy key K704 to the C conductor C703 to retain preceding switches in the switch train in their operated positions. Consequently, in the latter type of switch train it is necessary to replace a ground potential on the C conductor C703 under control of the switch relay R790 before the ground potential is removed therefrom at the contacts 721. In the present circuit arrangement of the link selector 700 this is accomplished by the ground potential returned from the connector 1306 to the C wiper 776 of the link selector 700. This ground potential is further extended by way of the contacts 798 on the operated switch relay R790, cam contacts CAM727, the "Y" wiring contacts 706 to the C conductor C704. Accordingly, the ground potential returned to the C wiper 776 by the succeeding connector 1306, or any other similar type switch, is connected through the selector 700 to the C conductor C703 to hold operated any preceding switch as well as the link selector 700.

Since the selector 700 is utilized as a link selector and is tied directly to the link 500, the "Y" wiring is omitted and the link 500 is held independently of the link selector 700. At the present time the impulsing loop circuit from the impulse sender 1900A at the operator switchboard is now extended through the link selector 700 to the line relay R1320 in the connector 1306. Therefore, the series of impulses comprising the next digit transmitted by the impulse sender 1900A will control the line relay R1320 so that it will operate the wipers 1325 to 1327, inclusive, in a vertical direction to select the level in the associated bank terminating the desired subscriber line. Thereafter, another series of impulses constituting the last digit transmitted by the impulse sender 1900A will control the line relay R1320 in a conventional manner so that the wiper 1325 to 1327, inclusive, are rotated over the contacts of the selected level a number of steps corresponding to the number of loop impulses transmitted to the line relay R1320. As soon as the wipers 1325 to 1327 engage the contacts terminating the line of the called party, for example, the subscriber at substation B, the usual busy and idle test is made. If the line is idle the connector 1306 operates in a conventional manner to transmit ringing current to the called line.

Returning again to the link 500 it will be recalled that the dial front relay R660 is in its operated position during the time that the impulse sender 1900A is transmitting switch controlling loop impulses over the conductors C701 and C702. However, as soon as the impulse sender 1900A has transmitted the impulses of the final digit registered in the associated digit register 1500A the dial front relay R660 is restored to normal in order to reconnect the tip and ring conductors C701 and C702 to the previously described circuit including the upper winding of the front supervisory relay R640 in the link 500. This relay is pre-energized at this time but it is not operated due to the fact that the current flow through its upper winding and the loop circuit including the tip and ring conductors C701 and C702 and the windings of the line relay R1320 in the connector 1306, is not in the proper direction.

As soon as the called subscriber at substation B answers the call extended thereto, as noted above, a circuit is completed for operating the answer relay R1310 in the connector 1306. The answer relay R1310 operates as soon as the called party answers and, at its contacts 1311 to 1313, inclusive, it reverses the connection of the line relay R1320 to the tip and ring conductors C701 and C702 so that the current flow through the upper winding of the front supervisory relay R640 is in the direction to operate the relay. Operation of the relay R640 controls, at its contacts 642, the previously traced circuit for the front supervisory lamp L663 in order to extinguish the lamp and thus indicate to the operator that the called party has answered the call. The operator may now disconnect her common equipment 1100 and her position circuit 1200 from the link 500 in the manner previously described and thus interconnect the parties through the link 500.

The release of the connection through the link 500 is the same as has been previously described but it should be noted that certain operations are performed in the link selector 700 as well as in the connector 1306 for releasing the switching apparatus included in the call from the front end of the link 500. More specifically, when the called subscriber at substation B replaces the receiver on the switchhook, the circuit for the answer relay R1310 is interrupted and the relay restores to normal. At its contacts 1311 to 1314, inclusive, the relay R1310 again reverses the current flow on the tip and ring conductors C701 and C702 and thereby restores the front supervisory relay R640 to normal. As a result thereof the contacts 642 are again closed to illuminate the front supervisory lamp L663 and indicate to the operator that the called party in the toll connection has released. The switch train, including the link selector 700 and the connector 1306, is held over the above noted loop circuit from the link 500 by retaining the line relay R1320 in the connector 1306 in its operated position.

The operator now releases the link 500 by momentarily actuating the link release key K573 whereupon the loop circuit including the conductors C701 and C702, the front supervisory relay R640 and the line relay R1320 is interrupted at the contacts 563 on the control relay R560. The line relay R1320 now restores to normal and removes the holding ground potential from the C conductor C1305 and the C wiper 776 of the link selector 700. The connector functions in a conventional manner by the operation of its release magnet to restore the wipers 1325 to 1327, inclusive, to their normal positions and to render the switch again available for an additional call.

The removal of ground potential from the C wiper 776 interrupts a point in the previously traced locking circuit for the switch relay R790 which relay now restores to normal. At its contacts 799, the relay R790 now completes a circuit including contacts 712, 724 and VON715 for operating the release magnet M707. At its contacts 708, the magnet M707 now returns ground potential by way of the contacts 706 and the C conductor C703 in order to operate the busy relay R550 in the link 500. The last mentioned circuit is completed during the release time of the link selector 700 in order to prevent the link 500 from being selected for use by another incoming call at the operator position. In other words, at its contacts 551, the busy relay applies busy marking ground potential to the incoming C conductors on the rear of the link 500, such as the conductors C463 and C367, to prevent seizure of the link at this time.

The release magnet M707 upon operating causes the wipers 773 to 776, inclusive, of the link selector 700 to restore to their normal positions. When this is accomplished the vertical off-normal contacts VON715 to VON717 assume the positions illustrated in the drawings. At the contacts VON715 the operating circuit for the magnet M707 is interrupted and the magnet restores to normal thus indicating that the selector is again available for use in another call. Restoration of the magnet M707 interrupts, at its contacts 708, the above noted circuit for the busy relay R550 and the latter relay now restores to normal to remove the busy marking ground potential from the rear of the link 500.

In the above description of the operation of the link selector 700 it was pointed out that the stepping relay R770 and the rotary magnet M748 cooperated to automatically advance the wipers 773 to 776, inclusive, step-by-step over the bank contacts in the selected level to search for an idle connector, such as the connector 1306. Since the wipers have access to ten connectors in the selected level, the automatic stepping will continue until an idle one of the ten connectors is found. If all of the ten available connectors in the selected level are found to be busy during the stepping action, the wipers will automatically be rotated to the 11th bank contact position. If the link selector bank 1301 is provided with contact sets in the 11th position, a meter such as the meter M1309 may be connected to the 11th contact accessible to the ring wiper 774. However, if only ten contacts are provided in each level then the meter will be omitted.

If it is assumed that the wipers are rotated into the 11th contact positions, the 11th rotary step cam contacts CAM726 to CAM728, inclusive, will be actuated. At the 11th rotary step cam contacts CAM728, ground potential will be applied by way of the contacts 755, the ring wiper 774 and the engaged contact 11 in the selected level of the bank for operating the meter M1309. Consequently, each time the selector is rotated to the above noted 11th rotary contact position the meter will be operated in order to indicate to the exchange attendant the number of times that an all-trunks-busy condition has been encountered on this particular level. At the cam contacts CAM726, a circuit is also completed from ground, at the contacts 721, for operating the busy relay R760. As soon as the busy relay R760 operates it locks itself in its operated position over a circuit including its upper winding, contacts 763 and ground at contacts 721. Also, at its contacts 761 and 762, the busy relay R760 connects the busy tone induction coil 719 to the loop circuit including the line relay R710 and the tip and ring conductors C701 and C702. In this manner a busy tone signal is transmitted back to the operator position. If the selector 700 is utilized in the switch train of a calling subscriber the busy tone signal will indicate to the calling subscriber that the connection cannot be obtained at the present time.

In the present system, however, the busy tone is transmitted back to the link 500 over the above mentioned tip and ring conductors. As a further result of the operation of the busy relay R760, at its contacts 764, it interrupts a point in the circuit for the step relay R770 thereby to prevent the step relay and the rotary magnet M748 from continuing the stepping of the wipers of the switch. Finally, at the contacts 765 and 766, the busy relay R760 applies ground potential to the start conductor C767 and battery potential to the winding of the reversing relay R780. The start conductor C767 is connected to an impulser, not shown, which will operate to transmit impulses at the rate of 120 impulses per minute over the conductor C709 to the winding of the reversing relay R780. The reversing relay R780 operates and restores at the rate of 120 times per minute and, at its contacts 781 to 784, inclusive, reverses the connection of the line relay R710 to the tip and ring conductors C701 and C702. The periodic reversal of current flow over this circuit by the reversing relay R780 will control the impulse sender 1900A at the operator position so that it will now stop transmitting additional switch controlling loop impulses and so that it will transmit a signal to the operator to indicate that the sender has encountered the all-trunks-busy condition.

As a result of the first operation of the reversing relay R780, at its contacts 785, it completes a circuit including the 11th rotary step cam contacts CAM725, for operating the two-digit relay R750. This relay, at its contacts 755 interrupts the circuit including the ring wiper 774 in order to restore the meter M1309. Consequently, the meter may now be reoperated by another selector, similar to the selector 700, that has rotated to the 11th contact position of the same level of the associated bank. Also, at its contacts 754, the relay R750 completes a locking circuit for itself from ground at the 11th rotary step contacts CAM728. At its contacts 752, the relay R750 locks itself by way of the contacts 744 to ground at contacts 721. Finally, at its contacts 758, the relay R750 completes a circuit for reoperating the series relay R730 but operation of the latter relay at this time does not perform any effective circuit controls.

The operator at the toll switchboard may now release the link selector 700 by interrupting the loop circuit including the tip and ring conductors C701 and C702 and thus interrupt the circuit for the line relay R710. At its contacts 711, the line relay R710 interrupts the circuit for the slow-to-release hold relay R720 and, at its contacts 712, it transmits a pulse of ground from contacts 799 over a circuit including contacts 723 and 734 and then over a first branch to the upper winding of relay R730, and over a second branch including contacts 756 and 745 to operate the control relay R740, and over a third branch including the contacts 756 and 735 to operate the rotary magnet M748. Relay R740, upon operating, locks itself by way of its contacts 746 to ground at contacts 721 and, at its contacts 744, it interrupts a point in one of the locking circuits for relay R750, but relay R750 does not restore at this time. Although the rotary magnet is operated at this time it does not further rotate the wiper set including the wipers 773 to 776, inclusive, because in the 11th rotary step position they have reached the mechanical limit of the rotary stepping movement.

The slow-to-release hold relay R720 restores after a slight delay and, at its contacts 724, completes the previously described circuit for operating the release magnet M707. Also, at its contacts 721, the relay R720 removes the holding ground potential from the locking circuits for the relay R740 and R760 and, at its contacts 723, it interrupts the circuit for the relay R730 and the rotary magnet M748 in order to restore these relays and the magnet. As soon as the release magnet M707 operates, it causes the wiper set to restore to its normal resting position in a conventional manner. Incident to the withdrawal of the wiper set from the 11th rotary step position, the various cam springs CAM725 to CAM728, inclusive, restore to the positions illustrated. Relay R750 restores as soon as the contacts CAM728 are opened.

When the wipers return to their normal resting positions the vertical off-normal contacts VON715, VON716 and VON717 are also restored to the positions illustrated and the release magnet M707 is deenergized. The link selector 700 is now in its restored position and may again be utilized by the toll operator in extending another connection from the link 500.

The control of the link selector 700 for two-digit operation is determined by the level selected by the wipers 773 to 776, inclusive, at the end of the vertical movement. Whenever a two-digit level in the associated bank is selected by the vertical movement of the wiper set, the left normal post springs LNP713 are opened and the left normal post springs LNP714 are closed. The closing of the springs LNP714 converts the link selector 700 from automatic rotary stepping on one digit levels to selective rotation on two-digit levels followed by automatic rotation to select any one of a plurality of idle trunks. Any two-digit level may include two or more groups of trunks. For example, if it is assumed that the first group of trunks terminate on the first, second and third rotary contacts in a two-digit level and a second group of trunks is terminated on contacts 4 to 10, inclusive, the first trunk in the first group will be selected in response to the second digit 1 transmitted to the selector and the second group of trunks will be selected by the second digit 4. Thereafter, the switch will automatically rotate over the first three contacts in the selected level to test for an idle trunk in the first group. If the three trunks in the first trunk is busy, the switch will come to rest in engagement with the third trunk and will automatically transmit a busy signal. Similarly, if the wipers are directively operated into engagement with the contacts 4, the switch will then automatically rotate over the contacts 4 to 10, inclusive, to select an idle one of the seven trunks terminated therein. If these trunks are all busy, the switch will come to rest with its wipers in engagement with the contacts 10 in the selected two-digit level and a busy signal will be automatically transmitted.

The operation of the line relay R710, the hold relay R720, the series relay R730 and the vertical magnet M718 to raise the wiper set 773 to 776, inclusive, to a two-digit level is exactly the same as has been previously described in connection with the vertical operation of the switch during its one digit operation. The added operation performed at the termination of the vertical movement is that the left normal post springs LNP713 are opened and the springs LNP714 are closed when the selector switch wiper shaft raises the wipers to the selected two-digit level. At the end of the vertical movement, the series relay R730 restores to normal in the manner previously described and, at its contacts 731, it now completes the circuit for operating the two-digit relay R750. This circuit may be traced from ground at the contacts 721, left normal post springs LNP714, contacts 731 and 743, and the winding of the two-digit relay R750, to battery. As soon as the relay R750 operates it completes, at its contacts 752, a circuit including contacts 744 and ground at contacts 721 for locking itself in its operated position. The locking circuit is independent of the springs LNP714. Also, at its contacts 753, it opens a point in the circuit for the step relay R770 in order to restore the latter relay in the event that it has been operated during the vertical stepping of the wiper set. It may be well to mention at this time that the rotary magnet M748 will not operate when the series relay R730 restores (assuming that the step relay R770 is operated) due to the fact that the left normal post springs LNP713 are opened on two-digit levels. As a further result of the operation of relay R750, at its contacts 751, it opens a point in the incomplete circuit for the lower winding of the busy relay R760; at its contacts 754, it prepares a point in the incomplete circuit for locking the relay R750 in the event that the switch is rotated to the 11th rotary step position and the cam contacts CAM728 are closed; and, at its contacts 758, it completes a circuit for reoperating the series relay R730. The circuit for operating relay R730 includes ground at contacts 721, contacts 747 and 758 and the lower winding of relay R730, to battery. As a further result of the operation of relay R750, at its contacts 757 and 759, it disconnects the vertical magnet M718 from the impulsing circuit and it disconnects the rotary magnet M748 from the automatic stepping circuit which is normally effective on one-digit operation of the switch.

The link selector 700 is now ready to receive the loop impulses of the next digit transmitted by the impulse sender 1900A at the operator switchboard. Consequently, the line relay R710 follows the pulses in the conventional manner, the hold relay R720 is retained in its operated position during pulsing, and since the series relay R730 and the two-digit relay R750 are operated, the line relay R710 will now cause the operation of the control relay R740 and the rotary magnet M748. Incident to the first pulse, or restoration of relay R710, ground potential at the contacts 799, is transmitted by way of the contacts 712, 723 and 734, over a first branch circuit to the upper winding of relay R730 and over a second branch circuit including the contacts 756 and 745 to the winding of the control relay R740 and over a third branch circuit including the contacts 756 and 735 and the winding of the rotary magnet M748. Due to its slow-to-release characteristics, the series relay R730 will remain operated during the series of pulses, the control relay R740 will operate in response to the first pulse and it will lock itself by way of its contacts 746 to ground at contacts 721, and the rotary magnet M748 will rotate the wipers one step into engagement with the first set of contacts in the selected two-digit level.

Thus, the wipers will engage the first set of contacts terminating the first trunk of the three trunks in the first group. If the digit 4 is received, then the rotary magnet M748 will rotate the wipers into engagement with the fourth set of contacts terminating the first trunk in the second group of trunks. In either event, the relay R740 operates in response to the first pulse transmitted to the rotary magnet and, at its contacts 747, it opens a point in the circuit for the lower winding of the series relay R730. This relay, however, remains in its operated position until the end of the series of impulses transmitted to the rotary magnet M748.

When the single pulse or plurality of pulses of the second digit transmitted to the link selector 700 have been terminated, the line relay R710 remains in its operated position and the series relay R730 again restores to normal. Incident to the restoration of the series relay R730, at its contacts 732, it interrupts the remaining locking circuit for the two-digit relay R750, whereupon, the latter relay restores to normal. The relay R750 upon restoring, at its contacts 753, connects the step relay R770 to the C wiper 776 so that a test may be made to determine whether or not the trunk line terminating the set of contacts engaged by the wipers 773 to 776, inclusive, is idle or busy.

If it is assumed that the first trunk is busy and ground potential is encountered by the wiper 776, a circuit including the contacts 797, 764, 753, 722, VON717 and 749 is completed for operating the step relay R770. At its contacts 772, the relay R770 now completes a circuit including ground at contacts 721, contacts 741, 736, 772 and 759 for operating the rotary magnet M748. The magnet M748 upon operating, advances the wipers an additional step into engagement with the next set of contacts and, at its contacts 749, it interrupts the circuit of the step relay R770. The latter relay, in turn, at its contacts 772, interrupts the circuit for the rotary magnet M748 which also restores to normal. If the next trunk line engaged by the wipers of the selector is idle, the switching relay R790 will now operate in order to seize the said idle trunk line. The circuit for operating the switch relay R790 includes battery potential at the winding of the step relay R770, contacts 749, VON717, 722, 753, 764, the winding of the relay R790, cam springs CAM727 and contacts 721 to ground. The relay R790 operates in series with the winding of the step relay R770 but the latter relay does not operate due to the high resistance of the winding of the switching relay R790. Further operations of the link selector 700 are the same as have been described previously.

If it is assumed that all of the three trunks in the first group of trunks are busy during the rotary stepping of the link selector 700, ground potential encountered by the wiper 776 is also encountered by the EC wiper 775 by way of the strap 1307 interconnecting the engaged bank contacts of the third or last trunk. The ground potential encountered by the EC wiper 775 is now extended by way of the contacts 795, 742 and 751 in order to operate the busy relay R760. This relay upon operating immediately locks itself by way of its contacts 763 to ground at contacts 721. Furthermore, at its contacts 764, the relay R760 interrupts a point in the operating circuit for the step relay R770 in order to prevent the latter relay from reoperating to cause the wipers to step an additional step. As a further result of the operation of the relay R760, at its contacts 761 and 762, it connects the busy tone induction coil 791 to the winding of the line relay R710 and it disconnects direct ground potential therefrom. Consequently, the busy tone signal is now transmitted back over the tip and ring conductors C701 and C702 to indicate that an all-trunks busy condition has been encountered in the selected group of trunks. As a further result of the operation of the busy relay R760, at its contacts 765 and 766, it completes a circuit including the start conductor C766 for initiating operation of an impulser (not shown) which returns pulses at the rate of 120 impulses per minute over the conductor C709 to the reversing relay R780. The latter relay now operates and restores 120 times per minute and, at its contacts 781 to 784, inclusive, it reverses the current flow over the tip and ring conductors C701 and C702 a corresponding number of times. The last-mentioned current reversals will control the impulse sender 1900A at the operator position in the manner previously described so that an all-trunks-busy signal will be given to the operator to indicate the condition encountered by the impulse sender 1900A in attempting to set up the connection.

*Stop dialing control of the impulse sender 1900A*

During the setting-up of the connection from the link 500 through the link selector 700 and succeeding switches of a toll or local switch train, loop impulses were transmitted over the tip and ring conductors C701 and C702 from the +D conductor C1908 and the −D conductor C1871 in the impulse sender 1900A. If a switching stage is reached during the setting-up of the connection at which the interdigital pause between the transmission of impulses of successive digits is insufficient to permit the following switching stage to be conditioned to receive the pulses, the direction of current flow over the tip and ring conductors will be reversed. In other words, if a delay between transmission of successive digits is required that is greater than the normal interdigital space pause, the impulse sender 1900A must be controlled so that it will not transmit impulses of the next digit until a go-ahead signal is given.

A stop dial signal is transmitted to the impulse sender 1900A by reversing the current flow returned over the −D and +D conductors C1871 and C1908 through the lower winding of the loop pulsing supervisory relay R1910. This relay is bridged across the above noted −D and +D conductors during the interdigital pause determined by the impulse sender but it is shunted during the transmission of impulses. The restoration of the loop pulsing supervisory relay D1910 by the reversal of current flow through its lower winding constitutes the signal to the sender to stop dialing until the relay R1910 is reoperated by the return of the current flow through the lower winding to its original direction.

Thus, when the supervisory relay R1910 restores it interrupts, at its contacts 1911, the circuit for the auxiliary relay R1940. Normally, the auxiliary supervisory relay R1940 is locked in its operated position to ground at contacts 2021 during the transmission of impulses but during the interdigital pause between the transmission of successive digits, the contacts 2021′ are opened and the relay is held from ground at contacts 1911. If the relay R1940 is restored during an interdigital pause in the manner noted above, it completes, at its contacts 1943, a circuit which includes ground at the contacts 2012, contacts 1934, 1943, 1967 and 1936 for operating the first hold-back relay R1950. It should be noted that during the transmission of impulses, the relays R1930 and R2010 are in their operated positions. As soon as the relay R1950 is operated, at its contacts 1955, it completes a circuit including the contacts 2065 for short-circuiting the impulsing contacts 2088 so that further loop impulses cannot be transmitted by the impulse sender 1900A. As a further result of the operation of relay R1950, it locks itself by way of the contacts 1936, 1951′, 1975, 2023′ and 2048 to ground. At the contacts 1954, the relay R1950 connects the test conductor C2112 from the counting relays to the multiple circuits for controlling the alternator relays R2020 and R2030. Also, at its contacts 1951, the relay R1950 disconnects ground potential from the conductor C2113 thereby to prevent the counting relays from stopping the counting of the interdigital pause at the end of the seventh pulse transmitted thereto by the prime mover relays. Finally, at its contacts 1953′, the relay R1950 interrupts the circuit for applying ground potential to the NG conductor C2016 extending to the digit register 1500A and thereby prevents the next digit stored in the register from being marked on any one of the marking conductors C2018—1 to C2018—9, inclusive.

From the foregoing description it will be understood that when a stop dial condition is indicated by the reversal of current flow through the supervisory relay R1910, this relay will restore and cause the impulse sender to extend the interdigital spacing pause normally inserted between the transmission of successive digits from seven pulse counts to a maximum count of twenty pulses. The extension of the digit spacing interval is provided to permit the stop dial condition to be automatically removed and enable the impulse sender to again transmit pulses corresponding to other registered digits. The stop dial condition may be automatically removed any time prior to the counting of the twenty pulses by the impulse counting relays. If the stop dial condition is not removed during the twenty pulse count, a signal will be automatically transmitted to the operator to indicate that the impulse sender 1900A can not complete the connection due to the fact that one of the automatic switches included in the switch train can not be selected to extend the connection to the next switching point. The manner in which the impulse sender functions after the stop dial condition is encountered will be further described.

As pointed out above, when the reverse battery stop dial condition is returned, the supervisory relay R1910 and the auxiliary relay R1940 restore in the order named followed by the operation of the hold back relay R1950. At the end of the pulsing period of the preceding digit transmitted over the loop including the −D and +D conductors C1871 and C1908, the alternator relay R2020 restores to normal and reapplies ground potential to the conductor C2118. This controls the cyclic operation of the prime mover relays R2080, R2085 and R2090, the sequential operation of the counting relays R2130, etc., and the operation of the transfer relays R2110 and R2120 in the manner previously described. Inasmuch as the hold back relay R1950 is in its operated position, it removes ground potential from the digit space conductor C2113, at its contacts 1951, and thereby prevents the termination of the interdigital pause which normally occurs at the end of the counting of seven impulses transmitted by the prime mover relays. Therefore, the counting relays count through ten pulses before ground potential is reapplied to the test conductor C2112 by the closing of contacts 2172. At the end of the tenth impulse count the relay R2170 operates and, at its contacts 2172, connects ground potential by way of the contacts 2122, conductor C2112 and the contacts 1954 to the upper and lower windings of the alternator relay R2020 and the lower winding of the alternator relay R2030. The relay R2030 operates, but the relay R2020 remains in its restored position. At this time, the relay R2030 removes ground potential from the conductor C2118 thereby to again terminate the cyclic operation of the prime mover relays and to restore the counting relays to their normal positions. Also, at the contacts 2031′, the relay R2030 connects the ground potential from the contacts 2048 by way of the contacts 1975, 1951′ and 1936 in order to provide an additional holding circuit for the relay R1950.

The removal of ground potential from the conductor C2118 causes operation of the alternator relay R2020 in the manner previously described and, at its contacts 2022′, the latter relay prepares a point in the circuit for operating the third hold back relay R1970. Also, at its contacts 2022, the relay R2020 reapplies ground potential to the conductor C2118 in order to again initiate the cyclic operation of the prime mover relays and the counting operation of the counting relays.

When the counting relays have counted an additional ten pulses, the relay R2170 again operates and, at its contacts 2172, reapplies ground potential to the test conductor C2112 in order to energize the upper winding of the alternator relay R2030. Since the lower winding of the last-mentioned relay is energized at this time and the upper and lower windings are in opposition to each other, the relay now restores to normal, terminating the cyclic operation of the prime mover relays and restoring the operated counting relays. At this time the relay R2030 upon restoring, and before the relay R2020 restores, it completes a circuit from ground at contacts 2048 by way of the contacts 2022′, 2039, 2071′, the upper winding of the third hold back relay R1970, contacts 2065 and 1956, to battery. The relay R1970 operates in response to the above mentioned circuit and, at its contacts 1972, it locks itself in its operated position over a circuit including its lower winding and ground at contacts 1957. As a further result of the operation of relay R1970, at its contacts 1971, it interrupts a point in the circuit over which ground potential is normally applied to the conductor C2118 in order to terminate further operations of the prime mover relays regardless of the particular positions of the alternator relays R2020 and R2030. Also, at its contacts 2073, the relay R1970, connects the 120 I. P. M. conductor C1968 by way of the contacts 2047, SRL conductor C1881, contacts 1469A and 1426, SFL conductor C1490 to the sender pilot lamp L1154. Ground pulses are thus applied to this circuit 120 times per minute to flash the send pilot lamp L1154 and indicate to the operator that a stop dialing condition has been encountered by the impulse sender 1900A. Also, at its contacts 1976, the relay R1970 connects the 120 I. P. M. conductor C1968 by way of the SP conductor C1876, contacts 1465A and 1432', wiper 1406, DLP conductor C675, contacts 665 and the front supervisory lamp L668, to battery. Accordingly, the front supervisory lamp L668 also flashes to indicate to the operator that the particular link 500 is included in the connection over which the stop dial condition has been encountered by the impulse sender 1900A.

The stop dial flashing signal of the sender pilot lamp L1154 and the link front supervisory lamp L668 will continue until the stop dial condition is automatically removed by changing the current flow over the loop circuit for operating the loop supervisory relay R1910 or until the operator releases the link 500 and the switches in the switch train that have been controlled by the impulse sender.

It may be well to mention at this time that the stop dial condition may be removed any time prior to the operation of the third hold back relay R1917 or it may be removed after the operation of the third hold back relay R1970 but before the operator has caused the release of the connection. If the stop dial condition is removed before the operator releases the connection the flashing condition of the above noted lamps will be terminated and the impulse sender will start transmitting the impulses corresponding to the remaining registered digits.

If the dial stop condition is removed prior to the operation of the third hold back relay R1970, that is, during the time that the prime mover relays and the counting relays are counting the twenty impulses, the loop pulsing supervisory relay R1910 will reoperate. This relay upon operating again completes the circuit for the auxiliary supervisory relay R1940 and the latter relay, at its contacts 1944, completes a circuit for operating the second hold back relay R1960. This circuit may be traced from battery by way of the relay R1960, contacts 1958, 1944, 1934 and 2012, to ground. Upon operating the relay R1960 locks itself by way of its contacts 1966 to ground at contacts 1957. Also, at its contacts 1965, the relay R1960 interrupts a point in the circuit for the upper winding of the third hold back relay R1970. The opening of the last-mentioned circuit will prevent the operation of relay R1970 at the end of the counting of twenty pulses by the counting relays, as previously described. However, if the relay has been operated, it will remain in its operated position over the circuit including its lower winding contacts 1972 and ground at contacts 1957.

When the twenty pulses have been counted by the counting relays, as previously described, the contacts 2172 will complete the circuit to restore the alternator relay R2030. The latter relay, at its contacts 2031', will now restore the first hold back relay R1950 (assuming that relay R1970 is restored) and, at its contacts 1957, it will open the locking circuit for the relay R1960. Consequently, relays R1950 and R1960 will restore and, at their contacts 1955 and 1964, they respectively remove the short-circuit from across the pulsing contacts 2088. The relay R1950 upon restoring, at its contacts 1954, interrupts the previously noted circuit for the alternator relay R2020, whereupon, the latter relay restores to normal and completes the circuit for reoperating the prime mover relays and the counting relays. At the contacts 1953', the relay R1950 completes the circuit for reapplying ground potential to the MG conductor C2016 extending to the digit register 1500A. Finally, at its contacts 2051, the relay R1950 completes the previously traced circuit for reapplying ground potential to the digit spaced test conductor C2112 so that the prime mover relays and counting relays may again count the seven pulses interdigital pause.

The prime mover relays and the counting relays now count the interdigital pause pulses and the alternator relays R2030 and R2020 will reoperate, as previously noted, to begin the transmission and counting of pulses corresponding to the next registered digit. Also, at the contacts 2025', the relay R2020 applies ground potential to the conductor C2016 in order to control the digit register 1500A to mark the marking conductors C2018—1 to C2018—9 in accordance with the next registered digit to be transmitted by the impulse sender.

In the above description it was assumed that the stop dialed condition was removed before the third hold back relay R1970 was operated. It will now be assumed that the stop dial condition is removed and that the loop pulsing supervisory relay R1910 is reoperated after the third hold back relay R1970 has operated but before the toll operator releases the connection. Consequently, the relay R1910 and the relay R1940 reoperate and the latter relay, at its contacts 1943, interrupts a point in the circuit for the first hold back relay R1950 which relay now restores to normal. At its contacts 1956 and 1957, the relay R1950 interrupts a circuit for the third hold back relay R1970 which relay also restores to normal. As a further result of the restoration of the relay R1950, at its contacts 1951, it reapplies ground potential to the digit space conductor C2113; at its contacts 1955, it removes the short-circuit from across the impulsing contact 2088; and, at its contact 1953', it prepares a point in the circuit for reapplying ground potential to the conductor C2016.

As soon as the third hold back relay R1970 restores, at its contacts 1973 and 1976, it disconnects the 120 I. P. M. conductor C1968 from the circuits for the front supervisory lamp L688 and the sender pilot lamp L1154 thereby to terminate the flashing conditions of these lamps. Finally, at the contacts 1971, the relay R1970 reapplies ground potential to the conductor C2118 thereby to reinitiate the cyclic operation of the prime mover relays and the counting relays to count the interdigital pause of seven pulses and then to transmit the impulses corresponding to the next digit registered in the digit register 1500A. The impulse sender 1900A will now continue to transmit impulses corresponding to the remaining registered digits in order to complete the connection to the called destination.

In the foregoing description it was assumed that the impulse sender 1900A encountered a stop dial condition during the setting-up of the connection by the reversal of the current flow over the —D and +D conductors C1871 and C1908. Since the stop dial condition is given by the switch train during a period when one switch is attempting to establish a connection with a succeeding switch or trunk circuit, a steady reverse current flow is returned to the impulse sender 1900A and it is automatically returned back to its original condition when the succeeding idle switch or trunk circuit is seized. Under certain condition, however, all of the available succeeding switches or trunk circuits at any given switching stage may be busy when the search is made to find an idle one. When an all-trunks-busy condition of this character is encountered at any particular switching stage, the current flow over the —D and +D conductors C1871 and C1908 to the impulse sender 1900A is reversed at the rate of 120 impulses per minute. It should be noted, however, that the reversals may also occur at the rate of 60 impulses per minute if it is desired to distinguish certain local all-trunks-busy conditions from certain toll all-trunks-busy conditions. In other words, it may be desirable to transmit current reversals at the rate of 60 pulses per minute if local switching apparatus is employed and to transmit current reversals at 120 impulses per minute if toll switching apparatus is employed.

When this all-trunks-busy condition is encountered by the impulse sender 1900A, it will automatically release, inasmuch as it cannot complete a connection. Accordingly, the periodic reversal of the current flow through the lower winding of the supervisory relay R1910 will cause the relay to restore and reoperate at the same rate at which the current reversals occur. The first time the relay restores to normal, it interrupts, at the contacts 1911, the circuit for the auxiliary supervisory relay R1940 which also restores to normal. At its contacts 1943, the relay R1940 completes the previously traced circuit for operating the first hold back relay R1950. This relay, at its contacts 1955, short-circuits the pulsing contacts 2088 and, at its contacts 1953', it removes ground potential from the conductor C2016 in order to prevent the digit register 1500A from applying a marking ground potential to any one of the previously noted marking conductors.

Shortly after the first hold back relay R1950 operates, the current flow through the supervisory relay R1910 is again reversed back to its original direction and the relay reoperates. At its contacts 1911, the relay R1910 again operates the relay R1940 and the latter relay, at its contacts 1944, completes a circuit, including the contacts 1958, for operating the second hold back relay R1960. As soon as the relay R1960 operates, it locks itself by way of its contacts 1966 to ground at contacts 1957. The relay R1950, however, is now locked in its operated position over a circuit including contacts 1936, 1951', 1975, 2023' and 2048. As a further result of the operation of relay R1960, at its contacts 1963, it now prepares a point in the circuit for operating the sender release relay R1920.

When the second pulse of reversed current is received over the −D and +D conductors C1871 and C1908, the relay R1910 restores to normal and, at its contacts 1911, again interrupts the circuit for the auxiliary supervisory relay R1940 which also restores to normal. The second restoration of the relay R1940 completes, at the contacts 1943, the circuit for operating the sender release relay R1920. This circuit may be traced from ground at contacts 2012 and then by way of the contacts 1934, 1943 and 1936, and the upper winding of the relay R1920, to battery. Upon operating, the relay R1920 locks itself by way of its "X" contact 1924 and its lower winding to ground at contacts 2012. As a further result of the operation of relay R1920, at its contacts 1922, it interrupts a point in the circuit including the contacts 2018 in order to terminate further cyclic operation of the prime mover relays and the counting relays. The prime mover relays and the counting relays have been operating during the period of time that the reverse pulses have been returned to the loop pulsing supervisory relay R1910. However, when the ground potential is removed from the conductor C2118, the prime mover relays and counting relays restore to normal. Also, at its contacts 1921, the relay R1920 interrupts a circuit including the upper winding of the sender relay R2040 which relay restores to normal; at its contacts 1923, it removes ground potential from the DS conductor C1873 in order to restore the dial front relay R1410; and, at its contacts 1925, it also completes an additional locking circuit for its lower winding from ground at contacts 2193 on the digit register transfer relay R2190. The last-mentioned circuit, however, is retained until the digit register 1500A is disconnected from the impulse sender 1900A incident to the release of the digit register transfer relay R2190.

The sender relay R2040 upon restoring, as noted above, at its contacts 2044, removes the holding ground potential from the RLS conductor C2001 in order to control the digit register 1500A to release and thus wipe out the digits registered therein. As soon as the operated relays in the digit register 1500A restore to normal, ground potential is removed from the hold conductor C2002 in order to restore the digit send relay R2010 in the impulse sender 1900A. The sender relay R2040 in restoring interrupts, at its contacts 2041, the preenergizing circuit for the upper winding of the loop pulsing supervisory relay R1910 thereby to permit the latter relay to remain in its restored position; and, at its contacts 2049, it interrupts the circuit for the digit register transfer relay R2190 to enable the latter relay to restore to normal. The relay R2190 upon restoring, at its contacts 2193, opens one of the locking circuits for the lower winding of the sender release relay R1920.

As noted above, the dial front relay R1410 restores to normal incident to the removal of ground potential from the DS conductor C1873. Restoration of the latter relay disconnects the impulse sender 1900A from the link 500 in the manner previously described. Consequently, ground potential is removed from the DF conductor C674 extending to the link 500 in order to restore the dial front relay R660. The latter relay, upon restoring, reconnects the link selector 700 to the link 500 in the manner previously described so that the pulses of reverse current being returned over the tip and ring conductors C701 and C702 will cause the front supervisory relay R640 to operate and restore at the rate of 120 times per minute. Consequently, the front supervisory lamp L668 is flashed in order to indicate to the toll operator that the link 500 is the one involved in a connection encountering the all-trunks-busy condition. It may be well to mention that if the operator has retained her common equipment 1100 associated with the link 500 by means of the cut-in relay R610, then the pulses of reverse current will be transmitted to the front supervisory relay R1160 and the latter relay, at its contacts 1161, will complete the circuit for flashing the front supervisory lamp L1165 in the common equipment 1100.

When the digit send relay R2010 restores to normal, as noted above, it removes, at its contacts 2012, both the operating potential for the upper winding of the sender release relay R1920 and the locking circuit for the lower winding of the latter relay. The sender release relay R1920 restores to normal at this time and since the sender relay R2040 has been restored, any other operated relays in the impulse sender 1900A are also restored to normal, thus, rendering the impulse sender 1900A available for use in controlling the setting-up of another connection from the operator position.

*Error in keying the digits*

If the operator should make a mistake in keying up the digits of the called subscriber or destination on the key-set K1474 and desires to release a connection partially set up by the impulse sender 1900A, she may do so by momentarily operating the error key K1408. When this key is operated, a circuit including the contacts 1466A, the ERR conductor C1878 and contacts 2067 is completed for operating the error relay R2050 in the impulse sender 1900A. Upon operating the relay R2050 locks itself by way of its contacts 2052, and its upper winding to ground at contacts 2063. As a further result of the operation of relay R2050, at its contacts 2051, it interrupts the circuit for the prime mover relay R2080, R2085 and R2090 and the circuit for operating the counting relays. Also, at its contacts 2054, the relay R2050 completes an obvious circuit for operating the relay R2060. The latter relay, at its contacts 2064, 2065, and 2066 interrupts the impulsing loop circuit including the impulsing contacts 2088, the loop pulsing supervisory relay R1910, and the −D and +D conductors C1871 and C1908. When this loop circuit is interrupted, all of the switches in the switch train that have been operated by impulse transmitted by the impulse sender 1900A are restored to normal in a conventional manner. Also, at its contacts 2061', the relay R2060 disconnects the ground potential at contacts 2044 from the RLS conductor C2001 thereby to cause the restoration of any of the operated registered relays in the digit register 1500A. At its contacts 2063', the relay R2060 interrupts the circuit for the digit transfer relay R2190 which now restores to normal. At its contacts 2062, the relay R2060 applies ground potential to DS conductor C1873 in order to retain the dial front relay R1410 in its operated position after the digit send relay R2010 restores to normal in response to the removal of ground from the hold conductor C2002 by the digit register 1500A. Finally, at its contacts 2063, the relay R2060 interrupts the locking circuit for the relay R2050 which now restores to normal. It should be noted, however, that the original operating circuit for the lower winding of the relay R2050 is interrupted at the contacts 2067 by the operation of relay R2060. However, before the relay R2050 restores to normal, the relay R2060 locks itself by way of the winding of the relay R2070, contacts 2068, 2069 and 2044 to ground. Consequently, the relay R2060 does not restore to normal when the relay R2050 opens its contacts 2054 and the relay R2070 operates in series with the relay R2060.

During the release of the impulse sender 1900A under control of the operation of the error key K1409, the relay R2050 operated and restored in order to operate and lock the relays R2060 and R2070 in series. When the relay R2050 restores, as noted above, it completes, at its contacts 2051, a circuit for again grounding the conductor C2118 in order to restart the cyclic operation of the prime mover relays and the counting operation of the counting relays. Accordingly, the counting relays R2130 to R2170, inclusive, count through five additional pulses; the transfer relays R2110 and R2120 operate; and the counting relays count through a second cycle of operation of five impulses. This when the counting relay R2170 operates it completes, at its contacts 2172, a circuit including the contacts 2122, 1953, 2073 and the upper winding of the send release relay R1920. The relay R1920 operates and, at its contacts 1924, locks itself to ground at contacts 2071. As a further result of the operation of relay R1920, at its contacts 1922, it removes ground potential from the conductor C2118 thereby to terminate the cyclic operation of the prime mover relays and to cause the restoration of operated ones of the counting relays. At its contacts 1921, the relay R1920, interrupts a circuit for the sender relay R2040 which relay now restores to normal. Also, at its contacts 1923, the relay R1920, removes ground potential from the DS conductor C1873 in order to interrupt the holding circuit for the dial front circuit R1410. However, this relay will remain in its operated position from ground at the contact springs 1 on the dial front key K1189 if the operator has not restored the latter key to normal. If the key is restored, the relay R1410 will restore to normal and disconnect the impulse sender 1900A from the link 500. If the dial front key K1189 is retained in its operated position, the impulse sender 1900A will remain connected to the link 500 and will reoperate to transmit loop impulses when the correct digits are subsequently registered in the digit register 1500A. When the relay R2040 restores to normal, it interrupts, at its contacts 2044, the locking circuit for the relays R2060 and R2070. These relays now restore to normal in order to again complete at the contacts 2064, 2065 and 2066 the loop impulsing circuit including the impulsing contacts 2088 and the −D and +D conductors C1871 and C1908. At its contacts 2071, the relay R2070 removes ground potential from the locking circuit including the sender release relay R1920 thereby to permit the latter relay to restore to normal. The relay R1920, in turn, upon restoring, at its contacts 1921, connects the grounded SRS conductor C1872 to the winding of the sender relay R2040. The sender relay R2040 now reoperates and, at its contacts 2041, again energizes the upper polarizing winding of the loop pulsing supervisory relay R1910. Also, at its contacts 2047, the relay R2040 recompletes the circuit including the contacts 2083, 1974, the SRL conductor C1881, contacts 1469A and 1426 and the SFL conductor C1490 in order to again illuminate the sender pilot lamp L1154. This lamp was extinguished during the time that the sender relay R2040 was in its restored position. When the operator notes the fact that the sender pilot lamp L1154 has again been illuminated, she may reoperate her keyset K1474 in accordance with the correct call subscriber directory number or called destination. Further operation of the impulse sender 1900A to transmit the correct digits as now registered in the digit register 1500A is the same as has been described previously.

*Monitoring a connection through the link 500*

If the operator desires to monitor an established connection including the link 500 at a time when her common position equipment 1100 is connected to another link, she may actuate the monitor key K671 associated with the link 500. It should be noted, however, that when the common equipment 1100 is connected to another link, the cut-in relay, such as the relay R610, in the second link will be in its operated position.

Actuation of the monitor key K671 closes the contacts B and applies ground potential by way of the OM conductor C1250 extending to Fig. 12 in order to operate the monitor relay R1230. The relay R1230 upon operating, at its contacts 1231 to 1238, inclusive, disconnects the operator headset 1245 from the position equipment 1100 and connects the operator headset receiver by way of the monitor coil 1246 to the OT and OR conductors C1251 and C1252, extending to the contacts A and C, respectively, of the monitor key K671. The last-mentioned conductors are also multiply connected to corresponding contacts of the monitoring keys at all of the other links at this particular position of the switchboard.

Referring now to the link 500 it will be seen that the OT and OR conductors C1251 and C1252 are bridged across the tip and ring conductors of the link by way of the contacts A and C of the monitor key K671. Consequently, the receiver of the operator headset 1245 is now bridged across the tip and ring conductors included in the conversational circuit through the link 500 between the calling and called ends of the toll connection. When the operator has determined by monitoring the connection that it is satisfactory, she may again restore the monitoring key K671. Restoration of the key K671 disconnects her receiver from the conversational connection and it removes ground potential from the OM conductor C1250. Removal of ground potential from the conductor C1250 restores the monitoring relay R1230 and, thus, reconnects the operator headset 1245 to the common position equipment 1100.

*Extension of a delay call from the operator position over the rear or answering end of the link 500*

In the previous description of the operation of the system the operator receives a call over the rear or answering end of the link 500 and extends the call therefrom by way of the front or called end of the link to the desired destination. CLR and inward calls are all handled in this manner. However, if a CLR operator or an inward operator is unable to complete a call receiver at her position to the desired destination, the calling party is informed that an attempt will be made to complete the connection at a later time. If it is agreeable to handle a call in this manner, the operator will make out a ticket containing the directory numbers of both the calling and the desired called subscribers and will pass this information to a TX or delay operator position. Some positions of the switchboard may be set aside for the purpose of handling so-called TX calls which, in fact, are calls that the operator will originate from her position by way of an associated link to both the original calling party and the desired called parties. On the other hand, a CLR or inward operator position may be selectively converted so that it can be used to make TX calls by merely actuating a TX or delay position key associated with position equipment.

For the purpose of this description it will be assumed that each of the operator positions may be converted into a delay or TX position and, consequently, the position is provided with a delay position key, such as the key K555 (Fig. 5) which is common to all of the links at this position. In order to convert the position into a delay position, the operator actuates the key K555 and thereby completes a circuit for illuminating the delay position lamp L554 in order to indicate that the position has been blocked-out from receiving CLR and inward calls. At the lower contact springs of the key 555, a circuit is completed for operating the delay position busy relay R535. As illustrated in Fig. 5, this relay is provided with make contacts 536 and break contacts 537 but it should be understood that this relay is also provided with corresponding additional contact springs for each of the additional links provided at the converted position. The contacts 536 apply ground potential to the C conductors, such as the conductors C463 and C367 in order to busy the link 500 in the banks of the rotary switches of the various link selecting trunk circuits having access to this link. The corresponding contacts of the remaining links at the position also mark the associated links busy to other link selecting trunk circuits having access to such links. Accordingly, no incoming calls can now be rceived by the link 500 or the remaining links at the converted position, except TX calls which will be hereinafter described.

The operator may now originate a call from her position over the rear or answering end of the link by first actuating the link key K601 of the link 500 and then actuating the dial rear key K1188 included in the common equipment 1100. Ground potential at the contact springs 1 of the actuated dial rear key K1188 is extended by way of the A conductor C1169 and chain contacts of the different links at the position, the F contact springs of the actuated link key K601 on the link 500 in order to operate the cut-in relay R610. The ground potential at the contacts 2 of the actuated dial rear key K1188 is extended by way of the DR conductor C1172 to the link 500 and then by way of the H contact springs of the link key K601 to the upper winding of the dial rear control relay R540. The relay R540 operates over this circuit and, at its contacts 532, it applies ground potential by way of the contacts 529 and the DRS conductor C1056 in order to start the operation of the delay selector allotter 1095. In the delay selector allotter 1095 (Fig. 10), the ground potential on the DRS conductor C1056 is further extended by way of the contacts 1012 of the test relay R1010 and the winding of the start relay R1020, to battery.

As a further result of the operation of the dial rear control relay R540, at its contacts 548, it completes a circuit for converting the common control equipment 1100 for dial rear operation. However, it should be noted that at the contact springs D of the actuated link key K601, ground potential is applied to the ALB2 conductor C997 in order to operate the position all links busy relay R990 and the latter relay, at its contacts 991, applies ground potential to the ALB1 conductor C996 and then by way of the contacts 623 of the operated cut-in relay R610 to the contacts 548. Also, the ground potential at the contact springs D on the key K601 is extended by way of the contacts 566 to the contacts 548. Therefore, when the contacts 548 are closed, this ground potential is extended by way of the DR1 conductor C1168 and the winding of the dial rear relay R1140, to battery. The relay R1140 now operates and, at its contacts 1148, retains ground potential on the A conductor C1169 in order to retain the cut-in relay R610 in its operated position; at its contacts 1146, it energizes the lower polarizing winding of the rear supervisory relay R1130; and, at its contacts 1142 to 1145, inclusive, it disconnects the windings of the relay R1120 from across the TR and RR conductor C1170 and C1171 and substitutes in place thereof the upper winding of the rear supervisory relay R1130.

Referring now to the delay selector allotter 1095, it will be seen that when the start relay R1020 operates, it connects battery potential by way of the magnet M1025 to the wiper 1027 and it connects ground potential to the wiper 1026. The latter wipers have access by way of contacts in the associated contact banks to a plurality of delay selectors, such as the delay selector 1050. Normally, the delay selector allotter 1095 has access by way of its wipers to a maximum of 50 delay selectors, such as the delay selector 1050. If the delay selectors are busy, the associated switching relays, such as the relay R1030, are in their operated positions and at contacts corresponding to the contacts 1037 it will ground corresponding contacts in the banks accessible to the wiper 1027. If the associated selectors are idle, the associated switching relay R1030 will be in its normal restored position. Therefore, when the contacts 1022 are closed, the magnet M1025 will be self-interruptedly operated if the wiper 1027 is standing on a bank contact that is grounded. Accordingly, the wipers 1026 and 1027 will be advanced step-by-step in a counterclockwise direction until the wiper 1027 engages an ungrounded bank contact. When this occurs, the contacts 1021 completes a circuit by way of the wiper 1026 and the contacts 1035 in order to operate the control relay R1040. The relay R1040 upon operating will cause the delay selector link finder 1090 to advance its wiper step-by-step until it finds the link 500 at the operator position.

Before describing the stepping action of the delay selector link 1095, it should be noted that the test relay R1010 in the delay selector allotter 1095 is normally held in its operated position from ground at contacts 1036. Since each delay selector is provided with a switching relay, such as relay R1030, and since each of the corresponding contacts, such as 1036, are multiply connected to the winding of the relay R1010, the latter relay will be held in its operated position as long as at least one switching relay R1030 remains in its restored position. However, when all of the switching relays are operated to indicate that no delay selector is available for making a delay call, the relay R1010 will open the circuit for the start relay R1020, at its contacts 1012 and, at its contacts 1011, it connects 120 I. P. M. conductor C1054 to the DRB conductor C1055. Accordingly, ground pulses are transmitted over the conductor C1055 to the link 500 and then by way of the contacts 528 and 549 to the rear selector busy lamp L553. The lamp L553 is thus flashed to indicate to the operator that the delay call can not be extended over the rear or answering end of the link 500 due to the fact that all of the delay selectors are busy. If desired, an additional set of contacts may be provided on the test relay R1010 to operate a meter each time the relay restores so that a registration may be made of the number of times that all of the delay selectors are busy.

When the control relay R1040 of the delay selector link finder 1090 operates, it connects the magnet M1045 by way of the contacts 1042 and 1033 to the wiper 1049 and, at its contacts 1041, it applies ground potential to the winding of the switching relay R1030. The wipers 1047 to 1049, inclusive, of the delay selector link finder 1090 have access by way of the associated contact banks to the fifty links divided equally between operator positions. When the dial rear control relay R540 in the link 500 is operated, as previously noted, it removes ground potential, at its contacts 545, from the C2 conductor C1059 and, at its contacts 546, it connects the dial rear relay R520 to this conductor. Accordingly, each link at the operator position normally applies ground potential to the C conductor corresponding to the conductor C1059 and only the link that requires the use of a delay selector substitutes battery potential on the conductor C2. Since these conductors terminate in the bank contact accessible to the wiper 1049, the ground potential encountered by the wiper 1099 will complete an operating circuit for the magnet M1045 and it will short-circuit the switching relay R1030 and prevent its operation. Accordingly, the magnet M1045 will be self-interruptedly operated to advance the wipers 1047 to 1049, inclusive, until the wiper 1049 engages an ungrounded contact. The operating circuit for the magnet M1045 is terminated when this condition exists and the short-circuit is removed from the winding of the switching relay R1030. Consequently, a circuit including ground at contacts 1041, relay R1030, contacts 1046, winding of the magnet M1045, and battery is completed for operating the relay R1030. The magnet M1045, however, does not operate due to the high resistance of the winding of the relay R1030. At its contacts 1034, the relay R1030 extends the ground potential from the contacts 1041 by way of the wiper 1049, C2 conductor C1059, contacts 546 and the winding of the dial rear relay R520, to battery.

The latter relay now operates in order to complete the circuit for controlling the delay selector 1050. It should be noted that the delay selector 1050 is substantially the same as the previously described link selector 700 (Fig. 7) except that it is provided with the "Y" wiring. The line relay of the delay selector 1050 is, consequently, bridged across the T and R conductors C1051 and C1052 in the same manner as the line relay R710 is bridged across the tip and ring conductors C701 and C702 of Fig. 7. Accordingly, the line relay in the delay selector 1050 is now operated over a loop circuit including the tip conductor C1051, contacts 1031, wiper 1047, T2 conductor C1057, contacts 542, 614, the TR conductor C1170 extending to Fig. 11, the left-hand inner break contacts of the restored keys K1180 to K1184, inclusive, contacts 1114, contact 5 of the restored split rear key K1191, the lower left-hand winding of the repeating coil 1155, contacts 1144, resistor 1133, the upper winding of the rear supervisory relay R1130, contacts 1143, the upper left-hand winding of the repeating coil 1155, contacts 2 of the key K1191, contacts 1112, normally closed inner break contacts of the restored keys K1180 to K1184, inclusive, RR conductor C1171, contacts 616 and 544, R2 conductor C1058, wiper 1048, contacts 1032, link conductor C1052 and the winding of the line relay in the delay selector 1050. The delay selector line relay now operates and returns a ground potential on the C conductor C1053 through the winding of the switching relay R1030 in order to retain the latter relay operated in series with the magnet M1045. Also, the ground potential returned on the conductor C1053 is extended by way of the contacts 1034 over the previously traced circuit to retain the dial rear relay R520 in its operated position.

As a further result of the operation of relay R1030, at its contacts 1035, it interrupts the circuit for the control relay R1040 which now restores to normal. Due to its slow-to-release characteristics, however, the relay R1040, at its contacts 1041, does not remove ground potential from the conductor C1053 until after the delay selector 1050 has returned the holding ground potential on the last-mentioned conductor. Also, at its contacts 1036, the relay R1030 removes one of the sources of holding ground potential from the test relay R1010 and, at its contacts 1037, it busies the relay selector 1050 in the banks of the delay selector allotter 1095. This prevents the allotter from selecting the delay selector 1050 for subsequent use.

It will be recalled that the dial rear delay R520 operated when the delay selector link finder 1090 connected the delay selector 1050 to the link 500. This relay upon operating, at its contacts 525 and 526, transfers the rear supervisory lamp L533 from the circuit including contacts on the rear supervisory relay R510 to contacts on the dial rear supervisory relay R530. Also at its contacts 521 to 524, inclusive, it disconnects the windings of the rear supervisory relay R510 from the circuit including the left-hand windings of the repeating coil 627 and it connects the upper winding of the relay R530 thereto. Also, at its contacts 529, the relay R520 disconnects the starting ground potential from the DRS conductor C1056 to permit the start relay R1020 in the delay selector allotter 1095 to restore to normal. If other links at other positions of the switchboard have also grounded the conductors C1056, the relay R1020 will remain in its operated position and the magnet M1025 will step the wipers 1026 and 1027 from the bank contacts that have been grounded by the contacts 1037. At its contacts 528, the relay R520 interrupts the circuit for the rear selector busy lamp L553, and, at its contacts 527, it completes a locking circuit for the lower winding of the dial rear control relay R540 and an energizing circuit for the lower polarizing winding of the relay R530. The rear or answering end of the link 500 is now connected to the delay selector 1050. Finally, at its contacts 533, the relay R540 opens one of the multiple grounds to ALB-3 conductor C815 to the position busy relay R865.

In the previously traced circuit including the line relay (not shown) of the delay selector 1050 and the upper winding of the rear supervisory relay R1130, the line relay operated to condition the delay selector for further operation and to return ground over the C conductor C1053 to hold the delay selector 1050 connected to the link 500. The current flow over the loop circuit including the winding of the line relay is in the direction to cause the rear supervisory relay R1130 to operate. Since the dial rear relay R1140 is also in its operated condition, a circuit including the contacts 1147 and 1131 is completed for illuminating the rear supervisory lamp L1166 at the operator common equipment 1100. The illuminating condition of the lamp L1166 indicates to the operator that the delay selector 1050 has been operatively associated with the rear or answering end of the link 500. As a further result of the operation of relay R1130, at its contacts 1132, it prepares a point in the circuit for operating the sender dial rear relay R1110. This relay will operate as a result of the association of the impulse sender 1900A with the common position equipment 1100.

At the time the operator actuated the dial rear key K1188 to cause the association of the delay selector 1050 with the link 500, circuits were also completed for associating the impulse sender 1900A with the position equipment 1100. For example, at the contacts 4 of the actuated key K1188, a circuit is completed for operating the dial rear relay R1430 of the link finder 1400A (Fig. 14). This circuit may be traced from battery by way of the lower winding of relay R1430, DRO conductor C1482, contacts 4 of the actuated dial rear key K1188, SRN conductor C1488, contacts 1467A, SRN conductor C1879, and contacts 2078 and 2045, to ground. The relay R1430 now operates and, at its contacts 1435, it locks itself over a circuit including its upper winding and the DRH conductor C1483 to ground at the contacts 3 on the actuated key K1188. The dial rear relay R1430 functions in substantially the same manner as the dial front relay R1410 except that it does not cause the wipers 1403 to 1407, inclusive, to be rotated in the manner previously explained. Actually, at the contacts 1431 and 1438, the relay R1430 disconnects the −D and +D conductors C1871 and C1908 from the wipers 1403 and 1405 and, at its contacts 1433 and 1431′, it connects the −D and +D conductors C1871 and C1908 to the DRR and DRT conductors C1481 and C1487 extending to the common position equipment 1100 where they terminate in contacts on the sender dial rear relay R1110. Also, at its contacts 1437, the relay R1430 applies ground potential by way of the DRC conductor C1486 and the contacts 1132 in order to operate the sender dial rear relay R1110. The relay R1110 now operates and, at its contacts 1112 and 1113, it transfers the loop circuit from the line relay of the delay selector 1050 from the upper winding of the rear supervisory relay R1130 to the DRR and DRT conductors C1481 and C1487 extending to the impulse sender 1900A. In Fig. 14, it will be seen that the conductor C1481 and C1487 are now extended by way of the contacts 1433 and 1431', 1461A and 1464A to the previously described loop circuit in the impulse sender 1900A including the —D conductor C1871, the lower winding of the loop pulsing supervisory relay R1910, the contacts 2066, 2088 and 2065 and the +D conductor C1908. At this time the line relay in the delay selector 1050 is held over the above described loop circuit including the lower winding of the supervisory relay R1910. Also, at its contacts 1117, the sender dial rear relay R1110 locks itself to the grounded DRC conductor C1486 and, at its contacts 1118, it applies ground potential to the DR conductor C1172 extending to the link 500 in order to retain the dial rear control relay R540 in the link in its operated position. Also, at its contacts 1111, the relay R1110 applies ground potential to the A conductor C1169 extending to the link 500 in order to retain the cut-in relay R610 in its operated position. The operator may now restore the dial rear key K1188 to its normal position.

Referring again to the operated condition of the dial rear relay R1430 (Fig. 14) it will be seen that, at its contacts 1434, a circuit including the contacts 1462A, SRS conductor C1872 and contacts 1921 is completed for operating the sender seize relay R2040. The latter relay, at its contacts 2041, completes the previously mentioned circuit for energizing the upper polarizing winding of the loop pulsing supervisory relay R1910 and, at its contacts 2047, it connects the ground potential at the contacts 2083 by way of the contacts 1974, SRL conductor C1881, contacts 1469A and 1435', SRL conductor C1491 extending to Fig. 11, contacts 1119 and the sender pilot lamp L1154 to battery. The sender pilot lamp L1154 is now illuminated to indicate to the operator that she may now operate her keyset K1174 in accordance with the digits of the directory number of the desired party.

As a further result of the operation of relay R1430, at its contacts 1433', it completes an obvious circuit for operating the key connect relay R1440 and the latter relay completes the previously described circuits for connecting the operator keyset K1474 to the digit register 1500A.

The operator may now actuate the key set in the conventional manner and register the desired digits in the digit register 1500A. Thereafter, the operator may actuate the disconnect key K1409 in order to operate the disconnect relay R1450. The latter relay upon operating, at its contacts 1452, locks itself to ground at contacts 1434' and, at its contacts 1451, it interrupts the circuit for the key connect relay R1440. The latter relay now restores to normal and disconnects the operator key set K1474 from the digit register 1500A.

The impulse sender 1900A operates in the manner previously described to transmit loop impulses over the —D and +D conductors C1871 and C1908 in order now to control the delay selector 1050 and subsequent switches in the switch train to establish the connection to the desired destination. The various supervisory signals, previously described, will be indicated to the operator on the sender pilot lamp L1154 in the manner previously described.

It may be well to mention at this time that the wipers 1051 to 1054 of the delay selector 1050 corresponding respectively to the wipers 773 to 776, inclusive, of the link selector 700 and that these wipers have access by way of the associated bank contacts to various switches in the switch train including the connector 1306 and the toll selector 302 so that calls may be routed to either local subscribers or by way of the toll ring-down trunk 202 to the distant manual office 200.

After all of the digits have been transmitted by the impulse sender 1900A, it will restore to normal and remove ground potential to the DS conductor C1873. Consequently, the dial rear relay R1430 now restores to normal and disconnects the impulse sender loop pulsing circuit from the DRR and DRT conductors C1481 and C1487. Also, at its contacts 1432 and 1439, the relay R1430 now bridges the above noted DRR and DRT conductors with the resistor 1427 thereby to retain the loop circuit including the delay selector 1050 and the terminating switch in the established connection. As a further result of the restoration of the dial rear relay R1430, at its contacts 1437, it removes ground potential from the DRC conductor C1486 in order to restore the sender dial rear relay R1110 to normal. The latter relay upon restoring reconnects the loop circuit including the delay selector 1050 to the upper winding of the rear supervisory relay R1130. Also, at its contacts 1118, it removes ground potential from the DR conductor C1172; and, at its contacts 1111, it interrupts one point in the circuit for applying ground potential from the A conductor C1169. This conductor is now grounded at contacts 1148.

When the loop circuit including the delay selector 1050 is reconnected to the circuit including the upper winding of the rear supervisory relay R1130, the latter relay operates. It should be noted that at this time the dial rear control relay R1140 is retained in its operated position under control of the link 500 and, at its contacts 1148, it maintains the ground potential on the A conductor C1169 in order to prevent the restoration of the cut-in relay R610 in the link 500. Thus, the link and the operator common equipment 1100 are retained associated with one another after the restoration of relay R1110. As a further result of the operation of relay R1130, at its contacts 1131, it completes the previously described circuit for illuminating the rear supervisory lamp L1166.

In view of the foregoing description it will be understood that the impulse sender 1900A automatically disconnects itself from the operator common equipment 1100 after it has transmitted all of the digits registered in the digit register 1500A. Also, it will be understood that the connection established over the rear of the link 500 including the delay selector 1050 is retained over the loop circuit including the upper winding of the rear supervisory relay R1130 in the operator common equipment 1100.

When the called party answers the connection established over the rear of the link 500, the current flow over the loop circuit including the upper winding of the relay R1130 is reversed in a conventional manner and thereby causes the relay to restore to normal. At its contacts 1131, the relay R1130 interrupts the circuit for the rear supervisory lamp L1166 in order to indicate to the operator that the called party selected over the rear of the link 500 has answered the call.

The operator may converse with the called subscriber by way of her operator position circuit 1200 in the manner previously described and hold the connection while she sets up another connection over the front end of the link 500. Consequently, the operator now actuates her dial front key K1189 in the manner previously described in order to cause the impulse sender 1900A to be connected to the particular link 500 through the link finder 1400A. These operations have been described in detail hereinbefore and it will be understood that the digits keyed up on the keyset K1474 will be transmitted by the impulse sender 1900A over the front end of the link 500 to the link selector 700 and subsequent switches in the switch train to establish the connection to another called party. This called party, however, may be the party that originated the toll call but was unable to complete the same because the desired called subscriber that is now connected over the rear end of the link was unavailable.

As soon as the impulse sender 1900A has completed the transmission of switch controlling loop impulses over the front of the link 500, it automatically disconnects itself from the link in the manner previously described. Since the link 500 is retained connected to the operator common equipment 1100 under control of the operated condition of the cut-in relay R610, the loop circuit over the front end of the link, including the tip and ring conductors C701 and C702, is now connected to the windings of the front supervisory relay R1160 in the manner previously described. The current flow through the relay R1160 is in a direction that causes the relay to operate and close its contacts 1161. This completes a circuit for illuminating the front supervisory lamp L1165 in order to indicate to the operator that the called line is being signaled. When the called party answers the connection established over the front of the link 500, the current flow through the front supervisory relay R1160 is reversed and thereby causes the relay to restore to normal and extinguish the lamp L1165. Thus, the operator is informed that the called party has answered the connection.

Having completed the connection to the two called subscribers, the operator may now disconnect her common equipment 1100 from the link 500 by restoring the link key K601. As previously described, the restoration of the link key K601 at a time when the link is included in a connection established over both the rear and front ends thereof, the respective parties are interconnected through the windings of the repeating coil 627. As soon as the operator restores the link key K601, the cut-in relay R610 restores to normal and the ground potential at the contact springs D of the key K601 is removed from the DR1 conductor C1168. This interrupts the circuit for the dial rear control relay R1140 of the position equipment 1100 whereupon, this relay restores to normal. The position equipment 1100 may now be associated with any other link at the operator position for the purpose of extending another delay call.

Referring now to link 500, it will be seen that when the cut-in relay R610 restores to normal, at its contacts 613 to 616, inclusive, it transfers the loop circuit including the delay selector 1050 from the TR and RR conductors C1170 and C1171 extending to the position equipment to the left-hand windings respectively of the repeating coil 627. Consequently, the T2 conductor C1057 from the delay selector 1050 is connected by way of the contacts 542, 613, the upper left-hand winding of the repeating coil 627, contacts 522 and 552, the upper winding of the dial supervisory relay R530, contacts 524, the lower left-hand winding of the repeating coil 627, contacts 615 and 544, to the R2 conductor C1058 extending to the delay selector 1050. In this manner, the loop circuit is transferred from the supervisory relays in the position equipment 1100 to the supervisory relay R530 in the link 500. The loop circuit, including the tip and ring conductors C701 and C702, connected to the front end of the link are also transferred from the position equipment 1100 to the front supervisory relay R640 incident to the restoration of the cut-in relay R610 in the manner previously described.

In view of the foregoing, it will be appreciated that the reversals in current flow through the upper winding of the dial supervisory relay R530 will now operate and restore the relay, in accordance with the direction of current flow, to steadily illuminate or flash the rear supervisory lamp L533 in the link upon the receipt of a release or a recall supervisory signal in the same manner as has been described.

The release of the link 500 is accomplished by momentary actuation by the link release key K573. This key, as previously noted, causes the restoration of relay R560 and in the present call, at its contacts 552, it interrupts the loop circuit extending to the delay selector 1050 and subsequent switches in the switch train. The switches will automatically restore to normal in response to the interruption of the loop circuit and will cause the delay selector 1050 to remove ground potential from the C conductor C1053. As a result thereof, the switching relay R1030 in the delay selector link finder 1050 restores to normal and removes ground potential from the C2 conductor C1059 extending to the link. In the link, the removal of ground potential from the C2 conductor C1059 will cause the release of the dial rear relay R520 and the latter relay, at its contacts 527, will interrupt the multiple circuit for the relays R530 and R540 which also restore to normal. The remaining operations in the link 500, incident to the operation of the link release key K573, have been previously described.

*Night transfer*

In the previous description of the operation of the present system it was noted that the operators that handle incoming calls from the second group of link selecting trunk circuits, including the CLR trunk circuit 402, could vacate their positions by withdrawing the plug of the associated headset from the position jack. As a result thereof, the link selecting trunk circuits in the second group were controlled so that subsequent calls were automatically transferred to first groups of link selecting trunk circuits, including the CLR trunk circuit 401, and routed to links at the positions of the switchboard normally arranged to handle calls in the first group of link selecting trunk circuits.

It was also noted in the previous description that special service calls, including wire chief calls and information calls, were automatically routed to another special service desk as each desk is vacated and that when all the special service desks are vacated all such calls are automatically transferred by way of the special service transfer trunk circuits, such as 370, to links at the positions of the switchboard arranged to handle calls in the first group of link selecting trunk circuits. Furthermore, as each position of the switchboard is vacated the links thereat are marked busy so that incoming calls are routed to the remaining available links at the attended position or positions of the switchboard.

Under certain conditions it may be desirable to shut down the switchboard at the central office 100. In order to do this, the operator at the last remaining position of the switchboard, generally the first position, merely removes the plug of her headset 1245 from the jack J1244. The battery feed relay R1240 now restores to normal and grounds the ALB2 conductor C1254, at its contacts 1241. Since the conductor C1254 is multiply connected to each of the links at the position, including the link 500, a circuit is completed by way of the conductors, such as C997, for operating the position all links busy relay R990. The latter relay, operates and completes circuits for operating the busy relay R550 in each of the links at the position. At its contacts 551, the busy relay R550 in each of the links marks the associated link busy to incoming calls.

All of the positions of the switchboard are now vacated and all the links thereat are marked busy. The relay R990 and corresponding relays at each of the vacated positions complete a chain circuit, including the contacts 998, for operating the all positions busy relay R855 in order to prevent the allotters of Fig. 9 from operating to distribute incoming calls received by any of the link selecting trunk circuits.

As a further result of the restoration of the relay R1240, at its contacts 1242, it applies ground potential to the night transfer conductor C1255. This conductor is multiply connected to the night transfer conductor C406 individual to the CLR link selecting trunk circuit 401 and to all of the corresponding night transfer conductors of all of the remaining link selecting trunk circuits of the first group, including the inward and special service link selecting trunk circuits 360 and 370.

In the CLR trunk circuit 401, the transfer relay R440 is operated when the night transfer conductor C406 is grounded and controls the trunk circuit so that subsequent calls received thereby are now transferred by way of the rotary line switch 403 and a trunk repeater, such as the trunk repeater 403A to another exchange similar to the central office 100.

More specifically, the transfer relay R440, at its contacts 441 to 424, inclusive, transfers the incoming tip and ring conductors from the circuit including the windings of the line relay R410 to the rotary line switch 403, by way of the tip and ring conductors C486 and C487. Also, at the contacts 445, the relay R440 connects the incoming C conductor to the C conductor C488 extending to the rotary line switch 403. Consequently, any incoming call that is routed to the CLR trunk circuit 401 causes the rotary line switch 403 to rotate its associated wipers to select an idle trunk, including a trunk repeater 403A, extending to another exchange in order to transfer the call to the said other exchange to be answered.

The special service calls received by the special service transfer trunk circuit 370 will be transferred in the same manner by way of the rotary line switch 391 and the associated wipers to an idle trunk line, including a trunk repeater 391A, extending to the other exchange. The inward trunk circuit 360, will transfer incoming calls in the same manner by way of the rotary line switch 392 and the associated wipers to an idle trunk line, including a trunk repeater 392, extending to the other exchange.

In view of the foregoing description it is apparent that when all of the positions of the switchboard in the central office 100 are vacated, calls that are normally extended to links at this switchboard to be answered are instead automatically transferred to a toll switchboard at an attended office to be answered.

In the present system it is assumed that the night transfer operation described above is under control of the first position of the switchboard and that the first position is the last to be vacated by an operator when the switchboard is shut down. It should be understood, however, that the contacts, such as the contacts 1242, at each of the positions may be serially connected together so that the night transfer conductor C1255 will not be grounded to control the night transfer operation until the last position is vacated regardless of the number of the position on the switchboard. With the latter arrangement, the night transfer operation may be removed in response to an operator inserting her headset 1245 into the jack J1244 at any position and operating the associated relay R1240.

The name TX is applied to a call when an operator is unable to complete a call at the time it is placed with her by the calling subscriber A at central office 100, but can complete it later for the reason that the called party is not immediately available but will be available later in the day at an indefinite time. The operator having made a record of the calling subscriber's request now, upon the calling party's further request, places a notation on the record commonly called the "ticket," to the effect that the called party was out and word was left at his telephone number from which an answer was received, that the called party should call in when he returns. The information as to the city and operator number was given to the party answering. The operator's number will correspond with the delay position to which this ticket will now be sent.

It is an operating practice in an office when a plurality of operators are required to handle delay traffic, to divide these operators into different positions or groups, for example, the division may be made by the class of circuit employed, such as one class could be a long lines circuit used out of the State, another class could be a circuit to a point within the State, or an adjacent State, operated by the Bell Company in an area in the State in which the call originated; another class could be a comparatively short circuit to a tributary point serviced by the toll center at which the call was received; and another class could be a call over a circuit owned by an independent company or companies.

There is no limit to the number of groups which will regulate itself by the size of the office and the normal volume of delay traffic to be handled.

Let us assume three operators are required and these positions are divided into three classes, namely, long lines, Bell Company, and independent company. The first class named we will call Operator No. 1. The second class we will call Operator No. 2. The third class we will call Operator No. 3.

It is an established practice to assign Code No. 11 to an inward delay call. The original operator having a TX call as described, will tell the distant office to call operator 111 if it is of the first class; to call operator 112 if it is of the second class; and to call operator 113 if it is of the third class. Further, in each instance she will give the name of the city to which the call is to be returned. The ticket is now delivered to its appropriate delay position.

The TX trunks are identical with the CLR trunk 401 heretofore described, however, the C conductor, such as C463, connected to the rotary banks will be separated and assigned only to the links at the position or positions handling the class of service to which the inward link selector trunk is assigned. Let us assume that position 1 is assigned to operator 111; position 2 is assigned to operator 112 and position 3 is assigned to operator 113, and that each position has 8 links.

The group of inward link selecting trunks, such as 401, assigned to TX service to each operator 113, for example, will have 8 bank contacts terminating the C conductors, such as C463, connected to conductors, such as C267, at each link 500 at position 3. The remainder of the bank contacts will have ground potential applied thereto. Thus the rotary switch M450 can stop only on the 8 contacts, having conductors C463 connected thereto when these conductors have not been grounded in link 500.

An incoming call now comes in, for example, on an inter-city dial trunk, terminating on a selector, similar to 302, destined to operator 113. On the first digit one, a single impulse will cause selector 302 to raise its wipers in the well known conventional manner to level 1, thereupon it will automatically rotate its wipers to select an idle second selector, similar to 302.

On the second digit one, a single impulse will cause the second selector to raise its wipers to level 1 and in the well known manner rotate to select an idle third selector, similar to 302.

On the third digit three, three impulses will cause the third selector to raise its wipers to the third level and rotated to an idle link selecting link circuit, such as 401. If the operator is available, or as soon as she releases her listening key on any connection she may be servicing, she will be automatically seized through one of her idle links, such as 500, by the call on trunk circuit 401 and then the identity lamp TX will be lit, all as heretofore described for the operation of link circuit 500.

If at the time the call came in, operator 113 on position 3 had vacated the position and, at this time delivered her incompleted TX tickets to the operator on position 2, as prearranged, the foregoing described inward call will now go to a link in position 2. The operator on position 3 having removed the plug on her headset 1245, caused relay R1240 to release. Ground, at contacts 1242 is extended over a circuit including conductor C1255 in order to operate relay R440 in the trunk, similar to 401, as heretofore described for a night transfer, and the call to operator 113 will now be transferred to a TX inward link selecting trunk assigned to operator 112, who will have the ticket for the call involved. Similarly, when operator 112 vacates her position, the call will go to operator 111, and so on.

It may be noted here that selector 700 could be employed as the second selector instead of conventional selector, such as 302. In that case, the third selector 302 would not be required. Delay operator 111 would remain the same, delay operator 2 would be assigned number 114, and delay operator 3 would be assigned number 117.

The operations would repeat as described above except that the first digit one would have selected selector 700. The bank contacts 1 to 3 in level 1 of second selector 700 would be connected to TX incoming link selecting trunks, such as 401, assigned to delay operator 1. Contacts 4 to 6, in level 1, would be connected to TX incoming link selecting trunks assigned to delay operator 2, and contacts 7 to 10 would be connected to TX incoming link selecting trunks assigned to delay operator 3. The foregoing is, for example purposes. The level referred to is not limited to three groups.

The selector 700, on reaching level 1 would not automatically begin its rotary action but would remain stationary until the third digit was dialed. To reach operator 3 as noted, Code 117 was assigned in this instance and the third digit 7 would rotate the selector wipers to the 7th set of bank contacts which would have a connection to the first link selecting trunk to delay operator 3. If this trunk were in use, it would automatically proceed to the next trunk and so on until an idle trunk was found, all as heretofore described for the operation of selector 700.

It is obvious from the foregoing description that in this system a TX or inward delay call can be routed directly to the delay operator having the record from which the TX delay call can be completed.

If a link circuit 500 should develop trouble for any reason the operator would operate the hold key K670. This would in turn complete an obvious circuit to operate the busy relay R550 which in turn places ground potential on the C conductor C463, which would prevent this link from being seized for operation.

If the trouble was in the link selector 700 the operation of the busy key K704 in the selector 700 would produce the same results as heretofore described.

While one embodiment of the invention has been disclosed, it will be understood that various modifications may be made therein which are within the true spirit and scope of the invention.

What is claimed is:

1. In a telephone system, first and second groups of link selecting trunk circuits, means for extending calls to said trunk circuits, a plurality of operator positions, a plurality of links at each of said positions, a first allotter having access to each of said first group link selecting trunk circuits, a second allotter having access to each of said second group link selecting trunk circuits, means controlled in response to the extension of a call to one or more of said trunk circuits in said first group for controlling said first allotter to select one of said first group link selecting trunk circuits having a call thereon, means in said selected first group trunk circuit controlled in response to said selection thereof by said first allotter for selecting an idle one of said links at one of said positions and for disconnecting said first allotter from said selected first group trunk circuit, means controlled in response to the extension of calls to one or more of said trunk circuits in said second group for controlling said second allotter to select one of said second group link selecting trunk circuits having a call thereon, means in said selected second group trunk circuit controlled in response to said selection thereof by said second allotter for selecting an idle one of said links at another one of said positions and for disconnecting said second allotter from said selected second group trunk circuit, and gate control means for alternately selecting said first and said second allotters for use as long as calls are waiting in said first and second groups of link selecting trunk circuits to select idle links at said positions.

2. A telephone system according to claim 1, including means controlled in response to clearing out waiting calls in one of said groups of link selecting trunk circuits for rendering said gate controlled means ineffective to alternately select said first and said second allotters and for rendering said gate control means effective to successively control one of said allotters to successively select each of the link selecting trunk circuits in the other of said groups in order to clear out waiting calls in said other group.

3. In a toll switching system, a first group of link selecting trunk circuits corresponding to a plurality of different classes of toll service, a second group of link selecting trunk circuits corresponding to a plurality of different classes of toll service, a first allotter for said first group of link selecting trunk circuits, a second allotter for said second group of link selecting trunk circuits, a plurality of operator positions, a plurality of links at each of said positions, means controlled in response to the extension of a call to one or more of said link selecting trunk circuits in said first group and said second group for alternately controlling said first allotter and said second allotter respectively to select link selecting trunk circuits in the associated group having waiting calls thereon, means in a link selecting trunk circuit selected by one of said allotters for extending the call thereon to an idle one of said links at one of said positions to be answered and for controlling said one link to indicate the particular class of toll service of said selected trunk circuit, and means at said one position for busying the remaining plurality of links at said one position in order to prevent the extension of another call to a link at said position until said one call on said one link thereat is further extended by the operator at said one position.

4. In a telephone system, a first link selecting trunk circuit corresponding to a first toll service class, a second link selecting trunk circuit corresponding to a second toll service class, an allotter having access to said link selecting trunk circuits, a plurality of operator positions, a plurality of links at each of said positions, means controlled responsive to the extension of a call to said first or said second link selecting trunk circuit for controlling said allotter to select said link selecting trunk circuit having waiting calls thereon, one at a time, means in said link selecting trunk circuit controlled in response to said selection thereof by said allotter for searching for and seizing an idle link at one of said operator positions, means in said seized link controlled in response to seizure thereof for indicating to the operator at said position the toll service class of said trunk circuit selected by said allotter, and additional means in said seized link controlled in response to seizure thereof for marking the remaining plurality of links at said position busy to all links selecting trunk circuits, thereby to prevent the next link selecting trunk circuit selected by said allotter from seizing a link at a busy operator position.

5. A toll switching system according to claim 3, including means controlled in response to a busy condition of said links at said plurality of positions for preventing said first allotter or said second allotter from selecting another link selecting trunk circuit having a waiting call thereon, a delay answer timer, and means operated by said timer incident to the elapse of a predetermined time interval for registering the fact that a waiting call on at least one of said link selecting trunk circuits has not been answered.

6. In a toll switching system, a group of link selecting trunk circuits, an allotter for said group of link selecting trunk circuits, a plurality of operator positions, a plurality of links at each of said positions, means controlled in response to the extension of one or more calls to one or more of said link selecting trunk circuits for controlling said allotter to select said trunk circuits having calls thereon one after another, means in said link selecting trunk circuits controlled in response to selection thereof by said allotter for routing the waiting call thereon to an idle link at an operator position to be answered, an all links busy relay at each of said positions, means in said one link operated in response to said routing of a call thereto for marking said one link busy and for operating said all links busy relay at said one position in order to mark busy all of said remaining links at said position, an all positions busy relay, an all positions busy register, means controlled in response to said operation of said all links busy relays at said positions for operating said all positions busy relay, a delay answer timer, means controlled in response to said operation of said all positions busy relay for preventing said allotter from operating to select another link selecting trunk circuit having a waiting call thereon and for operating said all positions busy register, means controlled jointly by said all positions busy relay and a waiting call on at least one of said link selecting trunk circuits for operating said delay answer timer, and means controlled by said timer after the elapse of a predetermined time interval following its operation for registering the fact that a waiting call on a link selecting trunk circuit has not been answered within said predetermined elapsed time interval.

7. In a telephone system, a plurality of link selecting trunk circuits corresponding to a plurality of different classes of toll service, a first allotter having access to said link selecting trunk circuits, an alternate allotter having access to said link selecting trunk circuits, an operator position, a plurality of links at said position, a transfer timer, means controlled responsive to the extension of a call to one of said link selecting trunk circuits for operating said first allotter and said transfer timer, means in said first allotter controlled in response to said operation thereof for selecting said link selecting trunk circuit having said call thereon, control means in said link selecting trunk circuit operated in response to selection thereof by said first allotter for selecting an idle link at said position and for releasing said first allotter and said transfer timer, transfer means controlled by said transfer timer in the event said trunk circuit control means fails to operate within a predetermined elapsed time interval for releasing said first allotter and for operating said alternate allotter, means in said alternate allotter controlled in response to said operation thereof for selecting said link selecting trunk circuit having said call thereon, whereby said control means in said link selecting trunk circuit is operated by said alternate allotter to select an idle link at said operator position, and means in said link operated in response to said selection thereof for indicating to the operator at said position the toll service class of said link selecting trunk circuit.

8. A telephone system according to claim 7, including means for locking said transfer means in its operated position in response to said control of said transfer means by said transfer timer to prevent reoperation of said first allotter and to release said transfer timer.

9. In a telephone system, a first group of link selecting trunk circuits, a second group of link selecting trunk circuits, a plurality of operator positions, a plurality of links at each of said positions, a normally operated first allotter and a normally disconnected alternate first allotter having access to said link selecting trunk circuit in said first group, a second allotter and a normally disconnected alternate second allotter having access to said link selecting trunk circuit in said second group, means controlled in response to the extension of a call to one of said link selecting trunk circuits in said first group for operating said first allotter, means in said first allotter controlled in response to said operation thereof for selecting said trunk circuit in said first group having said call thereon, control means in said trunk circuit in said first group operated in response to selection thereof by said first allotter for selecting an idle link at one of said operator positions and for routing said call to said link, means controlled in response to the extension of a call to one of said link selecting trunk circuits in said second group for operating the said second allotter, means in said second allotter controlled in response to said operation thereof for selecting said trunk circuit in said second group having said call thereon, control means in said trunk circuit in said second group operated in response to selection thereof by said second allotter for selecting an idle link at another one of said operator positions and for routing said call to said link, first transfer means associated with said first allotter and said first alternate allotter, second transfer means associated with said second allotter and said second alternate allotter, first disconnect means controlled by said first transfer means for disconnecting said first allotter in response to the failure of said first allotter to select a link selecting trunk circuit in said first group having a call thereon and for connecting said alternate first allotter as a substitute for said disconnected first allotter, and second disconnect means controlled by said second transfer means for disconnecting said second allotter in response to the failure of said second allotter to select a link selecting trunk circuit in said second group having a call thereon and for connecting said alternate second allotter as a substitute for said disconnected second allotter.

10. A telephone system according to claim 9, including a gate circuit operated in response to waiting calls in said first group and said second group of link selecting trunk circuits for operating said first allotter or said alternate first allotter and said second allotter or said alternate second allotter alternately so that said waiting calls are routed to links at said operator positions alternately from said first and second groups of link selecting trunk circuits.

11. In a telephone system, a first group of link selecting trunk circuits, a second group of link selecting trunk circuits corresponding to the link selecting trunk circuits of said first group, a first operator position, a second operator position, a plurality of links at each of said positions, means responsive to a call received by one of said link selecting trunk circuits in said first group for controlling said one first group link selecting trunk circuit to route said call to an idle link at said first position in order to extend said call thereon to said first operator position, means responsive to a call received by one of said link selecting trunk circuits in said second group for controlling said one second group link selecting trunk circuit to route said call to an idle link at said second position in order to extend said call thereon to said second operator position, means at said positions for completing said calls received over links thereat to called destinations, a transfer relay included in each of said link selecting trunk circuits in said second group, means at said second operator position selectively operative for marking all of said links at said second position busy and for operating said transfer relays, and means controlled responsive to said operation of said transfer relays for automatically connecting said link selecting trunk circuits in said second group to corresponding link selecting trunk circuits in said first group so that calls that are normally received by said second group link selecting trunk circuits and routed to links at said second operator position to be answered are now transferred to said first group link selecting trunk circuits and routed therefrom to links at said first operator position to be answered.

12. In a telephone system, a plurality of operator positions including a first operator position and a second operator position, a plurality of links at each of said positions, means including an operator headset at each of said positions normally marking idle the links at the corresponding positions, a first group of link selecting trunk circuits having access to said links, a second group of link selecting trunk circuits corresponding to the link selecting trunk circuits of said first group and having access to said links, means in each of said link selecting trunk circuits controlled in response to the extension of a call thereto for selecting an idle one of said links in order to route said calls to the corresponding operator position to be answered, means controlled in response to the selection of an idle link at any one position for automatically marking the remaining links at said position busy, means at each of said positions for completing said calls routed to said links to called destinations and for moving said busy marking from said remaining links at each of said positions to permit another call to be routed to another one of said links thereat, means at each of said first operator positions responsive to the disassociation of said headset from said position for marking all the links at said first position as busy and for marking said first position as unattended, a transfer relay included in each of said link selecting trunk circuits of said second group responsive to all of said first positions being marked as unattended for connecting said link selecting trunk circuits in said second group to corresponding link selecting trunk circuits in said first group so that calls subsequently extended to said link selecting trunk circuits in said second group are automatically transferred to said corresponding link selecting trunk circuits in said first group and routed therefrom to idle links at said second operator positions.

13. A telephone system according to claim 12 including transfer relays in said link selecting trunk circuits in said first group, means controlled responsive to the removal of the headset from the last attended one of said operator positions for marking all the links thereat busy and for operating said transfer relays in said link selecting trunk circuits in said first group, trunk lines to another exchange, and means controlled by said operation of said transfer relay in said first group link selecting trunk circuits for routing subsequent calls received by said first group link selecting trunk circuits over said trunk lines to said other exchange whether said calls are transferred thereto from said second group link selecting trunk circuits or are routed thereto in a normal manner.

14. In a telephone system, an operator position, a plurality of links at said position, link selecting trunk circuits having access to said links, means in said link selecting trunk circuit controlled in response to the extension thereto of an incoming call for selecting any idle one of said links at said position, means in said link operated incident to said selection thereof for extending said incoming call on said link selecting trunk circuit by way of said selected link to said operator position to be answered, a key at said position operated to convert said links at said position for delay call operation, means controlled incident to said operation of said key for applying a busy marking potential to said control conductors in order to mark said links busy to said link selecting trunk circuits, a plurality of delay selectors, a delay selector link finder associated with each of said selectors, means selectively controlled by the operator at said position for selecting one of said delay selector link finders and for operating said selected link finder to connect with a predetermined one of said links, means at said position operated incident to said connection of said link finder to said link for indicating to the operator thereat that said delay selector is connected to said link, and means at said position for directively controlling said delay selector to extend an outgoing call from said position by way of said link and said delay selector link finder and said delay selector to a desired called destination.

15. In a telephone system, an operator position, a plurality of links at said position, a link selecting trunk circuit having access to one end of said links, a link selector connected to the opposite end of each of said links, means in said link selecting trunk circuit operated in response to the extension of an incoming call thereto for selecting any idle one of said links, means in said link operated incident to said selection thereof for further extending said call on said link selecting trunk circuit by way of said selected link to said position to enable the operator thereat to answer said incoming call, a delay selector, a delay selector link finder having access to said one end of said links, means at said position selectively controllable by the operator thereat for busying said one end of said links to said link selecting trunk circuit in order to prevent the extension of incoming calls to said position, additional means selectively controlled by the operator at said position for preselecting one of said links for use in a delay call and for controlling said delay selector link finder to connect said delay selector to said one end of said preselected link, means at said position for thereafter directively controlling said delay selector to establish a connection to a called destination from said position over said one end of said preselected link, and means at said position for directively controlling said link selector to establish a connection to another destination over the said opposite end of said link, whereby the operator at said position may answer or originate a connection over said one end of said link and in either event may also establish a connection to a called destination over the said opposite end of said link.

16. In a telephone system, a special desk including a headset, a special service trunk circuit at said desk, switching apparatus operated to extend a special service call to said special service trunk circuit, means in said special service trunk circuit operated in response to the extension of a special service call thereto for routing said call to said desk to be answered, means at said desk for connecting said headset to said special service trunk circuit to answer said call, an operator position, a plurality of links at said position, a headset at said position, means in said special service trunk circuit automatically controlled in response to removal of said headset from said special service desk for connecting said special service trunk circuit to said link selecting trunk circuit and for disconnecting said special service trunk circuit from said desk whereby a subsequent special service call extended to said special service trunk circuit is transferred to said link selecting trunk circuit, and means in said link selecting trunk circuit controlled incident to the extension of a special service call thereto for selecting an idle link at said operator position for routing said special service call by way of said selected link to said headset at said position to be answered.

17. A telephone system according to claim 16, including an outgoing trunk line extending to another exchange, and further including means automatically controlled in response to removal of said headset from said operator position for connecting said link selecting trunk circuit to said outgoing trunk line and for preventing said link selecting trunk circuit from selecting said links at said operator position, whereby a subsequent special service call extended to said link selecting trunk circuit is further extended over said outgoing line to said other exchange.

References Cited in the file of this patent

UNITED STATES PATENTS

| | | |
|---|---|---|
| 2,249,516 | Crocker | July 15, 1941 |
| 2,353,212 | Balzer | July 11, 1944 |
| 2,361,313 | Molnar | Oct. 24, 1944 |
| 2,697,134 | Balzer | Dec. 14, 1954 |

UNITED STATES PATENT OFFICE

CERTIFICATE OF CORRECTION

Patent No. 2,839,612 June 17, 1958

George B. Quatman

It is hereby certified that error appears in the printed specification of the above numbered patent requiring correction and that the said Letters Patent should read as corrected below.

Column 97, line 8, for "calls" read -- call --; line 13, for "moving" read -- removing --.

Signed and sealed this 26th day of August 1958.

(SEAL)

Attest:

KARL H. AXLINE
Attesting Officer

ROBERT C. WATSON
Commissioner of Patents